United States Patent
Xu et al.

(10) Patent No.: US 10,477,530 B2
(45) Date of Patent: *Nov. 12, 2019

(54) APPARATUS FOR TRANSMITTING INDICATION INFORMATION INDICATING A CODEBOOK

(71) Applicant: Huawei Technologies Co., Ltd., Shenzhen (CN)

(72) Inventors: Xiuqiang Xu, Shanghai (CN); Lei Wang, Shanghai (CN); Lu Rong, Shanghai (CN); Shunqing Zhang, Shenzhen (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

This patent is subject to a terminal disclaimer.

(21) Appl. No.: 15/630,331

(22) Filed: Jun. 22, 2017

(65) Prior Publication Data
US 2017/0289979 A1    Oct. 5, 2017

Related U.S. Application Data

(63) Continuation of application No. PCT/CN2015/077359, filed on Apr. 24, 2015.

(30) Foreign Application Priority Data

Dec. 22, 2014  (WO) ................ PCT/CN2014/094538

(51) Int. Cl.
*H04W 72/04*    (2009.01)
*H04L 1/06*    (2006.01)
(Continued)

(52) U.S. Cl.
CPC ....... *H04W 72/042* (2013.01); *H04J 11/0023* (2013.01); *H04L 1/06* (2013.01); *H04L 5/0016* (2013.01); *H04L 27/2601* (2013.01)

(58) Field of Classification Search
CPC . H04W 72/042; H04J 11/0023; H04L 5/0016; H04L 27/2601; H04L 1/06
See application file for complete search history.

(56) References Cited

U.S. PATENT DOCUMENTS

2010/0039928 A1    2/2010 Noh et al.
2010/0215110 A1    8/2010 Onggosanusi et al.
(Continued)

FOREIGN PATENT DOCUMENTS

CN    101541011 A    9/2009
CN    101640940 A    2/2010
(Continued)

OTHER PUBLICATIONS

Taherzadeh, M. et al., "SCMA Codebook Design," 80th IEEE Vehicular Technology Conference (VTC), Sep. 14, 2014, 5 pages.
(Continued)

*Primary Examiner* — Walli Z Butt
(74) *Attorney, Agent, or Firm* — Slater Matsil, LLP

(57) ABSTRACT

Embodiments disclose a method and an apparatus for transmitting indication information. The method includes: determining, according to one or more codebooks, a first codebook to be used by a terminal device to send an uplink data stream; determining codebook indication information used to indicate the first codebook; and determining codebook indication information used to indicate the first codebook. For the method and the apparatus for transmitting indication information according to embodiments of the present invention, a network device determines, according to one or more codebooks, a first codebook to be used by a terminal device (Continued)

to send an uplink data stream, determines codebook indication information used to indicate the first codebook, and sends the codebook indication information to the terminal device, so that the terminal device can determine the first codebook assigned by the network device and transmit data by using the first codebook.

19 Claims, 18 Drawing Sheets

(51) Int. Cl.
*H04L 5/00* (2006.01)
*H04L 27/26* (2006.01)
*H04J 11/00* (2006.01)

(56) References Cited

U.S. PATENT DOCUMENTS

| | | |
|---|---|---|
| 2010/0329369 A1 | 12/2010 | Hou et al. |
| 2011/0128939 A1 | 6/2011 | Lim et al. |
| 2011/0200125 A1 | 8/2011 | Multrus et al. |
| 2012/0177011 A1* | 7/2012 | Xi .................. H04B 7/0404 370/335 |
| 2014/0098901 A1 | 4/2014 | Zhang et al. |
| 2014/0169408 A1 | 6/2014 | Bayesteh et al. |
| 2014/0321313 A1 | 10/2014 | Seo et al. |
| 2014/0369434 A1* | 12/2014 | Taherzadehboroujeni .................. H04B 7/0456 375/261 |
| 2015/0280800 A1* | 10/2015 | Chen .................. H04B 7/0619 375/267 |
| 2017/0353959 A1* | 12/2017 | Xu .................. H04W 72/12 |

FOREIGN PATENT DOCUMENTS

| | | |
|---|---|---|
| CN | 102124655 A | 7/2011 |
| CN | 102742311 A | 10/2012 |
| CN | 103209057 A | 7/2013 |
| CN | 103780289 A | 5/2014 |
| EP | 2247138 B1 | 7/2014 |
| EP | 3051923 A1 | 8/2016 |
| KR | 20100081898 A | 7/2010 |
| KR | 20120033340 A | 4/2012 |
| KR | 20130143106 A | 12/2013 |
| KR | 20140123486 A | 10/2014 |
| RU | 2493651 C2 | 9/2013 |
| WO | 2009022871 A2 | 2/2009 |
| WO | 2011125025 A1 | 10/2011 |

OTHER PUBLICATIONS

Au, K. et al., "Uplink Contention Based SCMA for 5G Radio Access", 2014 IEEE Globecom Workshops (GC Wkshps), Dec. 8-12, 2014, pp. 900-905.

Nikopour, H. et al., "Sparse Code Multiple Access", 2013 IEEE 24th International Symposium on Personal, Indoor and Mobile Radio Communications; Fundamentals and PHY Track, Sep. 8, 2013, pp. 332-336.

Zhang, S. et al.,"Sparse Code Multiple Access: An Energy Efficient Uplink Approach for 5G Wireless Systems," Globecom 2014—Wireless Networking Symposium, Dec. 8-12, 2014, pp. 4782-4787.

* cited by examiner

200

Determine, according to one or more codebooks, a first codebook to be used by a terminal device to send an uplink data stream, where the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol ~ S210

Determine codebook indication information used to indicate the first codebook ~ S220

Send the codebook indication information to the terminal device ~ S230

Determine a first codebook set to which the first codebook belongs and a first codebook cluster to which the first codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols ~ S2211

Determine the codebook indication information, where the codebook indication information includes first codebook cluster information, first codebook set information, and first codebook information, where the first codebook cluster information is used to indicate the first codebook cluster, the first codebook set information is used to indicate the first codebook set in the first codebook cluster, and the first codebook information is used to indicate the first codebook in the first codebook set ~ S2212

┌─────────────────────────────────────────────────────────────┐
│ Determine a second codebook set to which the first codebook │
│ belongs, where each codebook set includes at least one codebook, │
│ and the codebook set meets a condition that codewords in a same │
│ codebook set have a same total quantity of modulation symbols and │ ~ S2221
│ that any two codebooks in a same codebook set have same positions │
│ in which modulation symbols of all codewords of the two codebooks │
│ are zero modulation symbols │
└─────────────────────────────────────────────────────────────┘
                            │
┌─────────────────────────────────────────────────────────────┐
│ Determine the codebook indication information, where the codebook │
│ indication information includes second codebook set information and │
│ second codebook information, where the second codebook set │
│ information is used to indicate the second codebook set, and the │ ~ S2222
│ second codebook information is used to indicate the first codebook │
│ in the second codebook set │
└─────────────────────────────────────────────────────────────┘

┌─────────────────────────────────────────────────────────────┐
│ Determine a second codebook cluster to which the first codebook │
│ belongs, where each codebook cluster includes at least one │
│ codebook, and the codebook cluster meets a condition that │ ~ S2231
│ codewords in a same codebook cluster have a same total quantity of │
│ modulation symbols │
└─────────────────────────────────────────────────────────────┘
                            │
┌─────────────────────────────────────────────────────────────┐
│ Determine the codebook indication information, where the codebook │
│ indication information includes second codebook cluster information │
│ and third codebook information, where the second codebook cluster │ ~ S2232
│ information is used to indicate the second codebook cluster, and the │
│ third codebook information is used to indicate the first codebook in │
│ the second codebook cluster │
└─────────────────────────────────────────────────────────────┘

┌─────────────────────────────────────────────────┐
│ Determine a first characteristic sequence to which the first codebook
│ belongs and a first characteristic matrix to which the first characteristic
│ sequence belongs, where each characteristic matrix includes two or
│ more characteristic sequences, each characteristic sequence corresponds
│ to one or more codebooks, the characteristic sequence includes an      S2241
│ element 0 and an element 1, the element 0 represents that modulation
│ symbols that are of all codewords in a corresponding codebook and that
│ are in a position corresponding to the element 0 are all zero modulation
│ symbols, and the element 1 represents that modulation symbols that are
│ of all codewords in a corresponding codebook and that are in a position
│ corresponding to the element 1 are not all zero modulation symbols or
│ are all non-zero modulation symbols
└─────────────────────────────────────────────────┘
                          │
┌─────────────────────────────────────────────────┐
│ Determine the codebook indication information, where the codebook
│ indication information includes first characteristic matrix information,
│ first characteristic sequence information, and fourth codebook          S2242
│ information, where the first characteristic matrix information is used to
│ indicate the first characteristic matrix, the first characteristic sequence
│ information is used to indicate the first characteristic sequence in the
│ first characteristic matrix, and the fourth codebook information is used
│ to indicate the first codebook of one or more codebooks corresponding
│ to the first characteristic sequence
└─────────────────────────────────────────────────┘

┌─────────────────────────────────────────────────┐
│ Determine a second characteristic matrix to which the first
│ codebook belongs, where each characteristic matrix includes two or
│ more characteristic sequences, each characteristic sequence
│ corresponds to one or more codebooks, the characteristic sequence
│ includes an element 0 and an element 1, the element 0 represents
│ that modulation symbols that are of all codewords in a               S2251
│ corresponding codebook and that are in a position corresponding to
│ the element 0 are all zero modulation symbols, and the element 1
│ represents that modulation symbols that are of all codewords in a
│ corresponding codebook and that are in a position corresponding to
│ the element 1 are not all zero modulation symbols or are all non-
│ zero modulation symbols
└─────────────────────────────────────────────────┘
                          │
┌─────────────────────────────────────────────────┐
│ Determine the codebook indication information, where the
│ codebook indication information includes second characteristic
│ matrix information and fifth codebook information, where the        S2252
│ second characteristic matrix information is used to indicate the
│ second characteristic matrix, and the fifth codebook information is
│ used to indicate the first codebook of one or more codebooks
│ corresponding to the second characteristic matrix
└─────────────────────────────────────────────────┘

```
Determine a second characteristic sequence to which the first
codebook belongs, where each characteristic sequence corresponds
to one or more codebooks, the characteristic sequence includes an
element 0 and an element 1, the element 0 represents that
modulation symbols that are of all codewords in a corresponding
codebook and that are in a position corresponding to the element 0
are all zero modulation symbols, and the element 1 represents that
modulation symbols that are of all codewords in a corresponding
codebook and that are in a position corresponding to the element 1
are not all zero modulation symbols or are all non-zero modulation
symbols
```
~ S2261

```
Determine the codebook indication information, where the
codebook indication information includes second characteristic
sequence information and sixth codebook information, where the
second characteristic sequence information is used to indicate the
second characteristic sequence, and the sixth codebook information
is used to indicate the first codebook of one or more codebooks
corresponding to the second characteristic sequence
```
~ S2262

```
Receive codebook indication information sent by a network device,
where the codebook indication information is used to indicate a first
codebook of one or more codebooks, the codebook includes two or
more codewords, the codeword is a multidimensional complex vector
and is used to represent a mapping relationship between data and at
least two modulation symbols, and the at least two modulation
symbols include at least one zero modulation symbol and at least one
non-zero modulation symbol
```
~ S310

Determine the first codebook according to the codebook indication information ~ S320

Send an uplink data stream according to the first codebook ~ S330

```
┌─────────────────────────────────────────────────┐
│ Receive codebook indication information sent by a base station, │
│ where the codebook indication information includes first codebook │
│ cluster information, first codebook set information, and first │
│ codebook information, where the first codebook cluster information │──── S310
│ is used to indicate a first codebook cluster, the first codebook set │
│ information is used to indicate a first codebook set in the first │
│ codebook cluster, and the first codebook information is used to │
│ indicate a first codebook in the first codebook set │
└─────────────────────────────────────────────────┘
                         │
┌─────────────────────────────────────────────────┐
│ Determine the first codebook in the first codebook set included in │
│ the first codebook cluster according to the first codebook cluster │
│ information, the first codebook set information, and the first │
│ codebook information, where each codebook cluster includes at │
│ least one codebook set, each codebook set includes at least one │
│ codebook, the codebook cluster meets a condition that codewords │──── S321
│ in a same codebook cluster have a same total quantity of │
│ modulation symbols, and the codebook set meets a condition that │
│ any two codebooks in a same codebook set have same positions in │
│ which modulation symbols of all codewords of the two codebooks │
│ are zero modulation symbols │
└─────────────────────────────────────────────────┘
```

```
┌─────────────────────────────────────────────────┐
│ Receive codebook indication information sent by a base station, │
│ where the codebook indication information includes second │
│ codebook set information and second codebook information, where │──── S310
│ the second codebook set information is used to indicate a second │
│ codebook set, and the second codebook information is used to │
│ indicate a first codebook in the second codebook set │
└─────────────────────────────────────────────────┘
                         │
┌─────────────────────────────────────────────────┐
│ Determine the first codebook in the second codebook set according │
│ to the second codebook set information and the second codebook │
│ information, where each codebook set includes at least one │
│ codebook, the codebook set meets a condition that codewords in a │──── S322
│ same codebook set have a same total quantity of modulation │
│ symbols and that any two codebooks in a same codebook set have │
│ same positions in which modulation symbols of all codewords of │
│ the two codebooks are zero modulation symbols │
└─────────────────────────────────────────────────┘
```

Receive codebook indication information sent by a base station, where the codebook indication information includes first characteristic matrix information, first characteristic sequence information, and fourth codebook information, where the first characteristic matrix information is used to indicate a first characteristic matrix, the first characteristic sequence information is used to indicate a first characteristic sequence in the first characteristic matrix, and the fourth codebook information is used to indicate a first codebook of one or more codebooks corresponding to the first characteristic sequence ~ S310

Determine the first codebook of the one or more codebooks corresponding to the first characteristic sequence in the first characteristic matrix according to the first characteristic matrix information, the first characteristic sequence information, and the fourth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols ~ S325

Receive codebook indication information sent by a base station, where the codebook indication information includes second characteristic matrix information and fifth codebook information, where the second characteristic matrix information is used to indicate a second characteristic matrix, and the fifth codebook information is used to indicate a first codebook of one or more codebooks corresponding to the second characteristic matrix ⟶ S310

Determine the first codebook of the one or more codebooks corresponding to the second characteristic matrix according to the second characteristic matrix information and the fifth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols ⟶ S326

Receive codebook indication information sent by a base station, where the codebook indication information includes second characteristic sequence information and sixth codebook information, where the second characteristic sequence information is used to indicate a second characteristic sequence, and the sixth codebook information is used to indicate a first codebook of one or more codebooks corresponding to the second characteristic sequence  ∼ S310

Determine the first codebook of the one or more codebooks corresponding to the second characteristic sequence according to the second characteristic sequence information and the sixth codebook information, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols  ∼ S327

FIG. 17

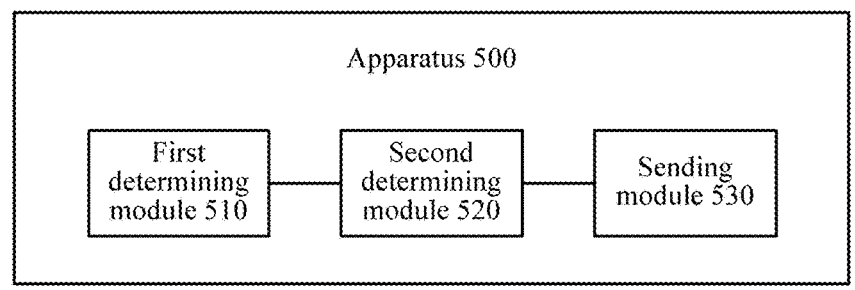

FIG. 18

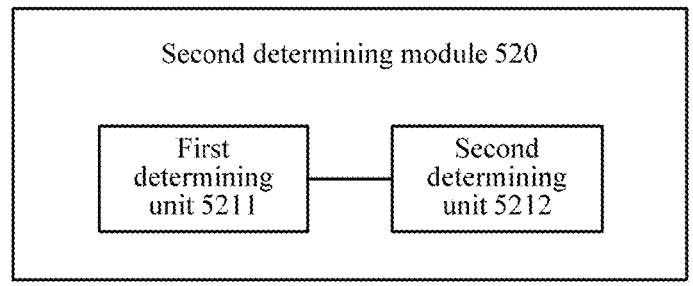

FIG. 19

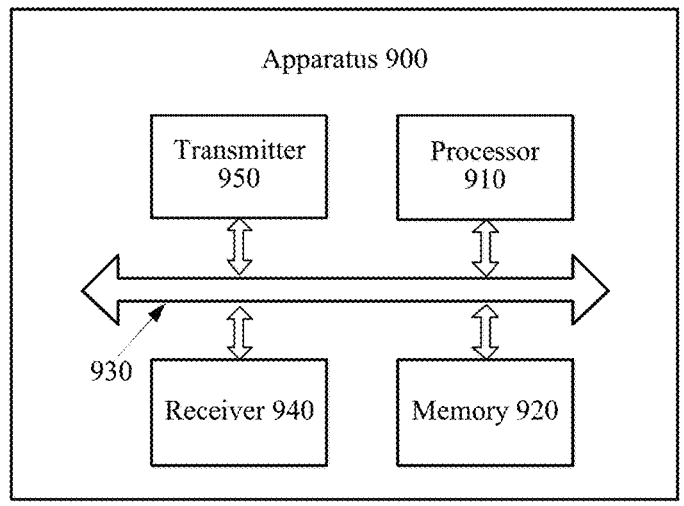

Determine a third codebook set to which the first codebook belongs and a third codebook cluster to which the third codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords ~ S2271

Determine the codebook indication information, where the codebook indication information includes third codebook cluster information, third codebook set information, and seventh codebook information, where the third codebook cluster information is used to indicate the third codebook cluster, the third codebook set information is used to indicate the third codebook set in the third codebook cluster, and the seventh codebook information is used to indicate the first codebook in the third codebook set ~ S2272

> Determine a fourth codebook set to which the first codebook belongs, where each codebook set includes at least one codebook, and the codebook set meets a condition that codewords in a same codebook set have a same total quantity of modulation symbols and that codebooks in a same codebook set have a same total quantity of codewords ~ S2281

> Determine the codebook indication information, where the codebook indication information includes fourth codebook set information and eighth codebook information, where the fourth codebook set information is used to indicate the fourth codebook set, and the eighth codebook information is used to indicate the first codebook in the fourth codebook set ~ S2282

> Determine a fifth codebook set to which the first codebook belongs and a third characteristic matrix to which the fifth codebook set belongs, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols ~ S2291

> Determine the codebook indication information, where the codebook indication information includes third characteristic matrix information, fifth codebook set information, and ninth codebook information, where the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set ~ S2292

Receive codebook indication information sent by a base station, where the codebook indication information includes third codebook cluster information, third codebook set information, and seventh codebook information, where the third codebook cluster information is used to indicate a third codebook cluster, the third codebook set information is used to indicate a third codebook set in the third codebook cluster, and the seventh codebook information is used to indicate a first codebook in the third codebook set ~ S310

Determine the first codebook in the third codebook set included in the third codebook cluster according to the third codebook cluster information, the third codebook set information, and the seventh codebook information, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords ~ S328

Receive codebook indication information sent by a base station, where the codebook indication information includes fourth codebook set information and eighth codebook information, where the fourth codebook set information is used to indicate a fourth codebook set, and the eighth codebook information is used to indicate a first codebook in the fourth codebook set ~ S310

Determine the first codebook in the fourth codebook set according to the fourth codebook set information and the eighth codebook information, where each codebook set includes at least one codebook, and the codebook set meets a condition that codewords in a same codebook set have a same total quantity of modulation symbols and that codebooks in a same codebook set have a same total quantity of codewords ~ S329

Receive codebook indication information sent by a base station, where the codebook indication information includes third characteristic matrix information, fifth codebook set information, and ninth codebook information, where the third characteristic matrix information is used to indicate a third characteristic matrix, the fifth codebook set information is used to indicate a fifth codebook set of one or more codebook sets corresponding to the third characteristic matrix, and the ninth codebook information is used to indicate a first codebook in the fifth codebook set ~ S310

Determine the first codebook in the fifth codebook set of one or more codebook sets corresponding to the third characteristic matrix according to the third characteristic matrix information, the fifth codebook set information, and the ninth codebook information, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols ~ S331

FIG. 34

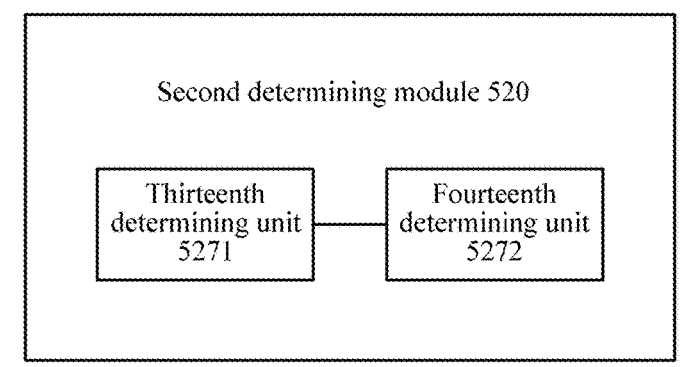

FIG. 35

APPARATUS FOR TRANSMITTING INDICATION INFORMATION INDICATING A CODEBOOK

CROSS-REFERENCE TO RELATED APPLICATIONS

This application is a continuation of International Patent Application No. PCT/CN2015/077359, filed on Apr. 24, 2015, which claims priority to PCT International Application No. PCT/CN2014/094538, filed on Dec. 22, 2014. The disclosures of the aforementioned applications are hereby incorporated by reference in their entireties.

TECHNICAL FIELD

The present invention relates to the communications field, and in particular, to a method and an apparatus for transmitting indication information in the communications field.

BACKGROUND

With continuous evolution of wireless cellular networks, although widely applied to third-generation ("3G" for short) and fourth-generation ("4G" for short) mobile communications systems, orthogonal multiple access technologies such as a code division multiple access ("CDMA" for short) technology and an orthogonal frequency division multiple access ("OFDMA" for short) technology have gradually failed to meet people's increasing capacity requirements in cellular networks. For example, massive accesses and spectral efficiency need to continue increasing. On the other hand, research and application of non-orthogonal multiple access technologies gradually draw more attention in the industry and academic communities. People hope that in a future wireless cellular network such as a fifth-generation ("5G" for short) mobile communications system, a capacity improvement problem can be effectively resolved with the aid of the non-orthogonal multiple access technologies.

A sparse code multiple access ("SCMA" for short) technology is a typical non-orthogonal multiple access and transmission technology. Certainly, the SCMA technology may be referred to as another name in the communications field. In this type of technology, M (M is an integer not less than 1) data streams from one or more users are superimposed on N (N is an integer not less than 1) subcarriers and sent. Each piece of data in each data stream is spread on the N subcarriers in a sparse spread-spectrum form. When M is greater than N, this type of technology can effectively increase network capacity, including a quantity of users who can access a system, spectral efficiency, and the like. Therefore, as an important non-orthogonal access technology, the SCMA technology has drawn a lot of attention, and becomes an important candidate access technology for evolution of future wireless cellular networks.

In a non-orthogonal multiple access system such as an SCMA system, when sending an uplink data stream by using a non-orthogonal multiple access technology, a terminal device needs to know a codebook used for the uplink data stream. A network device usually completes selection and assignment of a codebook, and the terminal device does not directly participate in this process. Therefore, after the network device assigns a codebook to a data stream that is to be sent to the terminal device, how to inform the terminal device of the assigned codebook is a technical problem that urgently needs to be resolved.

SUMMARY

In view of this, embodiments of the present invention provide a method and an apparatus for transmitting indication information, so as to resolve a problem of indicating a codebook to a terminal device by a network device in a non-orthogonal multiple access system.

According to a first aspect, a method for transmitting indication information is provided. The method includes: determining, according to one or more codebooks, a first codebook to be used by a terminal device to send an uplink data stream, where the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol. The method also includes determining codebook indication information used to indicate the first codebook. The method also includes sending the codebook indication information to the terminal device.

With reference to the first aspect, in a first possible implementation manner of the first aspect, the determining codebook indication information used to indicate the first codebook includes: determining a first codebook set to which the first codebook belongs and a first codebook cluster to which the first codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols; and determining the codebook indication information, where the codebook indication information includes first codebook cluster information, first codebook set information, and first codebook information, where the first codebook cluster information is used to indicate the first codebook cluster, the first codebook set information is used to indicate the first codebook set in the first codebook cluster, and the first codebook information is used to indicate the first codebook in the first codebook set.

With reference to the first possible implementation manner of the first aspect, in a second possible implementation manner of the first aspect, the first codebook information includes modulation order information of the first codebook, and modulation orders of codebooks included in the first codebook set are different.

With reference to the first aspect, in a third possible implementation manner of the first aspect, the determining codebook indication information used to indicate the first codebook includes: determining a second codebook set to which the first codebook belongs, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols; and determining the codebook indication information, where the codebook indication information includes second codebook set information and second codebook information, where the second codebook set information is used to indicate the second codebook set, and the second codebook information is used to indicate the first codebook in the second codebook set.

With reference to the third possible implementation manner of the first aspect, in a fourth possible implementation manner of the first aspect, the second codebook information includes modulation order information of the first codebook, and modulation orders of codebooks included in the second codebook set are different.

With reference to the first aspect, in a fifth possible implementation manner of the first aspect, the determining codebook indication information used to indicate the first codebook includes: determining a second codebook cluster to which the first codebook belongs, where each codebook cluster includes at least one codebook, and the codebook cluster meets a condition that codewords in a same codebook cluster have a same total quantity of modulation symbols; and determining the codebook indication information, where the codebook indication information includes second codebook cluster information and third codebook information, where the second codebook cluster information is used to indicate the second codebook cluster, and the third codebook information is used to indicate the first codebook in the second codebook cluster.

With reference to the first aspect, in a sixth possible implementation manner of the first aspect, the codebook indication information includes an index value of the first codebook.

With reference to the first aspect, in a seventh possible implementation manner of the first aspect, the determining codebook indication information used to indicate the first codebook includes: determining a first characteristic sequence to which the first codebook belongs and a first characteristic matrix to which the first characteristic sequence belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes first characteristic matrix information, first characteristic sequence information, and fourth codebook information, where the first characteristic matrix information is used to indicate the first characteristic matrix, the first characteristic sequence information is used to indicate the first characteristic sequence in the first characteristic matrix, and the fourth codebook information is used to indicate the first codebook of one or more codebooks corresponding to the first characteristic sequence.

With reference to the seventh possible implementation manner of the first aspect, in an eighth possible implementation manner of the first aspect, the fourth codebook information includes modulation order information of the first codebook, and modulation orders of the one or more codebooks corresponding to the first characteristic sequence are different.

With reference to the first aspect, in a ninth possible implementation manner of the first aspect, the determining codebook indication information used to indicate the first codebook includes: determining a second characteristic matrix to which the first codebook belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes second characteristic matrix information and fifth codebook information, where the second characteristic matrix information is used to indicate the second characteristic matrix, and the fifth codebook information is used to indicate the first codebook of one or more codebooks corresponding to the second characteristic matrix.

With reference to the first aspect, in a tenth possible implementation manner of the first aspect, the determining codebook indication information used to indicate the first codebook includes: determining a second characteristic sequence to which the first codebook belongs, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes second characteristic sequence information and sixth codebook information, where the second characteristic sequence information is used to indicate the second characteristic sequence, and the sixth codebook information is used to indicate the first codebook of one or more codebooks corresponding to the second characteristic sequence.

With reference to the tenth possible implementation manner of the first aspect, in an eleventh possible implementation manner of the first aspect, the sixth codebook information includes modulation order information of the first codebook, and modulation orders of the one or more codebooks corresponding to the second characteristic sequence are different.

With reference to the first aspect, in a twelfth possible implementation manner of the first aspect, the determining codebook indication information used to indicate the first codebook includes: determining a third codebook set to which the first codebook belongs and a third codebook cluster to which the third codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords; and determining the codebook indication information, where the codebook indication information includes third codebook cluster information, third codebook set information, and seventh codebook information, where the third codebook cluster information is used to indicate the third codebook cluster, the third codebook set information is used to indicate the third codebook set in the third codebook cluster, and the seventh codebook information is used to indicate the first codebook in the third codebook set.

With reference to the twelfth possible implementation manner of the first aspect, in a thirteenth possible implementation manner of the first aspect, the third codebook set information includes modulation order information of the first codebook, and modulation orders corresponding to codebook sets included in the third codebook cluster are different.

With reference to the first aspect, in a fourteenth possible implementation manner of the first aspect, the determining codebook indication information used to indicate the first codebook includes: determining a fourth codebook set to which the first codebook belongs, where each codebook set includes at least one codebook, and the codebook set meets a condition that codewords in a same codebook set have a same total quantity of modulation symbols and that codebooks in a same codebook set have a same total quantity of codewords; and determining the codebook indication information, where the codebook indication information includes fourth codebook set information and eighth codebook information, where the fourth codebook set information is used to indicate the fourth codebook set, and the eighth codebook information is used to indicate the first codebook in the fourth codebook set.

With reference to the first aspect, in a fifteenth possible implementation manner of the first aspect, the determining codebook indication information used to indicate the first codebook includes: determining a fifth codebook set to which the first codebook belongs and a third characteristic matrix to which the fifth codebook set belongs, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes third characteristic matrix information, fifth codebook set information, and ninth codebook information, where the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set.

With reference to the fifteenth possible implementation manner of the first aspect, in a sixteenth possible implementation manner of the first aspect, the fifth codebook set information includes modulation order information of the first codebook, and modulation orders corresponding to the one or more codebook sets corresponding to the third characteristic matrix are different.

With reference to any one of the first aspect or the first to the sixteenth possible implementation manners of the first aspect, in a seventeenth possible implementation manner of the first aspect, the sending the codebook indication information to the terminal device includes: sending an uplink scheduling authorization message, dedicated high-layer control signaling, or a system broadcast message to the terminal device, where the uplink scheduling authorization message, the dedicated high-layer control signaling, or the system broadcast message includes the codebook indication information.

With reference to the seventeenth possible implementation manner of the first aspect, in an eighteenth possible implementation manner of the first aspect, the dedicated high-layer control signaling includes a radio resource control RRC connection setup message and an RRC connection reconfiguration message.

With reference to any one of the first aspect or the first to the eighteenth possible implementation manners of the first aspect, in a nineteenth possible implementation manner of the first aspect, the codebook indication information is bit string information.

With reference to any one of the first aspect or the first to the nineteenth possible implementation manners of the first aspect, in a twentieth possible implementation manner of the first aspect, the codebook is a sparse code multiple access SCMA codebook.

With reference to the twentieth possible implementation manner of the first aspect, in a twenty-first possible implementation manner of the first aspect, a quantity of zero modulation symbols is greater than or equal to a quantity of non-zero modulation symbols in a codeword included in the codebook.

According to a second aspect, a method for transmitting indication information is provided. The method includes: receiving codebook indication information sent by a network device, where the codebook indication information is used to indicate a first codebook of one or more codebooks, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol. The method also includes determining the first codebook according to the codebook indication information; and sending an uplink data stream according to the first codebook.

With reference to the second aspect, in a first possible implementation manner of the second aspect, the codebook indication information includes first codebook cluster information, first codebook set information, and first codebook information, where the first codebook cluster information is used to indicate a first codebook cluster, the first codebook set information is used to indicate a first codebook set in the first codebook cluster, and the first codebook information is used to indicate the first codebook in the first codebook set; and the determining the first codebook according to the codebook indication information includes: determining the first codebook in the first codebook set included in the first codebook cluster according to the first codebook cluster information, the first codebook set information, and the first codebook information, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

With reference to the first possible implementation manner of the second aspect, in a second possible implementation manner of the second aspect, the first codebook information includes modulation order information of the first codebook, and modulation orders of codebooks included in the first codebook set are different.

With reference to the second aspect, in a third possible implementation manner of the second aspect, the codebook indication information includes second codebook set information and second codebook information, where the second codebook set information is used to indicate a second codebook set, and the second codebook information is used to indicate the first codebook in the second codebook set; and the determining the first codebook according to the codebook indication information includes: determining the first codebook in the second codebook set according to the second codebook set information and the second codebook information, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

With reference to the third possible implementation manner of the second aspect, in a fourth possible implementation manner of the second aspect, the second codebook information includes modulation order information of the first codebook, and modulation orders of codebooks included in the second codebook set are different.

With reference to the second aspect, in a fifth possible implementation manner of the second aspect, the codebook indication information includes second codebook cluster information and third codebook information, where the second codebook cluster information is used to indicate a second codebook cluster, and the third codebook information is used to indicate the first codebook in the second codebook cluster; and the determining the first codebook according to the codebook indication information includes: determining the first codebook in the second codebook cluster according to the second codebook cluster information and the third codebook information, where each codebook cluster includes at least one codebook, and the codebook cluster meets a condition that codewords in a same codebook cluster have a same total quantity of modulation symbols.

With reference to the second aspect, in a sixth possible implementation manner of the second aspect, the codebook indication information includes an index value of the first codebook; and the determining the first codebook according to the codebook indication information includes: determining the first codebook corresponding to the index value according to the index value.

With reference to the second aspect, in a seventh possible implementation manner of the second aspect, the codebook indication information includes first characteristic matrix information, first characteristic sequence information, and fourth codebook information, where the first characteristic matrix information is used to indicate a first characteristic matrix, the first characteristic sequence information is used to indicate a first characteristic sequence in the first characteristic matrix, and the fourth codebook information is used to indicate the first codebook of one or more codebooks corresponding to the first characteristic sequence; and the determining the first codebook according to the codebook indication information includes: determining the first codebook of the one or more codebooks corresponding to the first characteristic sequence in the first characteristic matrix according to the first characteristic matrix information, the first characteristic sequence information, and the fourth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the seventh possible implementation manner of the second aspect, in an eighth possible implementation manner of the second aspect, the fourth codebook information includes modulation order information of the first codebook, and modulation orders of the one or more codebooks corresponding to the first characteristic sequence are different.

With reference to the second aspect, in a ninth possible implementation manner of the second aspect, the codebook indication information includes second characteristic matrix information and fifth codebook information, where the second characteristic matrix information is used to indicate a second characteristic matrix, and the fifth codebook information is used to indicate the first codebook of one or more codebooks corresponding to the second characteristic matrix; and the determining the first codebook according to the codebook indication information includes: determining the first codebook of the one or more codebooks corresponding to the second characteristic matrix according to the second characteristic matrix information and the fifth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the second aspect, in a tenth possible implementation manner of the second aspect, the codebook indication information includes second characteristic sequence information and sixth codebook information, where the second characteristic sequence information is used to indicate a second characteristic sequence, and the sixth codebook information is used to indicate the first codebook of one or more codebooks corresponding to the second characteristic sequence; and the determining the first codebook according to the codebook indication information includes: determining the first codebook of the one or more codebooks corresponding to the second characteristic sequence according to the second characteristic sequence information and the sixth codebook information, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the tenth possible implementation manner of the second aspect, in an eleventh possible implementation manner of the second aspect, the sixth codebook information includes modulation order information of the first codebook, and modulation orders of the one or more codebooks corresponding to the second characteristic sequence are different.

With reference to the second aspect, in a twelfth possible implementation manner of the second aspect, the codebook indication information includes third codebook cluster information, third codebook set information, and seventh codebook information, where the third codebook cluster information is used to indicate a third codebook cluster, the third codebook set information is used to indicate a third codebook set in the third codebook cluster, and the seventh codebook information is used to indicate the first codebook in the third codebook set; and the determining the first codebook according to the codebook indication information includes: determining the first codebook in the third codebook set included in the third codebook cluster according to the third codebook cluster information, the third codebook set information, and the seventh codebook information, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

With reference to the twelfth possible implementation manner of the second aspect, in a thirteenth possible implementation manner of the second aspect, the third codebook set information includes modulation order information of the first codebook, and modulation orders corresponding to codebook sets included in the third codebook cluster are different.

With reference to the second aspect, in a fourteenth possible implementation manner of the second aspect, the codebook indication information includes fourth codebook set information and eighth codebook information, where the fourth codebook set information is used to indicate a fourth codebook set, and the eighth codebook information is used to indicate the first codebook in the fourth codebook set; and the determining the first codebook according to the codebook indication information includes: determining the first codebook in the fourth codebook set according to the fourth codebook set information and the eighth codebook information, where each codebook set includes at least one codebook, and the codebook set meets a condition that codewords in a same codebook set have a same total quantity of modulation symbols and that codebooks in a same codebook set have a same total quantity of codewords.

With reference to the second aspect, in a fifteenth possible implementation manner of the second aspect, the codebook indication information includes third characteristic matrix information, fifth codebook set information, and ninth codebook information, where the third characteristic matrix information is used to indicate a third characteristic matrix, the fifth codebook set information is used to indicate a fifth codebook set of one or more codebook sets corresponding to the third characteristic matrix, and the ninth codebook information is used to indicate the first codebook in the fifth codebook set; and the determining the first codebook according to the codebook indication information includes: determining the first codebook in the fifth codebook set of one or more codebook sets corresponding to the third characteristic matrix according to the third characteristic matrix information, the fifth codebook set information, and the ninth codebook information, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the fifteenth possible implementation manner of the second aspect, in a sixteenth possible implementation manner of the second aspect, the fifth codebook set information includes modulation order information of the first codebook, and modulation orders corresponding to the one or more codebook sets corresponding to the third characteristic matrix are different.

With reference to any one of the second aspect or the first to the sixteenth possible implementation manners of the second aspect, in a seventeenth possible implementation manner of the second aspect, the receiving codebook indication information sent by a network device includes: receiving an uplink scheduling authorization message, dedicated high-layer control signaling, or a system broadcast message sent by the network device, where the uplink scheduling authorization message, the dedicated high-layer control signaling, or the system broadcast message includes the codebook indication information.

With reference to the seventeenth possible implementation manner of the second aspect, in an eighteenth possible implementation manner of the second aspect, the dedicated high-layer control signaling includes a radio resource control RRC connection setup message and an RRC connection reconfiguration message.

With reference to any one of the second aspect or the first to the eighteenth possible implementation manners of the second aspect, in a nineteenth possible implementation manner of the second aspect, the codebook indication information is bit string information.

With reference to any one of the second aspect or the first to the nineteenth possible implementation manners of the second aspect, in a twentieth possible implementation manner of the second aspect, the codebook is a sparse code multiple access SCMA codebook.

With reference to the twentieth possible implementation manner of the second aspect, in a twenty-first possible implementation manner of the second aspect, a quantity of zero modulation symbols is greater than or equal to a quantity of non-zero modulation symbols in a codeword included in the codebook.

According to a third aspect, an apparatus for transmitting indication information is provided. The apparatus includes: a first determining module, configured to determine, according to one or more codebooks, a first codebook to be used by a terminal device to send an uplink data stream, where the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol. The apparatus also includes a second determining module, configured to determine codebook indication information used to indicate the first codebook determined by the first determining module; and a sending module, configured to send the codebook indication information determined by the second determining module to the terminal device.

With reference to the third aspect, in a first possible implementation manner of the third aspect, the second determining module includes: a first determining unit, configured to determine a first codebook set to which the first codebook belongs and a first codebook cluster to which the first codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols; and a second determining unit, configured to determine the codebook indication information, where the codebook indication information includes first codebook cluster information, first codebook set information, and first codebook information, where the first codebook cluster information is used to indicate the first codebook cluster, the first codebook set information is used to indicate the first codebook set in the first codebook cluster, and the first codebook information is used to indicate the first codebook in the first codebook set.

With reference to the first possible implementation manner of the third aspect, in a second possible implementation manner of the third aspect, the first codebook information determined by the second determining unit includes modulation order information of the first codebook, and modulation orders of codebooks included in the first codebook set are different.

With reference to the third aspect, in a third possible implementation manner of the third aspect, the second determining module includes: a third determining unit, configured to determine a second codebook set to which the first codebook belongs, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols; and a fourth determining unit, configured to determine the codebook indication information, where the codebook indication information includes second codebook set information and second codebook information, where the second codebook set information is used to indicate the second codebook set, and the second codebook information is used to indicate the first codebook in the second codebook set.

With reference to the third possible implementation manner of the third aspect, in a fourth possible implementation manner of the third aspect, the second codebook information determined by the fourth determining unit includes modulation order information of the first codebook, and modulation orders of codebooks included in the second codebook set are different.

With reference to the third aspect, in a fifth possible implementation manner of the third aspect, the second determining module includes: a fifth determining unit, configured to determine a second codebook cluster to which the first codebook belongs, where each codebook cluster includes at least one codebook, and the codebook cluster meets a condition that codewords in a same codebook cluster have a same total quantity of modulation symbols; and a sixth determining unit, configured to determine the codebook indication information, where the codebook indication information includes second codebook cluster information and third codebook information, where the second codebook cluster information is used to indicate the second codebook cluster, and the third codebook information is used to indicate the first codebook in the second codebook cluster.

With reference to the third aspect, in a sixth possible implementation manner of the third aspect, the codebook indication information determined by the second determining module includes an index value of the first codebook.

With reference to the third aspect, in a seventh possible implementation manner of the third aspect, the second determining module includes: a seventh determining unit, configured to determine a first characteristic sequence to which the first codebook belongs and a first characteristic matrix to which the first characteristic sequence belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and an eighth determining unit, configured to determine the codebook indication information, where the codebook indication information includes first characteristic matrix information, first characteristic sequence information, and fourth codebook information, where the first characteristic matrix information is used to indicate the first characteristic matrix, the first characteristic sequence information is used to indicate the first characteristic sequence in the first characteristic matrix, and the fourth codebook information is used to indicate the first codebook of one or more codebooks corresponding to the first characteristic sequence.

With reference to the seventh possible implementation manner of the third aspect, in an eighth possible implementation manner of the third aspect, the fourth codebook information determined by the eighth determining unit includes modulation order information of the first codebook, and modulation orders of the one or more codebooks corresponding to the first characteristic sequence are different.

With reference to the third aspect, in a ninth possible implementation manner of the third aspect, the second determining module includes: a ninth determining unit, configured to determine a second characteristic matrix to which the first codebook belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and a tenth determining unit, configured to determine the codebook indication information, where the codebook indication information includes second characteristic matrix information and fifth codebook information, where the second characteristic matrix information is used to indicate the second characteristic matrix, and the fifth codebook information is used to indicate the first codebook of one or more codebooks corresponding to the second characteristic matrix.

With reference to the third aspect, in a tenth possible implementation manner of the third aspect, the second determining module includes: an eleventh determining unit, configured to determine a second characteristic sequence to which the first codebook belongs, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and a twelfth determining unit, configured to determine the codebook indication information, where the codebook indication information includes second characteristic sequence information and sixth codebook information, where the second characteristic sequence information is used to indicate the second characteristic sequence, and the sixth codebook information is used to indicate the first codebook of one or more codebooks corresponding to the second characteristic sequence.

With reference to the tenth possible implementation manner of the third aspect, in an eleventh possible implementation manner of the third aspect, the sixth codebook information determined by the twelfth determining unit includes modulation order information of the first codebook, and modulation orders of the one or more codebooks corresponding to the second characteristic sequence are different.

With reference to the third aspect, in a twelfth possible implementation manner of the third aspect, the second determining module includes: a thirteenth determining unit, configured to determine a third codebook set to which the first codebook belongs and a third codebook cluster to which the third codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords; and a fourteenth determining unit, configured to determine the codebook indication information, where the codebook indication information includes third codebook cluster information, third codebook set information, and seventh codebook information, where the third codebook cluster information is used to indicate the third codebook cluster, the third codebook set information is used to indicate the third codebook set in the third codebook cluster, and the seventh codebook information is used to indicate the first codebook in the third codebook set.

With reference to the twelfth possible implementation manner of the third aspect, in a thirteenth possible implementation manner of the third aspect, the third codebook set information determined by the thirteenth determining unit includes modulation order information of the first codebook, and modulation orders corresponding to codebook sets included in the third codebook cluster are different.

With reference to the third aspect, in a fourteenth possible implementation manner of the third aspect, the second determining module includes: a fifteenth determining unit, configured to determine a fourth codebook set to which the first codebook belongs, where each codebook set includes at least one codebook, and the codebook set meets a condition that codewords in a same codebook set have a same total quantity of modulation symbols and that codebooks in a same codebook set have a same total quantity of codewords; and a sixteenth determining unit, configured to determine the codebook indication information, where the codebook indication information includes fourth codebook set information and eighth codebook information, where the fourth codebook set information is used to indicate the fourth codebook set, and the eighth codebook information is used to indicate the first codebook in the fourth codebook set.

With reference to the third aspect, in a fifteenth possible implementation manner of the third aspect, the second determining module includes: a seventeenth determining unit, configured to determine a fifth codebook set to which the first codebook belongs and a third characteristic matrix to which the fifth codebook set belongs, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and an eighteenth determining unit, configured to determine the codebook indication information, where the codebook indication information includes third characteristic matrix information, fifth codebook set information, and ninth codebook information, where the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set.

With reference to the fifteenth possible implementation manner of the third aspect, in a sixteenth possible implementation manner of the third aspect, the fifth codebook set information determined by the seventeenth determining unit includes modulation order information of the first codebook, and modulation orders corresponding to the one or more codebook sets corresponding to the third characteristic matrix are different.

With reference to any one of the third aspect or the first to the sixteenth possible implementation manners of the third aspect, in a seventeenth possible implementation manner of the third aspect, the sending module is specifically configured to send an uplink scheduling authorization message, dedicated high-layer control signaling, or a system broadcast message to the terminal device, where the uplink scheduling authorization message, the dedicated high-layer control signaling, or the system broadcast message includes the codebook indication information.

With reference to the seventeenth possible implementation manner of the third aspect, in an eighteenth possible implementation manner of the third aspect, the dedicated high-layer control signaling includes a radio resource control RRC connection setup message and an RRC connection reconfiguration message.

With reference to any one of the third aspect or the first to the eighteenth possible implementation manners of the third aspect, in a nineteenth possible implementation manner of the third aspect, the codebook indication information sent by the sending module is bit string information.

With reference to any one of the third aspect or the first to the nineteenth possible implementation manners of the third aspect, in a twentieth possible implementation manner of the third aspect, the codebook is a sparse code multiple access SCMA codebook.

With reference to the twentieth possible implementation manner of the third aspect, in a twenty-first possible implementation manner of the third aspect, a quantity of zero modulation symbols is greater than or equal to a quantity of non-zero modulation symbols in a codeword included in the codebook.

With reference to any one of the third aspect or the first to the twenty-first possible implementation manners of the third aspect, in a twenty-second possible implementation manner of the third aspect, the apparatus is a network device.

According to a fourth aspect, an apparatus for transmitting indication information is provided. The apparatus includes: a receiving module, configured to receive codebook indication information sent by a network device, where the codebook indication information is used to indicate a first codebook of one or more codebooks, the codebook includes two or more codewords, the codeword is a multi-dimensional complex vector and is used to represent a mapping relationship between data and at least two modulation symbols, and the at least two modulation symbols include at least one zero modulation symbol and at least one non-zero modulation symbol. The apparatus also includes a determining module, configured to determine the first codebook according to the codebook indication information received by the receiving module. The apparatus also includes a sending module, configured to send an uplink data stream according to the first codebook determined by the determining module.

With reference to the fourth aspect, in a first possible implementation manner of the fourth aspect, the codebook indication information received by the receiving module includes first codebook cluster information, first codebook set information, and first codebook information, where the first codebook cluster information is used to indicate a first codebook cluster, the first codebook set information is used to indicate a first codebook set in the first codebook cluster, and the first codebook information is used to indicate the first codebook in the first codebook set; and the determining module includes: a first determining unit, configured to determine the first codebook in the first codebook set included in the first codebook cluster according to the first codebook cluster information, the first codebook set information, and the first codebook information, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

With reference to the first possible implementation manner of the fourth aspect, in a second possible implementation manner of the fourth aspect, the first codebook information received by the receiving module includes modulation order information of the first codebook, and modulation orders of codebooks included in the first codebook set are different.

With reference to the fourth aspect, in a third possible implementation manner of the fourth aspect, the codebook indication information received by the receiving module includes second codebook set information and second codebook information, where the second codebook set information is used to indicate a second codebook set, and the second codebook information is used to indicate the first codebook in the second codebook set; and the determining module includes: a second determining unit, configured to determine the first codebook in the second codebook set according to the second codebook set information and the second codebook information, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

With reference to the third possible implementation manner of the fourth aspect, in a fourth possible implementation manner of the fourth aspect, the second codebook information received by the receiving module includes modulation order information of the first codebook, and modulation orders of codebooks included in the second codebook set are different.

With reference to the fourth aspect, in a fifth possible implementation manner of the fourth aspect, the codebook indication information received by the receiving module includes second codebook cluster information and third codebook information, where the second codebook cluster information is used to indicate a second codebook cluster, and the third codebook information is used to indicate the first codebook in the second codebook cluster; and the determining module includes: a third determining unit, configured to determine the first codebook in the second codebook cluster according to the second codebook cluster information and the third codebook information, where each codebook cluster includes at least one codebook, and the codebook cluster meets a condition that codewords in a same codebook cluster have a same total quantity of modulation symbols.

With reference to the fourth aspect, in a sixth possible implementation manner of the fourth aspect, the codebook indication information received by the receiving module includes an index value of the first codebook; and the determining module includes: a fourth determining unit, configured to determine the first codebook corresponding to the index value according to the index value.

With reference to the fourth aspect, in a seventh possible implementation manner of the fourth aspect, the codebook indication information received by the receiving module includes first characteristic matrix information, first characteristic sequence information, and fourth codebook information, where the first characteristic matrix information is used to indicate a first characteristic matrix, the first characteristic sequence information is used to indicate a first characteristic sequence in the first characteristic matrix, and the fourth codebook information is used to indicate the first codebook of one or more codebooks corresponding to the first characteristic sequence; and the determining module includes: a fifth determining unit, configured to determine the first codebook of the one or more codebooks corresponding to the first characteristic sequence in the first characteristic matrix according to the first characteristic matrix information, the first characteristic sequence information, and the fourth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the seventh possible implementation manner of the fourth aspect, in an eighth possible implementation manner of the fourth aspect, the fourth codebook information received by the receiving module includes modulation order information of the first codebook, and modulation orders of the one or more codebooks corresponding to the first characteristic sequence are different.

With reference to the fourth aspect, in a ninth possible implementation manner of the fourth aspect, the codebook indication information received by the receiving module includes second characteristic matrix information and fifth codebook information, where the second characteristic matrix information is used to indicate a second characteristic matrix, and the fifth codebook information is used to indicate the first codebook of one or more codebooks corresponding to the second characteristic matrix; and the determining module includes: a sixth determining unit, configured to determine the first codebook of the one or more codebooks corresponding to the second characteristic matrix according to the second characteristic matrix information and the fifth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the fourth aspect, in a tenth possible implementation manner of the fourth aspect, the codebook indication information received by the receiving module includes second characteristic sequence information and sixth codebook information, where the second characteristic sequence information is used to indicate a second characteristic sequence, and the sixth codebook information is used to indicate the first codebook of one or more codebooks corresponding to the second characteristic sequence; and the determining module includes: a seventh determining unit, configured to determine the first codebook of the one or more codebooks corresponding to the second characteristic sequence according to the second characteristic sequence information and the sixth codebook information, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the tenth possible implementation manner of the fourth aspect, in an eleventh possible implementation manner of the fourth aspect, the sixth codebook information received by the receiving module includes modulation order information of the first codebook, and modulation orders of the one or more codebooks corresponding to the second characteristic sequence are different.

With reference to the fourth aspect, in a twelfth possible implementation manner of the fourth aspect, the codebook indication information received by the receiving module includes third codebook cluster information, third codebook set information, and seventh codebook information, where the third codebook cluster information is used to indicate a third codebook cluster, the third codebook set information is used to indicate a third codebook set in the third codebook cluster, and the seventh codebook information is used to indicate the first codebook in the third codebook set; and the determining module includes: an eighth determining unit, configured to determine the first codebook in the third codebook set included in the third codebook cluster according to the third codebook cluster information, the third codebook set information, and the seventh codebook information, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

With reference to the twelfth possible implementation manner of the fourth aspect, in a thirteenth possible implementation manner of the fourth aspect, the third codebook set information received by the receiving module includes modulation order information of the first codebook, and modulation orders corresponding to codebook sets included in the third codebook cluster are different.

With reference to the fourth aspect, in a fourteenth possible implementation manner of the fourth aspect, the codebook indication information received by the receiving module includes fourth codebook set information and eighth codebook information, where the fourth codebook set information is used to indicate a fourth codebook set, and the eighth codebook information is used to indicate the first codebook in the fourth codebook set; and the determining module includes: a ninth determining unit, configured to determine the first codebook in the fourth codebook set according to the fourth codebook set information and the eighth codebook information, where each codebook set includes at least one codebook, and the codebook set meets a condition that codewords in a same codebook set have a same total quantity of modulation symbols and that codebooks in a same codebook set have a same total quantity of codewords.

With reference to the fourth aspect, in a fifteenth possible implementation manner of the fourth aspect, the codebook indication information received by the receiving module includes third characteristic matrix information, fifth codebook set information, and ninth codebook information, where the third characteristic matrix information is used to indicate a third characteristic matrix, the fifth codebook set information is used to indicate a fifth codebook set of one or more codebook sets corresponding to the third characteristic matrix, and the ninth codebook information is used to indicate the first codebook in the fifth codebook set; and the determining module includes: a tenth determining unit, configured to determine the first codebook in the fifth codebook set of one or more codebook sets corresponding to the third characteristic matrix according to the third characteristic matrix information, the fifth codebook set information, and the ninth codebook information, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the fifteenth possible implementation manner of the fourth aspect, in a sixteenth possible implementation manner of the fourth aspect, the fifth codebook set information received by the receiving module includes modulation order information of the first codebook, and modulation orders corresponding to the one or more codebook sets corresponding to the third characteristic matrix are different.

With reference to any one of the fourth aspect or the first to the sixteenth possible implementation manners of the fourth aspect, in a seventeenth possible implementation manner of the fourth aspect, the receiving module is specifically configured to receive an uplink scheduling authorization message, dedicated high-layer control signaling, or a system broadcast message sent by the network device, where the uplink scheduling authorization message, the dedicated high-layer control signaling, or the system broadcast message includes the codebook indication information.

With reference to the seventeenth possible implementation manner of the fourth aspect, in an eighteenth possible implementation manner of the fourth aspect, the dedicated high-layer control signaling includes a radio resource control RRC connection setup message and an RRC connection reconfiguration message.

With reference to any one of the fourth aspect or the first to the eighteenth possible implementation manners of the fourth aspect, in a nineteenth possible implementation manner of the fourth aspect, the codebook indication information received by the receiving module is bit string information.

With reference to any one of the fourth aspect or the first to the nineteenth possible implementation manners of the fourth aspect, in a twentieth possible implementation manner of the fourth aspect, the codebook is a sparse code multiple access SCMA codebook.

With reference to the twentieth possible implementation manner of the fourth aspect, in a twenty-first possible implementation manner of the fourth aspect, a quantity of zero modulation symbols is greater than or equal to a quantity of non-zero modulation symbols in a codeword included in the codebook.

With reference to any one of the fourth aspect or the first to the twenty-first possible implementation manners of the fourth aspect, in a twenty-second possible implementation manner of the fourth aspect, the apparatus is a terminal device.

According to a fifth aspect, an apparatus for transmitting indication information is provided. The apparatus includes: a processor, a memory, a bus system, and a transmitter, where the processor, the memory, and the transmitter are connected by using the bus system, the memory is configured to store an instruction, and the processor is configured to execute the instruction stored in the memory, to control the transmitter to send a signal. The processor is configured to: determine, according to one or more codebooks, a first codebook to be used by a terminal device to send an uplink data stream, where the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol; and determine codebook indication information used to indicate the first codebook; and the transmitter is configured to send the codebook indication information to the terminal device.

With reference to the fifth aspect, in a first possible implementation manner of the fifth aspect, the determining, by the processor, the codebook indication information used to indicate the first codebook includes: determining a first codebook set to which the first codebook belongs and a first codebook cluster to which the first codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols; and determining the codebook indication information, where the codebook indication information includes first codebook cluster information, first codebook set information, and first codebook information, where the first codebook cluster information is used to indicate the first codebook cluster, the first codebook set information is used to indicate the first codebook set in the first codebook cluster, and the first codebook information is used to indicate the first codebook in the first codebook set.

With reference to the first possible implementation manner of the fifth aspect, in a second possible implementation manner of the fifth aspect, the first codebook information determined by the processor includes modulation order information of the first codebook, and modulation orders of codebooks included in the first codebook set are different.

With reference to the fifth aspect, in a third possible implementation manner of the fifth aspect, the determining, by the processor, the codebook indication information used to indicate the first codebook includes: determining a second codebook set to which the first codebook belongs, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols; and determining the codebook indication information, where the codebook indication information includes second codebook set information and second codebook information, where the second codebook set information is used to indicate the second codebook set, and the second codebook information is used to indicate the first codebook in the second codebook set.

With reference to the third possible implementation manner of the fifth aspect, in a fourth possible implementation manner of the fifth aspect, the second codebook information determined by the processor includes modulation order information of the first codebook, and modulation orders of codebooks included in the second codebook set are different.

With reference to the fifth aspect, in a fifth possible implementation manner of the fifth aspect, the determining, by the processor, the codebook indication information used to indicate the first codebook includes: determining a second codebook cluster to which the first codebook belongs, where each codebook cluster includes at least one codebook, and the codebook cluster meets a condition that codewords in a same codebook cluster have a same total quantity of modulation symbols; and determining the codebook indication information, where the codebook indication information includes second codebook cluster information and third codebook information, where the second codebook cluster information is used to indicate the second codebook cluster, and the third codebook information is used to indicate the first codebook in the second codebook cluster.

With reference to the fifth aspect, in a sixth possible implementation manner of the fifth aspect, the codebook indication information determined by the processor includes an index value of the first codebook.

With reference to the fifth aspect, in a seventh possible implementation manner of the fifth aspect, the determining, by the processor, the codebook indication information used to indicate the first codebook includes: determining a first characteristic sequence to which the first codebook belongs and a first characteristic matrix to which the first characteristic sequence belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes first characteristic matrix information, first characteristic sequence information, and fourth codebook information, where the first characteristic matrix information is used to indicate the first characteristic matrix, the first characteristic sequence information is used to indicate the first characteristic sequence in the first characteristic matrix, and the fourth codebook information is used to indicate the first codebook of one or more codebooks corresponding to the first characteristic sequence.

With reference to the seventh possible implementation manner of the fifth aspect, in an eighth possible implementation manner of the fifth aspect, the fourth codebook information determined by the processor includes modulation order information of the first codebook, and modulation orders of the one or more codebooks corresponding to the first characteristic sequence are different.

With reference to the fifth aspect, in a ninth possible implementation manner of the fifth aspect, the determining, by the processor, the codebook indication information used to indicate the first codebook includes: determining a second characteristic matrix to which the first codebook belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes second characteristic matrix information and fifth codebook information, where the second characteristic matrix information is used to indicate the second characteristic matrix, and the fifth codebook information is used to indicate the first codebook of one or more codebooks corresponding to the second characteristic matrix.

With reference to the fifth aspect, in a tenth possible implementation manner of the fifth aspect, the determining, by the processor, the codebook indication information used to indicate the first codebook includes: determining a second characteristic sequence to which the first codebook belongs, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes second characteristic sequence information and sixth codebook information, where the second characteristic sequence information is used to indicate the second characteristic sequence, and the sixth codebook information is used to indicate the first codebook of one or more codebooks corresponding to the second characteristic sequence.

With reference to the tenth possible implementation manner of the fifth aspect, in an eleventh possible implementation manner of the fifth aspect, the sixth codebook information determined by the processor includes modulation order information of the first codebook, and codebooks of at least one codebook of the one or more codebooks corresponding to the second characteristic sequence have different modulation orders.

With reference to the fifth aspect, in a twelfth possible implementation manner of the fifth aspect, the determining, by the processor, the codebook indication information used to indicate the first codebook includes: determining a third codebook set to which the first codebook belongs and a third codebook cluster to which the third codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords; and determining the codebook indication information, where the codebook indication information includes third codebook cluster information, third codebook set information, and seventh codebook information, where the third codebook cluster information is used to indicate the third codebook cluster, the third codebook set information is used to indicate the third codebook set in the third codebook cluster, and the seventh codebook information is used to indicate the first codebook in the third codebook set.

With reference to the twelfth possible implementation manner of the fifth aspect, in a thirteenth possible implementation manner of the fifth aspect, the third codebook set information determined by the processor includes modulation order information of the first codebook, and modulation orders corresponding to codebook sets included in the third codebook cluster are different.

With reference to the fifth aspect, in a fourteenth possible implementation manner of the fifth aspect, the determining, by the processor, the codebook indication information used to indicate the first codebook includes: determining a fourth codebook set to which the first codebook belongs, where each codebook set includes at least one codebook, and the codebook set meets a condition that codewords in a same codebook set have a same total quantity of modulation symbols and that codebooks in a same codebook set have a same total quantity of codewords; and determining the codebook indication information, where the codebook indication information includes fourth codebook set information and eighth codebook information, where the fourth codebook set information is used to indicate the fourth codebook set, and the eighth codebook information is used to indicate the first codebook in the fourth codebook set.

With reference to the fifth aspect, in a fifteenth possible implementation manner of the fifth aspect, the determining, by the processor, the codebook indication information used to indicate the first codebook includes: determining a fifth codebook set to which the first codebook belongs and a third characteristic matrix to which the fifth codebook set belongs, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element $0$ and an element $1$, the element $0$ represents that modulation symbols that are of all codewords in a corresponding codebook and that are in a position corresponding to the element $0$ are all zero modulation symbols, and the element $1$ represents that modulation symbols that are of all codewords in a corresponding codebook and that are in a position corresponding to the element $1$ are not all zero modulation symbols or are all non-zero modulation symbols; and determining the codebook indication information, where the codebook indication information includes third characteristic matrix information, fifth codebook set information, and ninth codebook information, the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set.

With reference to the fifteenth possible implementation manner of the fifth aspect, in a sixteenth possible implementation manner of the fifth aspect, the fifth codebook set information determined by the processor includes modulation order information of the first codebook, and modulation orders corresponding to the one or more codebook sets corresponding to the third characteristic matrix are different.

With reference to any one of the fifth aspect or the first to the sixteenth possible implementation manners of the fifth aspect, in a seventeenth possible implementation manner of the fifth aspect, the sending, by the transmitter, the codebook indication information to the terminal device includes: sending an uplink scheduling authorization message, dedicated high-layer control signaling, or a system broadcast message to the terminal device, where the uplink scheduling authorization message, the dedicated high-layer control signaling, or the system broadcast message includes the codebook indication information.

With reference to the seventeenth possible implementation manner of the fifth aspect, in an eighteenth possible implementation manner of the fifth aspect, the dedicated high-layer control signaling includes a radio resource control RRC connection setup message and an RRC connection reconfiguration message.

With reference to any one of the fifth aspect or the first to the eighteenth possible implementation manners of the fifth aspect, in a nineteenth possible implementation manner of the fifth aspect, the codebook indication information sent by the transmitter is bit string information.

With reference to any one of the fifth aspect or the first to the nineteenth possible implementation manners of the fifth aspect, in a twentieth possible implementation manner of the fifth aspect, the codebook is a sparse code multiple access SCMA codebook.

With reference to the twentieth possible implementation manner of the fifth aspect, in a twenty-first possible implementation manner of the fifth aspect, a quantity of elements $0$ is greater than or equal to a quantity of modulation symbols in a codeword included in the codebook.

With reference to any one of the fifth aspect or the first to the twenty-first possible implementation manners of the fifth aspect, in a twenty-second possible implementation manner of the fifth aspect, the apparatus is a network device.

According to a sixth aspect, an apparatus for transmitting indication information is provided. The apparatus includes: a processor, a memory, a bus system, a receiver, and a transmitter, where the processor, the memory, the receiver, and the transmitter are connected by using the bus system, the memory is configured to store an instruction, and the processor is configured to execute the instruction stored in the memory, to control the receiver to receive a signal, and to control the transmitter to send a signal, where the receiver is configured to receive codebook indication information sent by a network device, where the codebook indication information is used to indicate a first codebook of one or more codebooks, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol; the processor is configured to determine the first codebook according to the codebook indication information; and the transmitter is configured to send an uplink data stream according to the first codebook.

With reference to the sixth aspect, in a first possible implementation manner of the sixth aspect, the codebook indication information received by the receiver includes first codebook cluster information, first codebook set information, and first codebook information, where the first codebook cluster information is used to indicate a first codebook cluster, the first codebook set information is used to indicate a first codebook set in the first codebook cluster, and the first codebook information is used to indicate the first codebook in the first codebook set; and the determining, by the processor, the first codebook according to the codebook indication information includes: determining the first codebook in the first codebook set included in the first codebook cluster according to the first codebook cluster information, the first codebook set information, and the first codebook information, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

With reference to the first possible implementation manner of the sixth aspect, in a second possible implementation manner of the sixth aspect, the first codebook information received by the receiver includes modulation order information of the first codebook, and modulation orders of codebooks included in the first codebook set are different.

With reference to the sixth aspect, in a third possible implementation manner of the sixth aspect, the codebook indication information received by the receiver includes second codebook set information and second codebook information, where the second codebook set information is used to indicate a second codebook set, and the second codebook information is used to indicate the first codebook in the second codebook set; and the determining, by the processor, the first codebook according to the codebook indication information includes: determining the first codebook in the second codebook set according to the second codebook set information and the second codebook information, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

With reference to the third possible implementation manner of the sixth aspect, in a fourth possible implementation manner of the sixth aspect, the second codebook information received by the receiver includes modulation order information of the first codebook, and modulation orders of codebooks included in the second codebook set are different.

With reference to the sixth aspect, in a fifth possible implementation manner of the sixth aspect, the codebook indication information received by the receiver includes second codebook cluster information and third codebook information, where the second codebook cluster information is used to indicate a second codebook cluster, and the third codebook information is used to indicate the first codebook in the second codebook cluster; and the determining, by the processor, the first codebook according to the codebook indication information includes: determining the first codebook in the second codebook cluster according to the second codebook cluster information and the third codebook information, where each codebook cluster includes at least one codebook, and the codebook cluster meets a condition that codewords in a same codebook cluster have a same total quantity of modulation symbols.

With reference to the sixth aspect, in a sixth possible implementation manner of the sixth aspect, the codebook indication information received by the receiver includes an index value of the first codebook; and the determining, by the processor, the first codebook according to the codebook indication information includes: determining the first codebook corresponding to the index value according to the index value.

With reference to the sixth aspect, in a seventh possible implementation manner of the sixth aspect, the codebook indication information received by the receiver includes first characteristic matrix information, first characteristic sequence information, and fourth codebook information, where the first characteristic matrix information is used to indicate a first characteristic matrix, the first characteristic sequence information is used to indicate a first characteristic sequence in the first characteristic matrix, and the fourth codebook information is used to indicate the first codebook of one or more codebooks corresponding to the first characteristic sequence; and the determining, by the processor, the first codebook according to the codebook indication information includes: determining the first codebook of the one or more codebooks corresponding to the first characteristic sequence in the first characteristic matrix according to the first characteristic matrix information, the first characteristic sequence information, and the fourth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the seventh possible implementation manner of the sixth aspect, in an eighth possible implementation manner of the sixth aspect, the fourth codebook information received by the receiver includes modulation order information of the first codebook, and modulation orders of the one or more codebooks corresponding to the first characteristic sequence are different.

With reference to the sixth aspect, in a ninth possible implementation manner of the sixth aspect, the codebook indication information received by the receiver includes second characteristic matrix information and fifth codebook information, where the second characteristic matrix information is used to indicate a second characteristic matrix, and the fifth codebook information is used to indicate the first codebook of one or more codebooks corresponding to the second characteristic matrix; and the determining, by the processor, the first codebook according to the codebook indication information includes: determining the first codebook of the one or more codebooks corresponding to the second characteristic matrix according to the second characteristic matrix information and the fifth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the sixth aspect, in a tenth possible implementation manner of the sixth aspect, the codebook indication information received by the receiver includes second characteristic sequence information and sixth codebook information, where the second characteristic sequence information is used to indicate a second characteristic sequence, and the sixth codebook information is used to indicate the first codebook of one or more codebooks corresponding to the second characteristic sequence; and the determining, by the processor, the first codebook according to the codebook indication information includes: determining the first codebook of the one or more codebooks corresponding to the second characteristic sequence according to the second characteristic sequence information and the sixth codebook information, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the tenth possible implementation manner of the sixth aspect, in an eleventh possible implementation manner of the sixth aspect, the sixth codebook information received by the receiver includes modulation order information of the first codebook, and modulation orders of the one or more codebooks corresponding to the second characteristic sequence are different.

With reference to the sixth aspect, in a twelfth possible implementation manner of the sixth aspect, the codebook indication information received by the receiver includes third codebook cluster information, third codebook set information, and seventh codebook information, where the third codebook cluster information is used to indicate a third codebook cluster, the third codebook set information is used to indicate a third codebook set in the third codebook cluster, and the seventh codebook information is used to indicate the first codebook in the third codebook set; and the determining, by the processor, the first codebook according to the codebook indication information includes: determining the first codebook in the third codebook set included in the third codebook cluster according to the third codebook cluster information, the third codebook set information, and the seventh codebook information, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

With reference to the twelfth possible implementation manner of the sixth aspect, in a thirteenth possible implementation manner of the sixth aspect, the third codebook set information received by the receiver includes modulation order information of the first codebook, and modulation orders corresponding to codebook sets included in the third codebook cluster are different.

With reference to the sixth aspect, in a fourteenth possible implementation manner of the sixth aspect, the codebook indication information received by the receiver includes fourth codebook set information and eighth codebook information, where the fourth codebook set information is used to indicate a fourth codebook set, and the eighth codebook information is used to indicate the first codebook in the fourth codebook set; and the determining, by the processor, the first codebook according to the codebook indication information includes: determining the first codebook in the fourth codebook set according to the fourth codebook set information and the eighth codebook information, where each codebook set includes at least one codebook, and the codebook set meets a condition that codewords in a same codebook set have a same total quantity of modulation symbols and that codebooks in a same codebook set have a same total quantity of codewords.

With reference to the sixth aspect, in a fifteenth possible implementation manner of the sixth aspect, the codebook indication information received by the receiver includes third characteristic matrix information, fifth codebook set information, and ninth codebook information, where the third characteristic matrix information is used to indicate a third characteristic matrix, the fifth codebook set information is used to indicate a fifth codebook set of one or more codebook sets corresponding to the third characteristic matrix, and the ninth codebook information is used to indicate the first codebook in the fifth codebook set; and the determining, by the processor, the first codebook according to the codebook indication information includes: determining the first codebook in the fifth codebook set of one or more codebook sets corresponding to the third characteristic matrix according to the third characteristic matrix information, the fifth codebook set information, and the ninth codebook information, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

With reference to the fifteenth possible implementation manner of the sixth aspect, in a sixteenth possible implementation manner of the sixth aspect, the fifth codebook set information received by the receiver includes modulation order information of the first codebook, and modulation orders corresponding to the one or more codebook sets corresponding to the third characteristic matrix are different.

With reference to any one of the sixth aspect or the first to the sixteenth possible implementation manners of the sixth aspect, in a seventeenth possible implementation manner of the sixth aspect, the receiving, by the receiver, the codebook indication information sent by the network device includes: receiving an uplink scheduling authorization message, dedicated high-layer control signaling, or a system broadcast message sent by the network device, where the uplink scheduling authorization message, the dedicated high-layer control signaling, or the system broadcast message includes the codebook indication information.

With reference to the seventeenth possible implementation manner of the sixth aspect, in an eighteenth possible implementation manner of the sixth aspect, the dedicated high-layer control signaling includes a radio resource control RRC connection setup message and an RRC connection reconfiguration message.

With reference to any one of the sixth aspect or the first to the eighteenth possible implementation manners of the sixth aspect, in a nineteenth possible implementation manner of the sixth aspect, the codebook indication information received by the receiver is bit string information.

With reference to any one of the sixth aspect or the first to the nineteenth possible implementation manners of the sixth aspect, in a twentieth possible implementation manner of the sixth aspect, the codebook is a sparse code multiple access SCMA codebook.

With reference to the twentieth possible implementation manner of the sixth aspect, in a twenty-first possible implementation manner of the sixth aspect, a quantity of elements 0 is greater than or equal to a quantity of modulation symbols in a codeword included in the codebook.

With reference to any one of the sixth aspect or the first to the twenty-first possible implementation manners of the sixth aspect, in a twenty-second possible implementation manner of the sixth aspect, the apparatus is a terminal device.

Based on the foregoing technical solutions, for the method and the apparatus for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3 is a schematic flowchart of a method for transmitting indication information according to an embodiment of the present invention;

FIG. 4 is a schematic flowchart of a method for determining codebook indication information according to an embodiment of the present invention;

FIG. 5 is another schematic flowchart of a method for determining codebook indication information according to an embodiment of the present invention;

FIG. 6 is still another schematic flowchart of a method for determining codebook indication information according to an embodiment of the present invention;

FIG. 7 is still another schematic flowchart of a method for determining codebook indication information according to an embodiment of the present invention;

FIG. 8 is still another schematic flowchart of a method for determining codebook indication information according to an embodiment of the present invention;

FIG. 9 is still another schematic flowchart of a method for determining codebook indication information according to an embodiment of the present invention;

FIG. 10 is a schematic flowchart of a method for transmitting indication information according to another embodiment of the present invention;

FIG. 11 is a schematic flowchart of a method for determining a first codebook according to an embodiment of the present invention;

FIG. 12 is another schematic flowchart of a method for determining a first codebook according to an embodiment of the present invention;

FIG. 15 is still another schematic flowchart of a method for determining a first codebook according to an embodiment of the present invention;

FIG. 16 is still another schematic flowchart of a method for determining a first codebook according to an embodiment of the present invention;

FIG. 17 is still another schematic flowchart of a method for determining a first codebook according to an embodiment of the present invention;

FIG. 18 is a schematic block diagram of an apparatus for transmitting indication information according to an embodiment of the present invention;

FIG. 19 is a schematic block diagram of a second determining module according to an embodiment of the present invention;

FIG. 28 is a schematic block diagram of an apparatus for transmitting indication information according to still another embodiment of the present invention;

FIG. 29 is still another schematic flowchart of a method for determining codebook indication information according to an embodiment of the present invention;

FIG. 30 is still another schematic flowchart of a method for determining codebook indication information according to an embodiment of the present invention;

FIG. 31 is still another schematic flowchart of a method for determining codebook indication information according to an embodiment of the present invention;

FIG. 32 is still another schematic flowchart of a method for determining a first codebook according to an embodiment of the present invention;

FIG. 33 is still another schematic flowchart of a method for determining a first codebook according to an embodiment of the present invention;

FIG. 34 is still another schematic flowchart of a method for determining a first codebook according to an embodiment of the present invention;

FIG. 35 is still another schematic block diagram of a second determining module according to an embodiment of the present invention;

DETAILED DESCRIPTION OF ILLUSTRATIVE EMBODIMENTS

Figure 1:
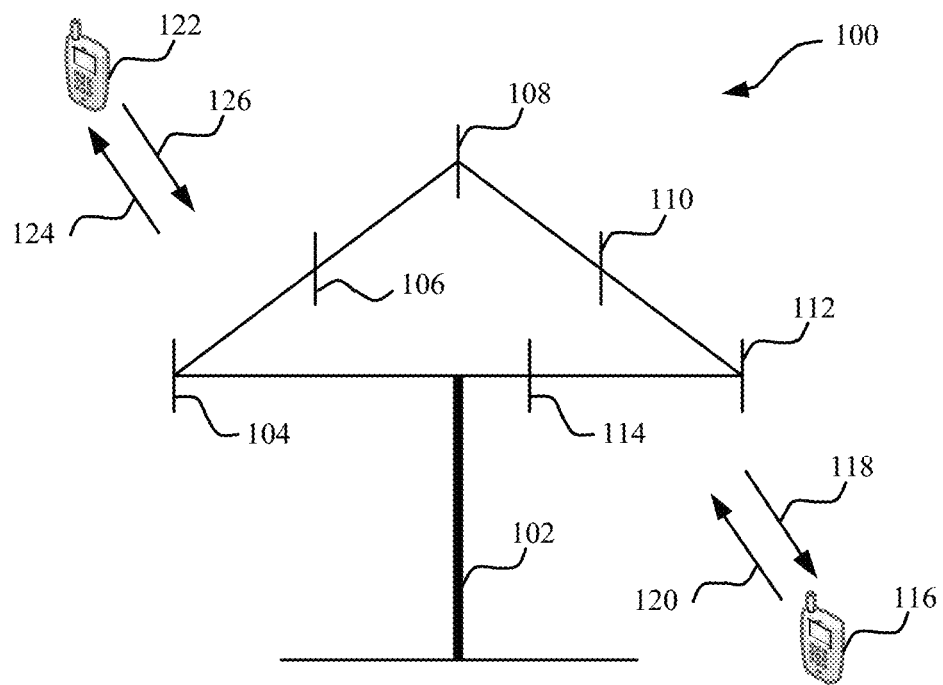
FIG. 1 is a schematic architecture diagram of a communications system to which an embodiment of the present invention is applied.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to various communications systems that are based on a non-orthogonal multiple access technology, for example, an SCMA system. Certainly, SCMA may also be referred to as another name in the communications field. Further, the technical solutions in the embodiments of the present invention may be applied to a multi-carrier transmission system in which a non-orthogonal multiple access technology is used, for example, an orthogonal frequency division multiplexing ("OFDM" for short) system, a filter bank multi-carrier ("FBMC" for short) system, a generalized frequency division multiplexing ("GFDM" for short) system, or a filtered-orthogonal frequency division multiplexing ("F-OFDM" for short) system in which a non-orthogonal multiple access technology is used. It should be further understood that the embodiments of the present invention are described by using only an example of a communications system in which an SCMA technology is used. However, the embodiments of the present invention are not limited thereto.

It should be further understood that in the embodiments of the present invention, a terminal device may communicate with one or more core networks by using a radio access network ("RAN" for short). The terminal device may be referred to as an access terminal, user equipment ("UE" for short), a user unit, a user station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol ("SIP" for short) phone, a wireless local loop ("WLL" for short) station, a personal digital assistant (PDA for short), a handheld device having a wireless communication function, a computing device, another processing device connected to a wireless modem, an in-vehicle device, a wearable device, and a terminal device in a future 5G network.

It should be further understood that in the embodiments of the present invention, a network device may be configured to communicate with the terminal device. The network device may be a base station ("BTS" for short) in a Global System for Mobile Communications ("GSM" for short) system or a code division multiple access ("CDMA" for short) system, or may be a base station ("NB" for short) in a wideband code division multiple access ("WCDMA" for short) system, or may be an evolved node B ("eNB" or "eNodeB" for short) in a Long Term Evolution ("LTE" for short) system, or the network device may be a relay station, an access point, an in-vehicle device, a wearable device, or a base station device in a future 5G network.

FIG. 1 is a schematic architecture diagram of a communications system to which an embodiment of the present invention is applied. As shown in FIG. 1, the communications system 100 may include a network device 102. The network device 102 may include one or more antenna groups. Each antenna group may include one or more antennas. For example, one antenna group may include antennas 104 and 106, another antenna group may include antennas 108 and 110, and an additional group may include antennas 112 and 114. Although FIG. 1 shows that each antenna group includes two antennas, it should be understood that each antenna group may have more or fewer antennas. The network device 102 may additionally include a transmitter chain and a receiver chain. A person of ordinary skill in the art may understand that both the transmitter chain and the receiver chain may include multiple parts that are related to signal transmission and reception (for example, a processor, a modulator, a multiplexer, a demodulator, a demultiplexer, or an antenna).

The network device 102 may communicate with multiple terminal devices (for example, a terminal device 116 and a terminal device 122). However, it may be understood that the network device 102 may communicate with any quantity of terminal devices similar to the terminal device 116 or 122. Each of the terminal devices 116 and 122 may be, for example, a cellular telephone, a smart phone, a portable computer, a handheld communications device, a handheld computing device, a satellite radio apparatus, a global positioning system, a PDA and/or any other suitable device that is configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex ("FDD" for short) system, the forward link 118 may use a frequency band different from that of the reverse link 120, and the forward link 124 may use a frequency band different from that of the reverse link 126. For another example, in a time division duplex ("TDD" for short) system and a full duplex (Full Duplex) system, the forward link 118 and the reverse link 120 may use a common frequency band, and the forward link 124 and the reverse link 126 may also use a common frequency band.

Each group of antennas and/or areas that is designed for communication is referred to as a sector of the network device 102. For example, an antenna group may be designed to communicate with a terminal device in a sector of a coverage area of the network device 102. When the network device 102 is communicating with the terminal devices 116 and 122 by using the forward links 118 and 124 respectively, a transmit antenna of the network device 102 may use beamforming to improve signal-to-noise ratios of the forward links 118 and 124. In addition, in comparison with a manner in which a network device sends signals to all terminal devices of the network device by using a single antenna, when the network device 102 uses beamforming to send signals to the terminal devices 116 and 122 that are randomly scattered in a related coverage area, a mobile device in a neighboring cell is subject to less interference.

Within a given time, the network device 102, the terminal device 116 or the terminal device 122 may be a wireless communications sending apparatus and/or a wireless communications receiving apparatus. When sending data, the wireless communications sending apparatus may encode data and transmit the encoded data. Specifically, the wireless communications sending apparatus may obtain a particular quantity of data bits (for example, generate the data bits, receive the data bits from another communications apparatus, or obtain the data bits stored in a memory) that are to be sent to the wireless communications receiving apparatus through a channel. The data bits may be included in one data transport block (or multiple transport blocks). The transport block may be segmented to generate multiple code blocks.

It should be understood that the communications system is a non-orthogonal multiple access system. For example, the system is an SCMA system, the network device is a base station, and the terminal device is user equipment. The embodiments of the present invention are described by using only an example of an SCMA system, a base station, and user equipment. However, the present invention is not limited thereto.

FIG. 1 shows the communications system to which this embodiment of the present invention is applied. The communications system is, for example, an SCMA system. An encoding principle of a transmit end in a non-orthogonal multiple access system such as an SCMA system is briefly described below with reference to FIG. 2.

Figure 2:
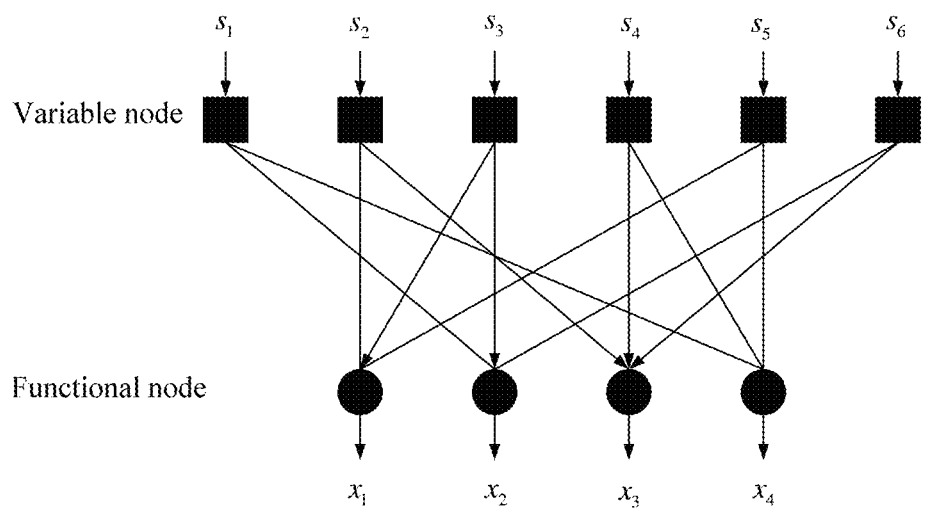
FIG. 2 is a schematic diagram of an encoding principle of a non-orthogonal multiple access system.

As shown in FIG. 2, description is provided by using an example in which six data streams are multiplexed on four resource units. That is, M=6 and N=4, where M is a positive integer and represents a quantity of data streams, and N is a positive integer and represents a quantity of resource units. One resource unit may be one subcarrier, or one resource element ("RE" for short), or one antenna port. The six data streams form one group, and the four resource units form one encoding unit.

In a bipartite graph shown in FIG. 2, when a data stream is connected to a resource unit, it represents that after codeword mapping is performed on at least one data combination of the data stream, a non-zero modulation symbol is sent on the resource unit. When a data stream is not connected to a resource unit, it represents that after codeword mapping is performed on all possible data combinations of the data stream, modulation symbols sent on the resource unit are all zero modulation symbols. A data combination of a data stream may be understood by using the following description. For example, in a binary bit data stream, 00, 01, 01, and 11 are all possible data combinations of two-bit data. For ease of description, s1 to s6 are used to sequentially represent to-be-sent data combinations of six data streams in the bipartite graph, and x1 to x4 are used to sequentially represent modulation symbols sent on four resource units in the bipartite graph.

As may be seen from the bipartite graph, after codeword mapping is performed on a data combination of each data stream, modulation symbols are sent on two or more resource units. Moreover, a modulation symbol sent on each resource unit is obtained by superimposing modulation symbols that are obtained after codeword mapping is performed on data combinations of two or more data streams respectively. For example, after codeword mapping is performed on a to-be-sent data combination s3 of a data stream 3, non-zero modulation symbols may be sent on a resource unit 1 and a resource unit 2. A modulation symbol x3 sent on a resource unit 3 is obtained by superimposing non-zero modulation symbols that are obtained after codeword mapping is performed on to-be-sent data combinations s2, s4, and s6 of a data stream 2, a data stream 4, and a data stream 6 respectively. Because a quantity of data streams may be greater than a quantity of resource units, the non-orthogonal multiple access system may effectively improve network capacity. The network capacity includes a quantity of users who can access the system, spectral efficiency of the system, and the like.

An application scenario and an encoding principle in this embodiment of the present invention are described above with reference to FIG. 1 and FIG. 2. A method for transmitting indication information according to embodiments of the present invention is described below from the perspective of a network device with reference to FIG. 3 to FIG. 9.

FIG. 3 shows a method 200 for transmitting indication information according to an embodiment of the present invention. The method 200 may be, for example, performed by a network device in a non-orthogonal multiple access system. The network device is, for example, a base station. As shown in FIG. 3, the method 200 includes the following steps:

S210: Determine, according to one or more codebooks, a first codebook to be used by a terminal device to send an uplink data stream, where the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

S220: Determine codebook indication information used to indicate the first codebook.

S230: Send the codebook indication information to the terminal device.

Specifically, in a non-orthogonal multiple access system such as an SCMA system, the network device assigns or designates a codebook to a to-be-sent uplink data stream of a terminal device. To notify the terminal device of the codebook assigned by the network device, the network device may determine codebook indication information, and send the codebook indication information to the terminal device. The codebook indication information is used to indicate the codebook to be used by the terminal device to send the uplink data stream. After receiving the codebook indication information sent by the network device, the terminal device may determine, according to the codebook indication information, the codebook to be used to send the uplink data stream, and can send the uplink data stream according to the codebook. Therefore, by means of information exchange between the network device and the terminal device, the terminal device can determine a codebook assigned by the network device, and the non-orthogonal multiple access system can operate normally.

Therefore, for the method for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In this embodiment of the present invention, in a non-orthogonal multiple access technology, multiple different data streams are transmitted on a same resource unit by using codebooks, that is, the multiple different data streams are multiplexed on the same resource unit, and different codebooks are used for different data streams, so as to improve utilization of resources. The data streams may come from a same terminal device or from different terminal devices.

A codeword may be represented as a multidimensional complex vector. The complex vector may have two or more dimensions, and is used to represent a mapping relationship between data and two or more modulation symbols. The modulation symbols include at least one zero modulation symbol and at least one non-zero modulation symbol. The data may be binary bit data or q-ary data. A codebook may include two or more codewords. The codebook may represent a mapping relationship between a possible data combination of data having a particular length and a codeword in the codebook.

Therefore, in the non-orthogonal multiple access technology, data in a data stream is directly mapped, according to a particular mapping relationship, into a codeword, that is, a multidimensional complex vector in a codebook, to implement sending of the data on multiple resource units in a spreading manner. The data may be binary bit data or may be q-ary data. The resource unit may be a resource unit in a time domain, a frequency domain, a space domain, a time-frequency domain, a time-space domain or a time-frequency-space domain.

With reference to the foregoing description regarding a codeword, a codebook, and the bipartite graph shown in FIG. 2, a codeword in a codebook usually has the following form:

$$\begin{pmatrix} c_{1,q} \\ c_{2,q} \\ \vdots \\ c_{N,q} \end{pmatrix},$$

where $1 \leq q \leq Q_m$; and a codebook that includes two or more codewords usually has the following form:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\},$$

where N is a positive integer greater than 1, and may represent a quantity of resource units included in one encoding unit, or may be understood as a length of a codeword; $Q_m$ is a positive integer greater than 1, represents a quantity of codewords included in a codebook, and corresponds to a modulation order. For example, in a case of quadrature phase shift keying (Quadrature Phase Shift Keying, "QPSK" for short) or 4-order modulation, $Q_m$ takes a value of 4; and q is a positive integer, and $1 \leq q \leq Q_m$.

An element $c_{n,q}$ included in a codebook and a codeword are complex numbers, and may be mathematically represented as: $c_{n,q} = \alpha * \exp(j * \beta)$, where $1 \leq n \leq N$, $1 \leq q \leq Q_m$ and $\alpha$ and $\beta$ may be any real numbers. A particular mapping relationship may be formed between a codeword in a codebook and a data combination of a data stream. For example, between a codeword in a codebook and a two-bit data combination of a binary data stream, the following mapping relationship may be formed: "00" may be mapped into a codeword 1; "01" may be mapped into a codeword 2; "10" may be mapped into a codeword 3; "11" may be mapped into a codeword 4; and the codeword 1, the codeword 2, the codeword 3, and the codeword 4 may be respectively represented as:

codeword 1

$$\begin{pmatrix} c_{1,q} \\ c_{2,q} \\ \vdots \\ c_{N,q} \end{pmatrix},$$

codeword 2

$$\begin{pmatrix} c_{1,2} \\ c_{2,2} \\ \vdots \\ c_{N,2} \end{pmatrix},$$

codeword 3

$$\begin{pmatrix} c_{1,3} \\ c_{2,3} \\ \vdots \\ c_{N,3} \end{pmatrix},$$

and codeword 4

$$\begin{pmatrix} c_{1,4} \\ c_{2,4} \\ \vdots \\ c_{N,4} \end{pmatrix}.$$

With reference to the foregoing bipartite graph, when a data stream is connected to a resource unit, a codebook corresponding to the data stream and a codeword in the codebook should have the following characteristic: For at least one codeword in the codebook, a non-zero modulation symbol is sent on the corresponding resource unit. For example, if a data stream 3 is connected to a resource unit 1, at least one codeword in a codebook corresponding to the data stream 3 meets $c_{1,q} \neq 0$, where $1 \leq q \leq Q_m$. When a data stream is not connected to a resource unit, a codebook corresponding to the data stream and a codeword in the codebook should have the following characteristic: For all codewords in the codebook, zero modulation symbols are sent on the corresponding resource unit. For example, if a data stream 3 is not connected to a resource unit 3, any codeword in a codebook corresponding to the data stream 3 meets $c_{3,q}=0$, where $1 \leq q \leq Q_m$.

In conclusion, when a modulation order is QPSK or 4-order modulation, the codebook corresponding to the data stream 3 in the foregoing bipartite graph may have the following form and characteristic:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $c_{n,q}=\alpha*\exp(j*\beta)$, where $1 \leq n \leq 2$, $1 \leq q \leq 4$, and $\alpha$ and $\beta$ may be any real numbers; for any q, $1 \leq q \leq 4$; $c_{1,q}$ and $c_{2,q}$ are not zero at the same time; and at least one group including q1 and q2 enables $c_{1,q_1} \neq 0$ and $c_{2,q_2} \neq 0$, where $1 \leq q1 \leq 4$ and $1 \leq q2 \leq 4$. For example, if a data combination s3 of a data stream 3 shown in FIG. 2 is "10", according to the foregoing mapping rule, a codeword into which the data combination s3 is mapped is a 4-dimensional complex vector:

$$\begin{pmatrix} c_{1,3} \\ c_{2,3} \\ 0 \\ 0 \end{pmatrix}.$$

In the non-orthogonal multiple access system, the bipartite graph shown in FIG. 2 may also be represented by using a characteristic matrix. The characteristic matrix may have the following form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m}$ represents an element in the characteristic matrix, where m and n are natural numbers, $1 \leq n \leq N$, and $1 \leq m \leq M$; N rows respectively represent N resource units in one encoding unit; and M columns respectively represent a quantity of data streams multiplexed in one group. Although the characteristic matrix may be expressed in a general form, the characteristic matrix may have the following characteristics:

(1) An element in the characteristic matrix is $r_{n,m} \in \{0,1\}$, where $1 \leq n \leq N$, and $1 \leq m \leq M$. When $r_{n,m}=1$, it may be explained by using the corresponding bipartite graph that an $m^{th}$ data stream is connected to an $n^{th}$ resource unit. Certainly, when $r_{n,m}=1$, it may also be understood that after codeword mapping is performed on at least one data combination of the $m^{th}$ data stream, a non-zero modulation symbol is sent on the $n^{th}$ resource unit. When $r_{n,m}=0$, it may be explained by using the corresponding bipartite graph that an $m^{th}$ data stream is not connected to an $n^{th}$ resource unit. Certainly, when $r_{n,m}=0$, it may also be understood that after codeword mapping is performed on all possible data combinations of the $m^{th}$ data stream, a zero modulation symbol is sent on the $n^{th}$ resource unit.

(2) Further, optionally, in the characteristic matrix, a quantity of elements 0 is not less than a quantity of elements 1, so as to reflect a characteristic of sparse encoding.

Moreover, a column in the characteristic matrix may be referred to as a characteristic sequence. The characteristic sequence may have the following expression form:

$$\begin{pmatrix} r_{1,m} \\ r_{2,m} \\ \vdots \\ r_{N,m} \end{pmatrix},$$

where $1 \leq m \leq M$.

Therefore, the characteristic matrix may also be considered as a matrix including a series of characteristic sequences.

With reference to the characteristic description of the foregoing characteristic matrix, for the example shown in FIG. 2, a corresponding characteristic matrix may be represented as:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

Moreover, a characteristic sequence corresponding to a codebook $$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}$$

used in the data stream 3 in FIG. 2 may be represented as:

$$\begin{pmatrix} 1 \\ 1 \\ 0 \\ 0 \end{pmatrix}.$$

Therefore, a correspondence between a codebook and a characteristic sequence may be considered as a one-to-one relationship, that is, one codebook uniquely corresponds to one characteristic sequence. A correspondence between a characteristic sequence and a codebook may be a one-to-multiple relationship, that is, one characteristic sequence may correspond to one or more codebooks. Therefore, the characteristic sequence may be understood as follows: The characteristic sequence corresponds to one or more codebooks, each characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

A correspondence between a characteristic sequence and a codebook may be determined by the following two conditions:

(1) A total quantity of modulation symbols in a codeword of a codebook is the same as a total quantity of elements in a corresponding characteristic sequence.

(2) For any element 1 in a characteristic sequence, at least one codeword can be found in a corresponding codebook, so that a modulation symbol of the codeword in a position of the element 1 is not a zero modulation symbol. For any element 0 in a characteristic sequence, modulation symbols that are of all codewords in a corresponding codebook and that are in a position corresponding to the element 0 are all zero modulation symbols.

Therefore, in this embodiment of the present invention, a codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol. Each characteristic matrix includes two or more characteristic sequences, each characteristic matrix corresponds to one or more codebooks, and each characteristic sequence also corresponds to one or more codebooks. A characteristic sequence includes an element 0 and an element 1. The element 0 represents that modulation symbols that are of all codewords in a corresponding codebook and that are in a position corresponding to the element 0 are all zero modulation symbols. The element 1 represents that modulation symbols that are of all codewords in a corresponding codebook and that are in a position corresponding to the element 1 are not all zero modulation symbols or are all non-zero modulation symbols.

In this embodiment of the present invention, multiple codebooks may be grouped into one or more codebook clusters. Each codebook cluster may include one or more codebooks. Any two codebooks, for example, a codebook a and a codebook b, in a same codebook cluster have the following characteristic: A codeword in the codebook a and a codeword in the codebook b have a same total quantity of modulation symbols. Therefore, a codebook in the codebook cluster meets a condition that all codewords have a same total quantity of modulation symbols, that is, all the codewords have a same length, that is, data streams are multiplexed on a same quantity of resource units.

In this embodiment of the present invention, multiple codebooks may further be grouped into one or more codebook sets. Each codebook set may include one or more codebooks. Any two codebooks, for example, a codebook c and a codebook d in a same codebook set have the following characteristics: (1) A codeword in the codebook c and a codeword in the codebook d have a same total quantity of modulation symbols. (2) In positions in which modulation symbols of all codewords in the codebook c are zero modulation symbols, modulation symbols of all codewords in the codebook d are also all zero modulation symbols.

FIG. 2 is still used as an example to provide description. If a modulation order is QPSK or 4-order modulation, a codebook used in a data stream 1 in FIG. 2 may be represented as a codebook 1, and a codebook used in a data stream 3 may be represented as a codebook 3. The codebook 1 and the codebook 3 may be respectively represented as:

codebook 1

$$\left\{ \begin{pmatrix} 0 \\ e_{2,1} \\ 0 \\ e_{4,1} \end{pmatrix}, \begin{pmatrix} 0 \\ e_{2,2} \\ 0 \\ e_{4,2} \end{pmatrix}, \begin{pmatrix} 0 \\ d_{2,3} \\ 0 \\ e_{4,3} \end{pmatrix}, \begin{pmatrix} 0 \\ e_{2,4} \\ 0 \\ e_{4,4} \end{pmatrix} \right\},$$

and codebook 3

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $e_{n,q} = \alpha * \exp(j*\beta)$, where $n \in \{2,4\}$ $1 \leq q \leq 4$, and $\alpha$ and $\beta$ may be any real numbers; for any q, $1 \leq q \leq 4$; $e_{2,q}$ and $e_{4,q}$ are not zero at the same time; and at least one group including q1 and q2 enables $e_{2,q_1} \neq 0$ and $e_{4,q_2} \neq 0$, where $1 \leq q1 \leq 4$ and $1 \leq q2 \leq 4$.

Modulation symbols that are of all codewords of the codebook 1 and that are in a position 3 (that is, corresponding to a third resource unit, n=3) are zero modulation symbols. Modulation symbols that are of all codewords of the codebook 3 and that are in the position 3 are also all zero modulation symbols. However, modulation symbols that are of all the codewords of the codebook 1 and that are in a position 1 (that is, corresponding to a first resource unit, n=1) are all zero modulation symbols, and modulation symbols that are of all the codewords of the codebook 3 and that are in the position 1 are not all zero modulation symbols. Therefore, the codebook 1 and the codebook 3 do not belong to a same codebook set.

For another example, for a codebook 2 having the following characteristic, the codebook 2 may be represented as: codebook 2

$$\left\{ \begin{pmatrix} d_{1,1} \\ d_{2,1} \\ 0 \\ 0 \end{pmatrix}, \begin{pmatrix} d_{1,2} \\ d_{2,2} \\ 0 \\ 0 \end{pmatrix}, \begin{pmatrix} d_{1,3} \\ d_{2,3} \\ 0 \\ 0 \end{pmatrix}, \begin{pmatrix} d_{1,4} \\ d_{2,4} \\ 0 \\ 0 \end{pmatrix} \right\},$$

where $d_{n,q} = \alpha * \exp(j*\beta)$, where $1 \le n \le 2$, $1 \le q \le 4$, and $\alpha$ and $\beta$ may be any real numbers; for any q, $1 \le q \le 4$; $d_{1,q}$ and $d_{2,q}$ are not zero at the same time; and at least one group including q1 and q2 enables $d_{1,q_1} \ne 0$ and $d_{2,q_2} \ne 0$, where $1 \le q1 \le 4$ and $1 \le q2 \le 4$.

Modulation symbols that are of all codewords of the codebook 2 and that are in positions 1 and 2 (that is, corresponding to a first resource unit and a second resource unit, n=1, 2) are all zero modulation symbols. Modulation symbols that are of all the codewords of the codebook 3 and that are in the positions 1 and 2 are also all zero modulation symbols. Only modulation symbols that are of all the codewords of the codebook 2 and that are in the positions 1 and 2 are all zero modulation symbols, and only modulation symbols that are of all the codewords of the codebook 3 and that are in the positions 1 and 2 are also all zero modulation symbols. That is, the codebook 2 and the codebook 3 have same positions in which modulation symbols of all codewords are zero modulation symbols, that is, the position 1 and the position 2. Therefore, the codebook 2 and the codebook 3 belong to a same codebook set.

In conclusion, in this embodiment of the present invention, each codebook cluster includes one or more codebook sets, each codebook set includes one or more codebooks, and each codebook includes two or more codewords. Each codebook cluster meets a condition that codewords in a same codebook cluster have a same total quantity of modulation symbols. Each codebook set meets a condition that codewords in a same codebook set have a same total quantity of modulation symbols and that any two codebooks in a same codebook set have same positions in which modulation symbols of all codewords of the two codebooks are zero modulation symbols.

It should be further understood that in the non-orthogonal multiple access system, a codebook may be directly represented and stored. For example, the foregoing codebook or codewords in the codebook are directly stored, or only modulation symbols in positions in which corresponding characteristic sequence elements are elements 1 in a codeword are stored. Therefore, during application of the present invention, it needs to be assumed that the network device and the terminal device in the non-orthogonal multiple access system can both store a part or all of the following predesigned content:

(1) one or more characteristic matrices:

$$\begin{pmatrix} r_{1,1} & r_{1,2} & \cdots & r_{1,M} \\ r_{2,1} & r_{2,2} & \cdots & r_{2,M} \\ \vdots & \vdots & \ddots & \vdots \\ r_{N,1} & r_{N,2} & \cdots & r_{N,M} \end{pmatrix}_{N \times M},$$

where $r_{n,m} \in \{0,1\}$, where $1 \le n \le N$, $1 \le m \le M$, M and N are both positive integers greater than 1, M may represent a quantity of multiplexed data streams, and N may represent a quantity of resource units included in one encoding unit, or may be understood as a length of a codeword;

(2) one or more characteristic sequences:

$$\begin{pmatrix} r_{1,m} \\ r_{2,m} \\ \vdots \\ r_{N,m} \end{pmatrix},$$

where $1 \le m \le M$; and (3) one or more codebooks:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\},$$

where $Q_m \ge 2$, $Q_m$ may represent a modulation order corresponding to the codebook, each codebook may correspond to a modulation order, and N is a positive integer greater than 1, and may be represented as a quantity of resource units included in one encoding unit, or may be understood as a length of a codeword.

A method 220 for determining codebook indication information according to embodiments of the present invention is described below in detail with reference to FIG. 4 to FIG. 9.

As shown in FIG. 4, in an embodiment of the present invention, optionally, the determining codebook indication information used to indicate the first codebook includes the following steps:

S2211: Determine a first codebook set to which the first codebook belongs and a first codebook cluster to which the first codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

S2212: Determine the codebook indication information, where the codebook indication information includes first codebook cluster information, first codebook set information, and first codebook information, where the first codebook cluster information is used to indicate the first codebook cluster, the first codebook set information is used to indicate the first codebook set in the first codebook cluster, and the first codebook information is used to indicate the first codebook in the first codebook set.

Specifically, in this embodiment of the present invention, the network device and the terminal device may store a predesigned codebook. Codebooks may be grouped into one or more codebook sets. Each codebook set includes one or more codebooks. Each codebook corresponds to a modulation order. Any two codebooks, for example, a codebook a and a codebook b, in a same codebook set have the following characteristics: A codeword in the codebook a and a codeword in the codebook b have a same total quantity of modulation symbols. In positions in which modulation symbols of all codewords are zero modulation symbols in the codebook a, modulation symbols of all codewords in the codebook b are also all zero modulation symbols. That is, the codebook set meets a condition that codewords in a same codebook set have a same total quantity of modulation symbols and that any two codebooks in a same codebook set have same positions in which modulation symbols of all codewords of the two codebooks are zero modulation symbols.

One or more codebook sets obtained by grouping in the foregoing manner may be further grouped into one or more codebook clusters. Each codebook cluster includes one or more codebook sets. Any two codebook sets, for example, a codebook set A and a codebook set B, in a same codebook cluster have the following characteristic: A codeword in the codebook set A and a codeword in the codebook set B have a same total quantity of modulation symbols, that is, all the codewords have a same length, that is, data streams are multiplexed on a same quantity of resource units. That is, a codebook cluster meets a condition that codewords in a same codebook cluster have a same total quantity of modulation symbols.

In this embodiment of the present invention, the codebook indication information that is determined by the network device and that is used to indicate the first codebook may include the first codebook cluster information, the first codebook set information, and the first codebook information. For example, the codebook indication information may include three logical information segments. A logical information segment 1 may carry the first codebook cluster information used to indicate the first codebook cluster to be used by the terminal device to send a data stream. A logical information segment 2 may carry the first codebook set information used to indicate the first codebook set that is in the first codebook cluster and that is to be used by the terminal device to send the data stream. A logical information segment 3 may carry the first codebook information used to indicate the first codebook that is in the first codebook set and that is to be used by the terminal device to send the data stream.

It should be understood that in this embodiment of the present invention, the logical information segments of the codebook indication information may appear consecutively or nonconsecutively in any sequence in an instruction at which the codebook indication information is located. This is not limited in this embodiment of the present invention.

Accordingly, for example, after receiving an instruction or a message that carries the codebook indication information, the terminal device may know, according to the logical information segment 1, a codebook cluster in which a codebook is to be used to send a to-be-sent uplink data stream; may know, according to the logical information segment 2, a codebook set that is in the codebook cluster indicated by the logical information segment 1 and in which a codebook is to be used to send the to-be-sent uplink data stream; and may know, according to the logical information segment 3, which codebook in the codebook set indicated by the logical information segment 2 is to be used to send the to-be-sent uplink data stream. Therefore, the terminal device can send the uplink data stream according to the eventually determined first codebook, the non-orthogonal multiple access system operates normally, and network capacity of the system can be effectively improved.

In this embodiment of the present invention, when any two different codebooks in a codebook set correspond to different modulation orders, the logical information segment 3 may further indicate, by indicating a modulation order, the codebook that is in the codebook set and that is to be used by the terminal device to send the to-be-sent uplink data stream. Accordingly, the terminal device may know, according to the logical information segment 3, a modulation order corresponding to the to-be-sent uplink data stream, so that the first codebook that is in the codebook set indicated by the first codebook set information and that is in a one-to-one correspondence with the modulation order can be determined.

That is, in this embodiment of the present invention, optionally, the first codebook information includes modulation order information of the first codebook, and modulation orders of codebooks included in the first codebook set are different, that is, codebooks in the first codebook set are in a one-to-one correspondence with modulation orders.

It should be understood that in this embodiment of the present invention, if logical information segments indicate index values, consistent index relationships of related information need to be established in advance on a network device side and a terminal device side. The index relationships are, for example, an index relationship between a codebook cluster index value and a codebook cluster, an index relationship between a codebook set index value and a codebook set in each codebook cluster, and an index relationship between a codebook index value and a codebook in each codebook set. Therefore, the network device and the terminal device can uniquely determine a corresponding codebook cluster, codebook set, and codebook according to the index values indicated by the logical information segments and by using the related index relationships that are established in advance.

It should be further understood that in this embodiment of the present invention, the network device and the terminal device may store a codebook in advance by using multiple methods, but the following two conditions need to be met: First, the network device and the terminal device may know, according to the stored codebook, a quantity of resource units or subcarriers or resource elements included in one encoding unit. Second, the network device and the terminal device may know, according to the stored codebook, non-zero modulation symbols to be sent by the terminal device and resource units or subcarriers or resource elements of one encoding unit to be used.

A simple and direct method to meet the foregoing storage conditions is storing a codebook in the foregoing form, and all zero modulation symbols and non-zero modulation symbols of a codeword are stored:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \dots, \begin{pmatrix} c_{1,Q_m} \\ c_{2,Q_m} \\ \vdots \\ c_{N,Q_m} \end{pmatrix} \right\}.$$

For example, when a modulation order is QPSK or 4-order modulation, a codebook used in a variable node 3 in FIG. 2 may be stored as:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

After a codebook is stored in the foregoing manner, a total quantity of zero modulation symbols and non-zero modulation symbols in the codeword is a quantity of resource units or subcarriers or resource elements included in one encoding unit. A position and a value of a non-zero modulation symbol represent that the terminal device is to send the non-zero modulation symbol having the corresponding value on a resource unit or a subcarrier or a resource element in a corresponding position of one encoding unit. For example, when the codebook in the variable node 3 in FIG. 2 is used, the terminal device sends a modulation symbol $c_{1,q}$ on a first resource unit or subcarrier or resource element of one encoding unit; the terminal device sends a modulation symbol $c_{2,q}$ on a second resource unit or subcarrier or resource element; and the terminal device sends zero modulation symbols on third and fourth resource units or subcarriers or resource elements, where $c_{n,q} = \alpha * \exp(j*\beta)$, where $1 \le n \le 2$, $1 \le q \le 4$, and $\alpha$ and $\beta$ may be any real numbers; for any q, $1 \le q \le 4$; $c_{1,q}$ and $c_{2,q}$ are not zero at the same time; and at least one group including q1 and q2 enables $c_{1,q_1} \ne 0$ and $c_{2,q_2} \ne 0$, where $1 \le q1 \le 4$ and $1 \le q2 \le 4$.

It should be further understood that this embodiment of the present invention is described only by using the foregoing solution as an example, but the present invention is not limited thereto. For example, when all codebooks that are stored in advance by the network device and the terminal device belong to a same codebook cluster, the codebook indication information may include only the first codebook set information and the first codebook information. For another example, when all codebooks that are stored in advance by the network device and the terminal device belong to a same codebook set, the codebook indication information may include only the first codebook cluster information and the first codebook information. For another example, when both the network device and the terminal device use a same fixed modulation order by default, the codebook indication information may include only the first codebook cluster information and the first codebook set information. For another example, when both the network device and the terminal device use, by default, a codebook set having a same fixed number, the codebook indication information may include only the first codebook cluster information and the first codebook information.

Therefore, a network device may use less information to indicate a first codebook to be used by a terminal device to send an uplink data stream. Therefore, according to the foregoing method, not only network capacity of a system can be effectively improved, but also system overheads can be reduced.

FIG. 5 shows another embodiment of a method 220 for determining codebook indication information according to the embodiments of the present invention. As shown in FIG. 5, in this embodiment of the present invention, optionally, the determining codebook indication information used to indicate the first codebook includes the following steps.

S2221: Determine a second codebook set to which the first codebook belongs, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

S2222: Determine the codebook indication information, where the codebook indication information includes second codebook set information and second codebook information, where the second codebook set information is used to indicate the second codebook set, and the second codebook information is used to indicate the first codebook in the second codebook set.

Specifically, in this embodiment of the present invention, the network device and the terminal device may store a predesigned codebook. Codebooks may be grouped into one or more codebook sets. Each codebook set includes one or more codebooks. Each codebook corresponds to a modulation order. Any two codebooks, for example, a codebook a and a codebook b, in a same codebook set have the following characteristics: A codeword in the codebook a and a codeword in the codebook b have a same total quantity of modulation symbols. In positions in which modulation symbols of all codewords are zero modulation symbols in the codebook a, modulation symbols of all codewords in the codebook b are also all zero modulation symbols. That is, the codebook set meets a condition that codewords in a same codebook set have a same total quantity of modulation symbols and that any two codebooks in a same codebook set have same positions in which modulation symbols of all codewords of the two codebooks are zero modulation symbols.

In this embodiment of the present invention, the codebook indication information that is determined by the network device and that is used to indicate the first codebook may include the second codebook set information and the second codebook information. For example, the codebook indication information may include two logical information segments. A logical information segment 1 may carry the second codebook set information used to indicate the second codebook set to be used by the terminal device to send a data stream. A logical information segment 2 may carry the second codebook information used to indicate the first codebook that is in the second codebook set and that is to be used by the terminal device to send the data stream.

It should be understood that in this embodiment of the present invention, the logical information segments of the codebook indication information may appear consecutively or nonconsecutively in any sequence in an instruction at which the codebook indication information is located. This is not limited in this embodiment of the present invention.

Accordingly, for example, after receiving an instruction or a message that carries the codebook indication information, the terminal device may know, according to the logical information segment 1, a codebook set in which a codebook is to be used to send the to-be-sent uplink data stream; and may know, according to the logical information segment 2, which codebook in the codebook set indicated by the logical information segment 1 is to be used to send the to-be-sent uplink data stream. Therefore, the terminal device can send the uplink data stream according to the eventually determined first codebook, the non-orthogonal multiple access system operates normally, and network capacity of the system can be effectively improved.

In this embodiment of the present invention, when any two different codebooks in a codebook set correspond to different modulation orders, the logical information segment 2 may further indicate, by indicating a modulation order, the codebook that is in the codebook set and that is to be used by the terminal device to send the to-be-sent uplink data stream. Accordingly, the terminal device may know a modulation order corresponding to the to-be-sent uplink data stream according to the logical information segment 2, so that the first codebook that is in the codebook set indicated by the second codebook set information and that is in a one-to-one correspondence with the modulation order can be determined.

That is, in this embodiment of the present invention, optionally, the second codebook information includes modulation order information of the first codebook, and modulation orders of codebooks included in the second codebook set are different, that is, codebooks in the second codebook set are in a one-to-one correspondence with modulation orders.

It should be understood that in this embodiment of the present invention, if logical information segments indicate index values, consistent index relationships of related information need to be established in advance on a network device side and a terminal device side. The index relationships are, for example, an index relationship between a codebook set index value and a codebook set and an index relationship between a codebook index value and a codebook in each codebook set, so that the network device and the terminal device can uniquely determine a corresponding codebook set and codebook according to the index values indicated by the logical information segments and by using the related index relationships that are established in advance.

It should be further understood that in this embodiment of the present invention, the network device and the terminal device may store a codebook in advance by using multiple methods, but the following two conditions need to be met: First, the network device and the terminal device may know, according to the stored codebook, a quantity of resource units or subcarriers or resource elements included in one encoding unit. Second, the network device and the terminal device may know, according to the stored codebook, non-zero modulation symbols to be sent by the terminal device and resource units or subcarriers or resource elements of one encoding unit to be used.

A simple and direct method to meet the foregoing storage conditions is storing a codebook in the foregoing form, and all zero modulation symbols and non-zero modulation symbols of a codeword are stored:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \dots, \begin{pmatrix} c_{1,Q_m} \\ c_{2,Q_m} \\ \vdots \\ c_{N,Q_m} \end{pmatrix} \right\}.$$

For example, when a modulation order is QPSK or 4-order modulation, a codebook used in a variable node 3 in FIG. 2 may be stored as:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

After a codebook is stored in the foregoing manner, a total quantity of zero modulation symbols and non-zero modulation symbols in the codeword is a quantity of resource units or subcarriers or resource elements included in one encoding unit. A position and a value of a non-zero modulation symbol represent that the terminal device is to send the non-zero modulation symbol having the corresponding value on a resource unit or a subcarrier or a resource element in a corresponding position of one encoding unit. For example, when the codebook in the variable node 3 in FIG. 2 is used, the terminal device sends a modulation symbol $c_{1,q}$ on a first resource unit or subcarrier or resource element of one encoding unit; the terminal device sends a modulation symbol $c_{2,q}$ on a second resource unit or subcarrier or resource element; and the terminal device sends zero modulation symbols on third and fourth resource units or subcarriers or resource elements, where $c_{n,q}=\alpha*\exp(j*\beta)$, where $1 \leq n \leq 2$, $1 \leq q \leq 4$, and $\alpha$ and $\beta$ may be any real numbers; for any q, $1 \leq q \leq 4$; $c_{1,q}$ and $c_{2,q}$ are not zero at the same time; and at least one group including q1 and q2 enables $c_{1,q_1} \neq 0$ and $c_{2,q_2} \neq 0$, where $1 \leq q1 \leq 4$ and $1 \leq q2 \leq 4$.

It should be further understood that this embodiment of the present invention is described only by using the foregoing solution as an example, but the present invention is not limited thereto. For example, when all codebooks that are stored in advance by the network device and the terminal device belong to a same codebook set, the codebook indication information may include only the second codebook information. For another example, when both the network device and the terminal device use a same fixed modulation order by default, the codebook indication information may include only the second codebook set information. For another example, when both the network device and the terminal device use, by default, a codebook set having a same fixed number, the codebook indication information may include only the second codebook information.

Therefore, a network device may use less information to indicate a first codebook to be used by a terminal device to send an uplink data stream. Therefore, according to the foregoing method, not only network capacity of a system can be effectively improved, but also system overheads can be reduced.

FIG. 6 shows another embodiment of a method 220 for determining codebook indication information according to the embodiments of the present invention. As shown in FIG. 6, in this embodiment of the present invention, optionally, the determining codebook indication information used to indicate the first codebook includes the following steps.

S2231: Determine a second codebook cluster to which the first codebook belongs, where each codebook cluster includes at least one codebook, and the codebook cluster meets a condition that codewords in a same codebook cluster have a same total quantity of modulation symbols.

S2232: Determine the codebook indication information, where the codebook indication information includes second codebook cluster information and third codebook information, where the second codebook cluster information is used to indicate the second codebook cluster, and the third codebook information is used to indicate the first codebook in the second codebook cluster.

Specifically, in this embodiment of the present invention, the network device and the terminal device may store a predesigned codebook. Codebooks may be grouped into one or more codebook clusters. Each codebook cluster includes one or more codebooks. Any two codebooks, for example, a codebook a and a codebook b, in a same codebook cluster have the following characteristic: A codeword in the codebook a and a codeword in the codebook b have a same total quantity of modulation symbols, that is, all the codewords have a same length, that is, data streams are multiplexed on a same quantity of resource units. That is, a codebook cluster meets a condition that codewords in a same codebook cluster have a same total quantity of modulation symbols.

In this embodiment of the present invention, the codebook indication information that is determined by the network device and that is used to indicate the first codebook may include the second codebook cluster information and the third codebook information. For example, the codebook indication information may include two logical information segments. A logical information segment 1 may carry the second codebook cluster information used to indicate the first codebook cluster to be used by the terminal device to send a data stream. A logical information segment 2 may carry the third codebook information used to indicate the first codebook that is in the second codebook cluster and that is to be used by the terminal device to send the data stream.

It should be understood that in this embodiment of the present invention, the logical information segments of the codebook indication information may appear consecutively or nonconsecutively in any sequence in an instruction at which the codebook indication information is located. This is not limited in this embodiment of the present invention.

Accordingly, for example, after receiving an instruction or a message that carries the codebook indication information, the terminal device may know, according to the logical information segment 1, a codebook cluster in which a codebook is to be used to send a to-be-sent uplink data stream; and may know, according to the logical information segment 2, which codebook in the codebook cluster indicated by the logical information segment 1 is to be used to send the to-be-sent uplink data stream. Therefore, the terminal device can send the uplink data stream according to the eventually determined first codebook, the non-orthogonal multiple access system operates normally, and network capacity of the system can be effectively improved.

It should be understood that in this embodiment of the present invention, when any two different codebooks in a codebook cluster correspond to different modulation orders, the logical information segment 2 may further indicate, by indicating a modulation order, a codebook that is in a codebook cluster and that is to be used by the terminal device to send the to-be-sent uplink data stream. Accordingly, the terminal device may know a modulation order corresponding to the to-be-sent uplink data stream according to the logical information segment 2, so that the first codebook that is in the codebook cluster indicated by the second codebook cluster information and that is in a one-to-one correspondence with the modulation order can be determined.

It should be understood that in this embodiment of the present invention, if logical information segments indicate index values, consistent index relationships of related information need to be established in advance on a network device side and a terminal device side. The index relationships are, for example, an index relationship between a codebook cluster index value and a codebook cluster and an index relationship between a codebook index value and a codebook in each codebook cluster, so that the network device and the terminal device can uniquely determine a corresponding codebook cluster and codebook according to the index values indicated by the logical information segments and by using the related index relationships that are established in advance.

It should be further understood that in this embodiment of the present invention, the network device and the terminal device may store a codebook in advance by using multiple methods, but the following two conditions need to be met: First, the network device and the terminal device may know, according to the stored codebook, a quantity of resource units or subcarriers or resource elements included in one encoding unit. Second, the network device and the terminal device may know, according to the stored codebook, non-zero modulation symbols to be sent by the terminal device and resource units or subcarriers or resource elements of one encoding unit to be used.

A simple and direct method to meet the foregoing storage conditions is storing a codebook in the foregoing form, and all zero modulation symbols and non-zero modulation symbols of a codeword are stored:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \dots, \begin{pmatrix} c_{1,Q_m} \\ c_{2,Q_m} \\ \vdots \\ c_{N,Q_m} \end{pmatrix} \right\}.$$

For example, when a modulation order is QPSK or 4-order modulation, a codebook used in a variable node 3 in FIG. 2 may be stored as:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

After a codebook is stored in the foregoing manner, a total quantity of zero modulation symbols and non-zero modulation symbols in the codeword is a quantity of resource units or subcarriers or resource elements included in one encoding unit. A position and a value of a non-zero modulation symbol represent that the terminal device is to send the non-zero modulation symbol having the corresponding value on a resource unit or a subcarrier or a resource element in a corresponding position of one encoding unit. For example, when the codebook in the variable node 3 in FIG. 2 is used, the terminal device sends a modulation symbol $c_{1,q}$ on a first resource unit or subcarrier or resource element of one encoding unit; the terminal device sends a modulation symbol $c_{2,q}$ on a second resource unit or subcarrier or resource element; and the terminal device sends zero modulation symbols on third and fourth resource units or subcarriers or resource elements, where $c_{n,q}=\alpha*\exp(j*\beta)$, where $1 \le n \le 2$, $1 \le q \le 4$, and $\alpha$ and $\beta$ may be any real numbers; for any q, $1 \le q \le 4$; $c_{1,q}$ and $c_{2,q}$ are not zero at the same time; and at least one group including q1 and q2 enables $c_{1,q_1} \ne 0$ and $c_{2,q_2} \ne 0$, where $1 \le q1 \le 4$ and $1 \le q2 \le 4$.

It should be further understood that this embodiment of the present invention is described only by using the foregoing solution as an example, but the present invention is not limited thereto. For example, when all codebooks that are stored in advance by the network device and the terminal device belong to a same codebook cluster, the codebook indication information may include only the third codebook information. For another example, when both the network device and the terminal device use a same fixed modulation order by default, the codebook indication information may include only the second codebook cluster information. For another example, when both the network device and the terminal device use a codebook cluster having a same fixed number by default, the codebook indication information may include only the third codebook information.

Therefore, a network device may use less information to indicate a first codebook to be used by a terminal device to send an uplink data stream. Therefore, according to the foregoing method, not only network capacity of a system can be effectively improved, but also system overheads can be reduced.

In an embodiment of the present invention, a network device and a terminal device store multiple predesigned codebooks. When the network device indicates, to the terminal device, that a first codebook is determined only according to the multiple codebooks and that is to be used to send an uplink data stream, the network device may indicate the first codebook to the terminal device by using information such as reference numbers or index values of codebooks.

Optionally, the codebook indication information determined by the network device includes an index value of the first codebook. Accordingly, after receiving a logical information segment that carries the index value, the terminal device may uniquely determine, according to the index value, the first codebook that is in a one-to-one correspondence with the index value. Therefore, the terminal device can send the uplink data stream according to the eventually determined first codebook, the non-orthogonal multiple access system operates normally, and network capacity of the system can be effectively improved.

It should be understood that in this embodiment of the present invention, if logical information segments indicate index values, a consistent index relationship of related information needs to be established in advance on a network device side and a terminal device side. The index relationship is, for example, an index relationship between a codebook index value and a codebook of multiple codebooks, so that the network device and the terminal device can uniquely determine a corresponding codebook according to the index value indicated by the logical information segment and by using the related index relationship that is established in advance.

It should be further understood that in this embodiment of the present invention, the network device and the terminal device may store a codebook in advance by using multiple methods, but the following two conditions need to be met: First, the network device and the terminal device may know, according to the stored codebook, a quantity of resource units or subcarriers or resource elements included in one encoding unit. Second, the network device and the terminal device may know, according to the stored codebook, non-zero modulation symbols to be sent by the terminal device and resource units or subcarriers or resource elements of one encoding unit to be used.

A simple and direct method to meet the foregoing storage conditions is storing a codebook in the foregoing form, and all zero modulation symbols and non-zero modulation symbols of a codeword are stored:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\}.$$

For example, when a modulation order is QPSK or 4-order modulation, a codebook used in a variable node 3 in FIG. 2 may be stored as:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

After a codebook is stored in the foregoing manner, a total quantity of zero modulation symbols and non-zero modulation symbols in the codeword is a quantity of resource units or subcarriers or resource elements included in one encoding unit. A position and a value of a non-zero modulation symbol represent that the terminal device is to send the non-zero modulation symbol having the corresponding value on a resource unit or a subcarrier or a resource element in a corresponding position of one encoding unit. For example, when the codebook in the variable node 3 in FIG. 2 is used, the terminal device sends a modulation symbol $c_{1,q}$ on a first resource unit or subcarrier or resource element of one encoding unit; the terminal device sends a modulation symbol $c_{2,q}$ on a second resource unit or subcarrier or resource element; and the terminal device sends zero modulation symbols on third and fourth resource units or subcarriers or resource elements, where, $c_{n,q}=\alpha*\exp(j*\beta)$, where $1 \le n \le 2$, $1 \le q \le 4$, and $\alpha$ and $\beta$ may be any real numbers; for any q, $1 \le q \le 4$; $c_{1,q}$ and $c_{2,q}$ are not zero at the same time; and at least one group including q1 and q2 enables $c_{1,q_1} \ne 0$ and $c_{2,q_2} \ne 0$, where $1 q 1 \le 4$ and $1 \le q 2 \le 4$.

It should be understood that in this embodiment of the present invention, the codebook indication information that includes only a codebook index value may be used to indicate, to the terminal device, the first codebook that is to be used to send the uplink data stream. Therefore, according to the foregoing method, not only network capacity of a system can be effectively improved, but also system overheads can be reduced.

It should be understood that in the embodiments of the present invention, because a characteristic sequence or a characteristic matrix is in a correspondence with a codebook, the characteristic sequence or the characteristic matrix may be used to indicate a codebook set or a codebook cluster that includes one or more codebooks. Therefore, in the embodiments of the present invention, the characteristic sequence or characteristic matrix may also be used to indicate, to the terminal device, the first codebook that is to be used to send the uplink data stream. A method for determining codebook indication information is described below in detail by using a characteristic sequence or a characteristic matrix with reference to FIG. 7 to FIG. 9.

As shown in FIG. 7, in an embodiment of the present invention, optionally, the determining codebook indication information used to indicate the first codebook includes the following steps.

S2241: Determine a first characteristic sequence to which the first codebook belongs and a first characteristic matrix to which the first characteristic sequence belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

S2242: Determine the codebook indication information, where the codebook indication information includes first characteristic matrix information, first characteristic sequence information, and fourth codebook information, where the first characteristic matrix information is used to indicate the first characteristic matrix, the first characteristic sequence information is used to indicate the first characteristic sequence in the first characteristic matrix, and the fourth codebook information is used to indicate the first codebook of one or more codebooks corresponding to the first characteristic sequence.

Specifically, in this embodiment of the present invention, the network device and the terminal device may store a predesigned codebook. Codebooks may be grouped into one or more codebook sets. Each codebook set includes one or more codebooks. Each codebook corresponds to a modulation order. Any two codebooks, for example, a codebook a and a codebook b, in a same codebook set have the following characteristics: A codeword in the codebook a and a codeword in the codebook b have a same total quantity of modulation symbols. In positions in which modulation symbols of all codewords are zero modulation symbols in the codebook a, modulation symbols of all codewords in the codebook b are also all zero modulation symbols. That is, the codebook set meets a condition that codewords in a same codebook set have a same total quantity of modulation symbols and that any two codebooks in a same codebook set have same positions in which modulation symbols of all codewords of the two codebooks are zero modulation symbols.

After codebook sets are obtained in the foregoing manner, as described above, each codebook set is in a one-to-one correspondence with one characteristic sequence of one characteristic matrix. The correspondence is determined in the following manner: If a codebook in a codebook set is in a correspondence with one characteristic sequence of one characteristic matrix, that is, the foregoing two conditions are met, the codebook set to which the codebook belongs is in a one-to-one correspondence with the characteristic sequence of the characteristic matrix. That is, a correspondence between a characteristic sequence and a codebook may be determined by using the following two conditions:

(1) A total quantity of modulation symbols in a codeword of a codebook is the same as a total quantity of elements in a corresponding characteristic sequence.

(2) For any element 1 in a characteristic sequence, at least one codeword can be found in a corresponding codebook, so that a modulation symbol of the codeword in a position of the element 1 is not a zero modulation symbol. For any element 0 in a characteristic sequence, modulation symbols that are of all codewords in a corresponding codebook and that are in a position corresponding to the element 0 are all zero modulation symbols.

In this embodiment of the present invention, the codebook indication information that is determined by the network device and that is used to indicate the first codebook may include the first characteristic matrix information, the first characteristic sequence information, and the fourth codebook information. For example, the codebook indication information may include three logical information segments. A logical information segment 1 may carry the first characteristic matrix information used to indicate the first characteristic matrix to be used by the terminal device to send a data stream. A logical information segment 2 may carry the first characteristic sequence information used to indicate the first characteristic sequence that is in the first characteristic matrix and that is to be used by the terminal device to send the data stream. A logical information segment 3 may carry the fourth codebook information used to indicate the first codebook that is of the one or more codebooks corresponding to the first characteristic sequence and that is to be used by the terminal device to send the data stream. The one or more codebooks corresponding to the first characteristic sequence are, for example, a third codebook set.

It should be understood that in this embodiment of the present invention, the logical information segments of the codebook indication information may appear consecutively or nonconsecutively in any sequence in an instruction at which the codebook indication information is located. This is not limited in this embodiment of the present invention.

Accordingly, for example, after receiving an instruction or a message that carries the codebook indication information, the terminal device may know, according to the logical information segment 1, which characteristic matrix is to be used to send the to-be-sent uplink data stream; and may know, according to the logical information segment 2, which characteristic sequence in the characteristic matrix indicated by the logical information segment 1 is to be used to send the to-be-sent uplink data stream. Because a codebook set that includes one or more codebooks and a characteristic sequence have a one-to-one correspondence, the terminal device may know, according to the one-to-one correspondence and by using the characteristic sequence indicated by the logical information segment 2, a codebook set in which a codebook is to be used to send the to-be-sent uplink data stream. Furthermore, the terminal device may know, according to the logical information segment 3, which codebook of one or more codebooks corresponding to the characteristic sequence indicated by the logical information segment 2 is to be used to send the to-be-sent uplink data stream. The one or more codebooks corresponding to the first characteristic sequence are, for example, a third codebook set. Therefore, the terminal device can send the uplink data stream according to the eventually determined first codebook, the non-orthogonal multiple access system operates normally, and network capacity of the system can be effectively improved.

In this embodiment of the present invention, when any two different codebooks of the one or more codebooks corresponding to the first characteristic sequence correspond to different modulation orders, the logical information segment 3 may further indicate, by indicating a modulation order, a codebook of one or more codebooks that is to be used by the terminal device to send the to-be-sent uplink data stream. Accordingly, the terminal device may know, according to the logical information segment 3, a modulation order corresponding to the to-be-sent uplink data stream, so that the first codebook that is of the one or more codebooks corresponding to the first characteristic sequence and that is in a one-to-one correspondence with the modulation order can be determined.

That is, in this embodiment of the present invention, optionally, the fourth codebook information includes modulation order information of the first codebook, and modulation orders of the one or more codebooks corresponding to the first characteristic sequence are different, that is, a codebook of one or more codebooks corresponding to the first characteristic sequence and a modulation order have a one-to-one correspondence.

It should be understood that in this embodiment of the present invention, if logical information segments indicate index values, consistent index relationships of related information need to be established in advance on a network device side and a terminal device side. The index relationships are, for example, an index relationship between a characteristic matrix index value and a characteristic matrix, an index relationship between a characteristic sequence index value, and a characteristic sequence in each characteristic matrix, and an index relationship between a codebook index value and a codebook of one or more codebooks, so that the network device and the terminal device can uniquely determine a corresponding characteristic matrix, characteristic sequence, and codebook according to the index values indicated by the logical information segments and by using the related index relationships that are established in advance.

It should be further understood that in this embodiment of the present invention, the network device and the terminal device may store a characteristic matrix and a codebook in advance by using multiple methods, but the following two conditions need to be met: First, the network device and the terminal device may know, according to the stored characteristic matrix and codebook, a quantity of resource units or subcarriers or resource elements included in one encoding unit. Second, the network device and the terminal device may know, according to the stored characteristic matrix and codebook, non-zero modulation symbols to be sent by the terminal device and resource units or subcarriers or resource elements of one encoding unit to be used.

A simple and direct method to meet the foregoing storage conditions is:

(1) The characteristic matrix is stored in the foregoing form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}.$$

For example, for the example shown in FIG. 2, a corresponding characteristic matrix may be represented as:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

(2) Modulation symbols of corresponding codewords are stored according to an order of elements 1 in the foregoing characteristic sequence. For example, when a modulation order is QPSK or 4-order modulation, a codebook used in a variable node 3 in FIG. 2 is stored as:

$$\left\{ \begin{pmatrix} c_{1,1} \\ c_{2,1} \end{pmatrix}, \begin{pmatrix} c_{1,2} \\ c_{2,2} \end{pmatrix}, \begin{pmatrix} c_{1,3} \\ c_{2,3} \end{pmatrix}, \begin{pmatrix} c_{1,4} \\ c_{2,4} \end{pmatrix} \right\}.$$

After the characteristic matrix and the codebook are stored in the foregoing manner, the network device and the terminal device may know, according to the characteristic matrix, a quantity of resource units or subcarriers or resource elements included in one encoding unit, that is, a quantity of rows of the characteristic matrix. The network device and the terminal device know, according to a characteristic sequence in the characteristic matrix and a codebook of one or more codebooks corresponding to the characteristic sequence, resource units or subcarriers or resource elements of one encoding unit that are to be used to send zero modulation symbols and non-zero modulation symbols when the terminal device uses the characteristic sequence. For example, when the codebook in the variable node 3 in FIG. 2 is used, the terminal device sends a modulation symbol $c_{1,q}$ on a first resource unit or subcarrier or resource element of one encoding unit; the terminal device sends a modulation symbol $c_{2,q}$ on a second resource unit or subcarrier or resource element; and the terminal device sends zero modulation symbols on third and fourth resource units or subcarriers or resource elements, where $c_{n,q}=\alpha*\exp(j*\beta)$, where $1 \leq n \leq 2$, $1 \leq q \leq 4$, and $\alpha$ and $\beta$ may be any real numbers; for any q, $1 \leq q \leq 4$; $c_{1,q}$ and $c_{2,q}$ are not zero at the same time; and at least one group including q1 and q2 enables $c_{1,q_1} \neq 0$ and $c_{2,q_2} \neq 0$, where $1 \leq q1 \leq 4$ and $1 \leq q2 \leq 4$.

It should be further understood that this embodiment of the present invention is described only by using the foregoing solution as an example, but the present invention is not limited thereto. For example, when the network device and the terminal device store only one characteristic matrix in advance, or when both the network device and the terminal device use a characteristic matrix having a same fixed number by default, the codebook indication information may include only the first characteristic sequence information and the fourth codebook information. For another example, when both the network device and the terminal device use a same fixed modulation order by default, the codebook indication information may include only the first characteristic matrix information and the first characteristic sequence information. For another example, when both the network device and the terminal device use a characteristic sequence having a same fixed number by default, the codebook indication information may include only the first characteristic matrix information and the fourth codebook information.

Therefore, a network device may use less information to indicate a first codebook to be used by a terminal device to send an uplink data stream. Therefore, according to the foregoing method, not only network capacity of a system can be effectively improved, but also system overheads can be reduced.

FIG. 8 shows still another schematic flowchart of a method 220 for determining codebook indication information according to an embodiment of the present invention. As shown in FIG. 8, in this embodiment of the present invention, optionally, the determining codebook indication information used to indicate the first codebook includes the following steps.

S2251: Determine a second characteristic matrix to which the first codebook belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

S2252: Determine the codebook indication information, where the codebook indication information includes second characteristic matrix information and fifth codebook information, where the second characteristic matrix information is used to indicate the second characteristic matrix, and the fifth codebook information is used to indicate the first codebook of one or more codebooks corresponding to the second characteristic matrix.

Specifically, in this embodiment of the present invention, the network device and the terminal device may store a predesigned codebook. Codebooks may be grouped into one or more codebook clusters. Each codebook cluster includes one or more codebooks. Any two codebooks, for example, a codebook a and a codebook b, in a same codebook cluster have the following characteristic: A codeword in the codebook a and a codeword in the codebook b have a same total quantity of modulation symbols, that is, all the codewords have a same length, that is, data streams are multiplexed on a same quantity of resource units. That is, a codebook cluster meets a condition that codewords in a same codebook cluster have a same total quantity of modulation symbols.

After codebook clusters are obtained in the foregoing manner, each codebook cluster is in a one-to-one correspondence with one characteristic matrix. The correspondence is determined in the following manner: If a total quantity of modulation symbols in a codeword of a codebook that belongs to a codebook cluster is the same as a quantity of rows of a characteristic matrix, the codebook cluster is in a one-to-one correspondence with the characteristic matrix.

In this embodiment of the present invention, the codebook indication information that is determined by the network device and that is used to indicate the first codebook may include the second characteristic matrix information and the fifth codebook information. For example, the codebook indication information may include two logical information segments. A logical information segment 1 may carry the second characteristic matrix information used to indicate a second characteristic matrix to be used by the terminal device to send a data stream. A logical information segment 2 may carry the fifth codebook information used to indicate the first codebook that is of the one or more codebooks corresponding to the second characteristic matrix and that is to be used by the terminal device to send the data stream. The one or more codebooks corresponding to the second characteristic matrix are, for example, a third codebook cluster.

It should be understood that in this embodiment of the present invention, the logical information segments of the codebook indication information may appear consecutively or nonconsecutively in any sequence in an instruction at which the codebook indication information is located. This is not limited in this embodiment of the present invention.

Accordingly, for example, after receiving an instruction or a message that carries the codebook indication information, the terminal device may know, according to the logical information segment 1, which characteristic matrix is to be used to send the to-be-sent uplink data stream. Because a codebook cluster that includes one or more codebooks is in a one-to-one correspondence with a characteristic matrix, the terminal device may know, according to the one-to-one correspondence and by using the characteristic matrix indicated by the logical information segment, a codebook cluster in which a codebook is to be used to send a to-be-sent uplink data stream. Furthermore, the terminal device may know, according to the logical information segment 2, the codebook that is in the codebook cluster corresponding to the characteristic matrix indicated by the logical information segment 1 and that is to be used to send the to-be-sent uplink data stream. The one or more codebooks corresponding to the second characteristic matrix are, for example, a third codebook cluster. Therefore, the terminal device can send the uplink data stream according to the eventually determined first codebook, the non-orthogonal multiple access system operates normally, and network capacity of the system can be effectively improved.

Similarly, in this embodiment of the present invention, when any two different codebooks in a codebook cluster correspond to different modulation orders, the logical information segment 2 may further indicate, by indicating a modulation order, a codebook that is in a codebook cluster and that is to be used by the terminal device to send the to-be-sent uplink data stream. Accordingly, the terminal device may know a modulation order corresponding to the to-be-sent uplink data stream according to the logical information segment 2, so that the first codebook that is in the third codebook cluster indicated by the fifth codebook set information and that is in a one-to-one correspondence with the modulation order can be determined.

It should be understood that in this embodiment of the present invention, if logical information segments indicate index values, consistent index relationships of related information need to be established in advance on a network device side and a terminal device side. The index relationships are, for example, an index relationship between a characteristic matrix index value and a characteristic matrix and an index relationship between a codebook index value and a codebook in each codebook cluster, so that the network device and the terminal device can uniquely determine a corresponding characteristic matrix and codebook according to the index values indicated by the logical information segments and by using the related index relationships that are established in advance.

It should be further understood that in this embodiment of the present invention, the network device and the terminal device may store a characteristic matrix and a codebook in advance by using multiple methods, but the following two conditions need to be met: First, the network device and the terminal device may know, according to the stored characteristic matrix and codebook, a quantity of resource units or subcarriers or resource elements included in one encoding unit. Second, the network device and the terminal device may know, according to the stored characteristic matrix and codebook, non-zero modulation symbols to be sent by the terminal device and resource units or subcarriers or resource elements of one encoding unit to be used.

A simple and direct method to meet the foregoing storage conditions is:

(1) The characteristic matrix is stored in the foregoing form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}.$$

For example, for the example shown in FIG. 2, a corresponding characteristic matrix may be stored as:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

(2) Modulation symbols of corresponding codewords are stored according to an order of elements 1 in the foregoing characteristic sequence. For example, when a modulation order is QPSK or 4-order modulation, a codebook used in a variable node 3 in FIG. 2 is stored as:

$$\left\{ \begin{pmatrix} c_{1,1} \\ c_{2,1} \end{pmatrix}, \begin{pmatrix} c_{1,2} \\ c_{2,2} \end{pmatrix}, \begin{pmatrix} c_{1,3} \\ c_{2,3} \end{pmatrix}, \begin{pmatrix} c_{1,4} \\ c_{2,4} \end{pmatrix} \right\}.$$

After the characteristic matrix and the codebook are stored in the foregoing manner, the network device and the terminal device may know, according to the characteristic matrix, a quantity of resource units or subcarriers or resource elements included in one encoding unit, that is, a quantity of rows of the characteristic matrix. The network device and the terminal device know, according to a characteristic sequence in the characteristic matrix and a codebook of one or more codebooks corresponding to the characteristic sequence, resource units or subcarriers or resource elements of one encoding unit that are to be used to send zero modulation symbols and non-zero modulation symbols when the terminal device uses the characteristic sequence. For example, when the codebook in the variable node 3 in FIG. 2 is used, the terminal device sends a modulation symbol $c_{1,q}$ on a first resource unit or subcarrier or resource element of one encoding unit; the terminal device sends a modulation symbol $c_{2,q}$ on a second resource unit or subcarrier or resource element; and the terminal device sends zero modulation symbols on third and fourth resource units or subcarriers or resource elements, where $c_{n,q} = \alpha * \exp(j*\beta)$, where $1 \leq n \leq 2$, $1 \leq q \leq 4$, and $\alpha$ and $\beta$ may be any real numbers; for any q, $1 \leq q \leq 4$; $c_{1,q}$ and $c_{2,q}$ are not zero at the same time; and at least one group including q1 and q2 enables $c_{1,q_1} \neq 0$ and $c_{2,q_2} \neq 0$, where $1 \leq q1 \leq 4$ and $1 \leq q2 \leq 4$.

It should be further understood that this embodiment of the present invention is described only by using the foregoing solution as an example, but the present invention is not limited thereto. For example, when the network device and the terminal device store only one characteristic matrix in advance, or when both the network device and the terminal device use a characteristic matrix having a same fixed number by default, the codebook indication information may include only the fifth codebook information. For another example, when both the network device and the terminal device use a same fixed modulation order by default, the codebook indication information may include only the second characteristic matrix information.

Therefore, a network device may use less information to indicate a first codebook to be used by a terminal device to send an uplink data stream. Therefore, according to the foregoing method, not only network capacity of a system can be effectively improved, but also system overheads can be reduced.

FIG. 9 shows another embodiment of a method 220 for determining codebook indication information according to the embodiments of the present invention. As shown in FIG. 9, in this embodiment of the present invention, optionally, the determining codebook indication information used to indicate the first codebook includes the following steps.

S2261: Determine a second characteristic sequence to which the first codebook belongs, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

S2262: Determine the codebook indication information, where the codebook indication information includes second characteristic sequence information and sixth codebook information, where the second characteristic sequence information is used to indicate the second characteristic sequence, and the sixth codebook information is used to indicate the first codebook of one or more codebooks corresponding to the second characteristic sequence.

Specifically, in this embodiment of the present invention, the network device and the terminal device may store a predesigned codebook. Codebooks may be grouped into one or more codebook sets. Each codebook set includes one or more codebooks. Each codebook corresponds to a modulation order. Any two codebooks, for example, a codebook a and a codebook b, in a same codebook set have the following characteristics: A codeword in the codebook a and a codeword in the codebook b have a same total quantity of modulation symbols. In positions in which modulation symbols of all codewords are zero modulation symbols in the codebook a, modulation symbols of all codewords in the codebook b are also all zero modulation symbols. That is, the codebook set meets a condition that codewords in a same codebook set have a same total quantity of modulation symbols and that any two codebooks in a same codebook set have same positions in which modulation symbols of all codewords of the two codebooks are zero modulation symbols.

After codebook sets are obtained in the foregoing manner, as described above, each codebook set is in a one-to-one correspondence with one characteristic sequence of one characteristic matrix. The correspondence is determined in the following manner: If a codebook in a codebook set is in a correspondence with one characteristic sequence of one characteristic matrix, that is, the foregoing two conditions are met, the codebook set to which the codebook belongs is in a one-to-one correspondence with the characteristic sequence of the characteristic matrix. That is, a correspondence between a characteristic sequence and a codebook may be determined by using the following two conditions.

(1) A total quantity of modulation symbols in a codeword of a codebook is the same as a total quantity of elements in a corresponding characteristic sequence.

(2) For any element 1 in a characteristic sequence, at least one codeword can be found in a corresponding codebook, so that a modulation symbol of the codeword in a position of the element 1 is not a zero modulation symbol. For any element 0 in a characteristic sequence, modulation symbols that are of all codewords in a corresponding codebook and that are in a position corresponding to the element 0 are all zero modulation symbols.

In this embodiment of the present invention, the codebook indication information that is determined by the network device and that is used to indicate the first codebook may include the second characteristic sequence information and the sixth codebook information. For example, the codebook indication information may include two logical information segments. A logical information segment 1 may carry the second characteristic sequence information used to indicate the second characteristic sequence to be used by the terminal device to send a data stream. A logical information segment 2 may carry the sixth codebook information used to indicate the first codebook that is of the one or more codebooks corresponding to the second characteristic sequence and that is to be used by the terminal device to send the data stream. The one or more codebooks corresponding to the second characteristic sequence are, for example, a fourth codebook set.

It should be understood that in this embodiment of the present invention, the logical information segments of the codebook indication information may appear consecutively or nonconsecutively in any sequence in an instruction at which the codebook indication information is located. This is not limited in this embodiment of the present invention.

Accordingly, for example, after receiving an instruction or a message that carries the codebook indication information, the terminal device may know, according to the logical information segment 1, which characteristic sequence is to be used to send the to-be-sent uplink data stream. Because a codebook set that includes one or more codebooks and a characteristic sequence have a one-to-one correspondence, the terminal device may know, according to the one-to-one correspondence and by using the characteristic sequence indicated by the logical information segment 1, a codebook set in which a codebook is to be used to send the to-be-sent uplink data stream. Furthermore, the terminal device may know, according to the logical information segment 2, which codebook of one or more codebooks corresponding to the characteristic sequence indicated by the logical information segment 1 is to be used to send the to-be-sent uplink data stream. The one or more codebooks corresponding to the second characteristic sequence are, for example, a fourth codebook set. Therefore, the terminal device can send the uplink data stream according to the eventually determined first codebook, the non-orthogonal multiple access system operates normally, and network capacity of the system can be effectively improved.

In this embodiment of the present invention, when any two different codebooks of the one or more codebooks corresponding to the second characteristic sequence correspond to different modulation orders, the logical information segment 2 may further indicate, by indicating a modulation order, a codebook of one or more codebooks that is to be used by the terminal device to send the to-be-sent uplink data stream. Accordingly, the terminal device may know a modulation order corresponding to the to-be-sent uplink data stream according to the logical information segment 2, so that the first codebook that is of the one or more codebooks corresponding to the second characteristic sequence and that is in a one-to-one correspondence with the modulation order can be determined.

That is, in this embodiment of the present invention, optionally, the sixth codebook information includes modulation order information of the first codebook, and modulation orders of the one or more codebooks corresponding to the second characteristic sequence are different, that is, a codebook of the one or more codebooks corresponding to the second characteristic sequence and a modulation order have a one-to-one correspondence.

It should be understood that in this embodiment of the present invention, if logical information segments indicate index values, consistent index relationships of related information need to be established in advance on a network device side and a terminal device side. The index relationships are, for example, an index relationship between a characteristic sequence index value and a characteristic sequence and an index relationship between a codebook index value and a codebook in each codebook set, so that the network device and the terminal device can uniquely determine a corresponding characteristic sequence and codebook according to the index values indicated by the logical information segments and by using the related index relationships that are established in advance.

It should be further understood that in this embodiment of the present invention, the network device and the terminal device may store a characteristic sequence and a codebook in advance by using multiple methods, but the following two conditions need to be met: First, the network device and the terminal device may know, according to the stored characteristic sequence and codebook, a quantity of resource units or subcarriers or resource elements included in one encoding unit. Second, the network device and the terminal device may know, according to the stored characteristic sequence and codebook, non-zero modulation symbols to be sent by the terminal device and resource units or subcarriers or resource elements of one encoding unit to be used.

A simple and direct method to meet the foregoing storage conditions is:

(1) The characteristic sequence is stored in the foregoing form:

$$\begin{pmatrix} r_{1,m} \\ r_{2,m} \\ \vdots \\ r_{N,m} \end{pmatrix}.$$

For example, for the example shown in FIG. 2, the corresponding characteristic sequences are stored as:

$$\begin{pmatrix}0\\1\\0\\1\end{pmatrix}, \begin{pmatrix}1\\0\\1\\0\end{pmatrix}, \begin{pmatrix}1\\1\\0\\0\end{pmatrix}, \begin{pmatrix}0\\0\\1\\1\end{pmatrix}, \begin{pmatrix}1\\0\\0\\1\end{pmatrix}, \text{and} \begin{pmatrix}0\\1\\1\\0\end{pmatrix}.$$

(2) Modulation symbols of corresponding codewords are stored according to an order of elements 1 in the foregoing characteristic sequence. For example, when a modulation order is QPSK or 4-order modulation, a codebook used in a variable node 3 in FIG. 2 is stored as:

$$\left\{ \begin{pmatrix} c_{1,1} \\ c_{2,1} \end{pmatrix}, \begin{pmatrix} c_{1,2} \\ c_{2,2} \end{pmatrix}, \begin{pmatrix} c_{1,3} \\ c_{2,3} \end{pmatrix}, \begin{pmatrix} c_{1,4} \\ c_{2,4} \end{pmatrix} \right\}.$$

After the characteristic sequence and the codebook are stored in the foregoing manner, the network device and the terminal device may know, according to the characteristic matrix, a quantity of resource units or subcarriers or resource elements included in one encoding unit, that is, a quantity of rows of the characteristic matrix. The network device and the terminal device know, according to a characteristic sequence in the characteristic matrix and a codebook of one or more codebooks corresponding to the characteristic sequence, resource units or subcarriers or resource elements of one encoding unit that are to be used to send zero modulation symbols and non-zero modulation symbols when the terminal device uses the characteristic sequence. For example, when the codebook in the variable node 3 in FIG. 2 is used, the terminal device sends a modulation symbol $c_{1,q}$ on a first resource unit or subcarrier or resource element of one encoding unit; the terminal device sends a modulation symbol $c_{2,q}$ on a second resource unit or subcarrier or resource element; and the terminal device sends zero modulation symbols on third and fourth resource units or subcarriers or resource elements, where $c_{n,q}=\alpha*\exp(j*\beta)$, where $1\le n\le 2$, $1\le q\le 4$, and $\alpha$ and $\beta$ may be any real numbers; for any q, $1\le q\le 4$; $c_{1,q}$ and $c_{2,q}$ are not zero at the same time; and at least one group including q1 and q2 enables $c_{1,q_1}\ne 0$ and $c_{2,q_2}\ne 0$, where $1\le q1\le 4$ and $1\le q2\le 4$.

It should be further understood that this embodiment of the present invention is described only by using the foregoing solution as an example, but the present invention is not limited thereto. For example, when the network device and the terminal device store only one characteristic sequence in advance, or when both the network device and the terminal device use a characteristic sequence having a same fixed number by default, the codebook indication information may include only the sixth codebook information. For another example, when both the network device and the terminal device use a same fixed modulation order by default, the codebook indication information may include only the second characteristic sequence information.

Therefore, a network device may use less information to indicate a first codebook to be used by a terminal device to send an uplink data stream. Therefore, according to the foregoing method, not only network capacity of a system can be effectively improved, but also system overheads can be reduced.

It should be understood that the present invention is described by using the embodiments shown in FIG. 4 to FIG. 9 only as an example, but the present invention is not limited thereto. Another method may be further used to indicate, to the terminal device, the first codebook that is assigned or designated by the network device and that is used to transmit the uplink data stream.

Therefore, for the method for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In the embodiments of the present invention, the network device may send the codebook indication information to the terminal device in multiple manners. For example, the network device may indicate the codebook indication information to the terminal device through a downlink control channel in a dynamic or semi-persistent manner. The network device may indicate the codebook indication information to the terminal device through a data channel in a semi-persistent manner. The network device may indicate the codebook indication information to the terminal device through a broadcast channel or a data channel in a static manner.

Optionally, in the embodiments of the present invention, the sending the codebook indication information to the terminal device includes: sending an uplink scheduling authorization message, dedicated high-layer control signaling, or a system broadcast message to the terminal device. The uplink scheduling authorization message, the dedicated high-layer control signaling, or the system broadcast message includes the codebook indication information.

Specifically, in the embodiments of the present invention, for example, when the terminal device needs to use a non-orthogonal multiple access technology to send an uplink data stream, the terminal device may send an uplink scheduling request to the network device. The uplink scheduling request is used to request the network device to assign or designate, to the terminal device, the first codebook as well as another system resource and parameter, for example, a frequency resource, a transmit power, and a coding and modulation scheme.

After receiving the uplink scheduling request from the terminal device, the network device may assign or designate the first codebook as well as another system resource and parameter to the to-be-sent data stream of the terminal device according to a data buffer status that is periodically or aperiodically reported by the terminal device and other related information (for example, channel status information for a user). The network device may add, to the uplink scheduling authorization message, the codebook indication information used to indicate the assigned or designated first codebook, as well as the another system resource and parameter, and deliver the uplink scheduling authorization message to the terminal device.

After receiving the uplink scheduling authorization message delivered by the network device, the terminal device may send the uplink data stream by using the first codebook and the another system resource and parameter that are indicated by the uplink scheduling authorization message and by using the non-orthogonal multiple access technology.

In the foregoing procedure, the codebook indication information used to indicate the first codebook may be used as a part of downlink control information (Downlink Control Information, "DCI" for short) and carried in the uplink scheduling authorization message, and is delivered to the terminal device in a dynamic or semi-persistent (semi-persistent) manner through a downlink physical control channel, for example, a physical downlink control channel (Physical Downlink Control Channel, "PDCCH" for short) in a Long Term Evolution (Long Term Evolution, "LTE" for short) system.

For another example, the codebook indication information used to indicate the first codebook may be carried in a radio resource control (Radio Resource Control, "RRC" for short) connection setup message or an RRC connection reconfiguration message, and is delivered to the terminal device in a semi-persistent manner through a downlink physical data channel, for example, a physical downlink shared channel (Physical Downlink Shared Channel, "PDSCH" for short) in an LTE system.

Optionally, the dedicated high-layer control signaling includes a radio resource control RRC connection setup message and an RRC connection reconfiguration message. It should be understood that in the embodiments of the present invention, only an example in which the dedicated high-layer control signaling includes the RRC connection setup message and the RRC connection reconfiguration message is used for description, but the present invention is not limited thereto. Other dedicated high-layer control signaling may be used to send the codebook indication information to the terminal device.

For still another example, the codebook indication information used to indicate the first codebook may be carried in the system broadcast message, for example, a master information block ("MIB" for short) or a system information block ("SIB" for short) in an LTE system, and is delivered to the terminal device in a static manner through a downlink physical broadcast channel or physical data channel, for example, a physical broadcast channel ("PBCH" for short) or a physical downlink shared channel PDSCH in the LTE system.

In the embodiments of the present invention, the network device sends the codebook indication information to the terminal device by using at least one of a bit string manner or a table manner. Optionally, the codebook indication information is bit string information.

Specifically, in the embodiments of the present invention, a logical information segment in the codebook indication information may be implemented by using multiple methods including, but is not limited to, the following several methods.

Method 1: For a logical information segment, a separate bit string or bitmap is used to implement an information indication function.

Assuming that in the foregoing embodiments, information indicated by a logical information segment (for example, the logical information segment is used to indicate a codebook cluster) in the codebook indication information have a maximum of K possibilities (for example, there are K codebook clusters in total), the logical information segment may be represented by using a bitmap $$\frac{L}{b_1, b_2, \ldots, b_L}$$

including $L=\text{ceil}(\log_2(K))$ bits, where ceil(•) represents rounding up. One value of the bitmap represents one index value of the indicated information. The terminal device may determine, according to the index value represented by the bitmap and by using an index relationship established in advance, a possibility that uniquely corresponds to the index value.

An example in which the codebook indication information includes the first codebook cluster information, the first codebook set information, and the first codebook information is used for description. It is assumed that $K_1 \geq 1$ codebook clusters in total are obtained through grouping, a codebook cluster that includes a largest quantity of codebook sets has $K_2 \geq 1$ codebook sets, and a codebook set that includes a largest quantity of codebooks has $K_3 \geq 1$ codebooks. In this case, a bitmap $$\frac{L}{b_1, b_2, \ldots, b_l}$$

including $L=\text{ceil}(\log_2(K_i))$ bits is used to represent and implement an information indication function of a logical information segment i, that is, indicate one of $K_i \geq 1$ possibilities, where i=1,2,3, and ceil(•) represents rounding up. For example, when $L_1=2$, $L_2=4$, and $L_3=3$, a possibility of the codebook indication information is $$\frac{2\quad 4\quad 3}{01\,0110\,100}.$$

The codebook indication information may include 2+4+3=9 bits, and indicate the following information: a codebook cluster corresponding to a codebook cluster index 1, a codebook set corresponding to a codebook set index 6 in the codebook cluster, and a codebook corresponding to a codebook index (or a modulation order index) 4 in the codebook set.

It should be understood that in the foregoing example, for all the three logical information segments in the codebook indication information, a separate bit string or bitmap is used to implement an information indication function. However, in practice, a same implementation manner does not need to be used for all the logical information segments. Therefore, during actual application, for some logical information segments, a separate bitmap may be used to implement information indication functions of the logical information segments, and for another logical information segment, another manner is used to implement an information indication function. The embodiments of the present invention are not limited thereto.

It should be further understood that only one of the specific embodiments of the present invention is used as an example for description above. It should be noted that the method may also be used to implement a logical information segment in the codebook indication information in another embodiment of the present invention.

Manner 2: Combined indication by using multiple logical information segments.

Combined indication by using logical information segments may usually be implemented based on a form of a table. The table may have the following forms: The table includes multiple columns, one column is a general index column, and each index value corresponds to a combination of information indicated by multiple logical information segments. In addition to the general index column, each of other columns in the table may separately correspond to one logical information segment, and is used to indicate a possibility of information indicated by the corresponding logical information segment. A value of the logical information segment may be an index value, or may be specific indicated content, for example, a codebook cluster, a codebook set, a codebook, a characteristic matrix, and a characteristic sequence.

By using the foregoing table, the network device and the terminal device may establish a correspondence between general index values and all possible combinations of the information indicated by the multiple logical information segments. The network device sends a general index value to the terminal device by using the codebook indication information. The terminal device may know, according to the general index value and by looking up the table, a possibility that uniquely corresponds to information indicated by the logical information segments.

An example in which the codebook indication information includes the first codebook cluster information, the first codebook set information, and the first codebook information is still used for description. A form of a table used to implement the codebook indication information is shown in Table 1:

TABLE 1

| Index | Codebook cluster or codebook cluster index | Codebook set or codebook set index | Codebook, codebook index, modulation order or modulation order index |
|---|---|---|---|
| ... | ... | ... | ... |
| m | i | j | k |
| ... | ... | ... | ... |

As shown in Table 1, the table of combined indication by using multiple logical information segments may include four columns. A first column is a general index column (referred to as an index column in this example). The other three columns respectively correspond to three logical information segments in the codebook indication information, where m is an index value, and i, j, and k may be index values of the information indicated by the logical information segments, or may be specific content of corresponding information, for example, a codebook stored in the foregoing form, and a formed codebook set and codebook cluster.

It should be understood that in the foregoing example, all logical information segments in the codebook indication information are indicated in a combined manner. In practice, a same implementation manner does not need to used for all the logical information segments. Therefore, during actual application, for some logical information segments, information indication functions of the logical information segments are implemented by means of combined indication, and for another logical information segment, another manner is used to implement an information indication function. The embodiments of the present invention are not limited thereto.

It should be further understood that only one of the specific embodiments of the present invention is used as an example for description above. It should be noted that the method may also be used to implement a logical information segment in the codebook indication information in another embodiment of the present invention.

Manner 3: Combined indication by using a logical information segment and an information segment that is in a message or an instruction at which the codebook indication information is located and that has another indication function.

The manner is usually also implemented based on a form of a table. The table may have the following forms: The table includes multiple columns. One column is a general index column, and each index value represents a combination of content indicated by other columns. In addition to the general index column, at least one column of the table corresponds to one logical information segment in the codebook indication information in the embodiments of the present invention, and represents a possibility of the content indicated by the corresponding logical information segment. A value of the column may be an index value, or may be specific indicated content, for example, a codebook cluster, a codebook set, a codebook, a characteristic matrix, and a characteristic sequence.

At least one of other columns in the table corresponds to an information segment having a function indicating another information (different from the information indicated by the logical information segments in the codebook indication information in the embodiments of the present invention), for example, an information segment indicating a size of a transport block, and an information segment indicating a redundancy version.

By using the foregoing table, the network device and the terminal device may establish a correspondence between general indices and all possible combinations of information indicated by a logical information segment in the codebook indication information in the embodiments of the present invention and of information indicated by an information segment having another information indication function. The network device sends a general index value to the terminal device by using the codebook indication information. The terminal device may know, according to the general index value and by looking up the table, a possibility that uniquely corresponds to information indicated by the logical information segment in the codebook indication information in the embodiments of the present invention and a possibility that uniquely corresponds to information indicated by the information segment having another information indication function.

An example in which the codebook indication information includes the first codebook cluster information, the first codebook set information, and the first codebook information is still used for description. A form of a table used to implement the codebook indication information is shown in Table 2:

TABLE 2

| Index | Transport block index | Codebook, codebook index, modulation order or modulation order index |
|---|---|---|
| ... | ... | ... |
| m | i | j |
| ... | ... | ... |

As shown in Table 2, the combined indication table includes three columns in total. The first column is a general index column. The second column is a transport block index column, and is used to indicate a size of a transport block. The third column may be used to indicate a logical information segment 3 in the codebook indication information.

It should be understood that only one of the specific embodiments of the present invention is used as an example for description above. It should be noted that the method may also be used to implement a logical information segment in the codebook indication information in another embodiment of the present invention.

It should be further understood that in the embodiments of the present invention, a logical information segment in the codebook indication information is a logical concept. In a message or an instruction at which the codebook indication information is located, for example, an uplink scheduling authorization message, an RRC connection setup message, an RRC connection reconfiguration message, and a broadcast message, an information segment or a bit string implements an information indication function of a logical information segment in the foregoing embodiments. In this case, it should be understood or considered that the information segment or bit string is an implementation of the corresponding logical information segment in the foregoing embodiments. The information segment or bit string herein may be any part of all bits that are used to form the message or instruction at which the codebook indication information is located, and the any part includes, an information bit and a check bit, for example, a cyclic redundancy check ("CRC" for short) bit that is scrambled by using a radio network temporary identifier ("RNTI" for short) of the terminal device.

Various implementation manners of the codebook indication information are described above in detail. An LTE system using a non-orthogonal multiple access technology is used as an example to describe a specific application of the embodiments of the present invention in the LTE system below in detail.

In the LTE system, for each to-be-sent uplink transport block (the transport block is equivalent to data or a data stream in the embodiments of the present invention) of the terminal device by using the uplink scheduling authorization message, the network device sends the following information segments to indicate corresponding information: an information segment about a modulation and coding scheme and a redundancy version: 5 bits, and used to indicate a size of the transport block, a modulation order, and a redundancy version number; and an information segment indicating new data: 1 bit, and used to indicate whether the transport block is retransmitted data or new data.

After the non-orthogonal multiple access technology is introduced in the LTE system, when the foregoing information segments are being delivered for each transport block of the terminal device, the one or more logical information segments in the embodiments of the present invention further need to be delivered to indicate the first codebook. Application of several embodiments of the present invention in the LTE system using the non-orthogonal multiple access technology is described below.

For the embodiment in which the codebook indication information includes the first codebook cluster information, the first codebook set information, and the first codebook information, the network device may send, for a transport block of the terminal device by using an uplink scheduling authorization message, the following information segments to indicate corresponding information:

Transport block i, i=1 or 2:
an information segment indicating a codebook cluster: $L_1$ bits, and used to indicate a codebook cluster to be used to send the transport block;
an information segment indicating a codebook set: $L_2$ bits, and used to indicate a codebook set to be used to send the transport block;
an information segment about a modulation and coding scheme and a redundancy version: 5 bits, and used to indicate a size of the transport block, a modulation order, and a redundancy version number; and
an information segment indicating new data: 1 bit, and used to indicate whether the transport block is retransmitted data or new data.

After the terminal device receives and decodes the uplink scheduling authorization message, for each transport block, the terminal device may know, according to the corresponding information segment indicating a codebook cluster, a codebook cluster in which a codebook is to be used to send the transport block; may know, according to the corresponding information segment indicating a codebook set, a codebook set that is in the codebook cluster and in which a codebook is to be used to send the transport block; and may know, according to the information segment about a modulation and coding scheme and a redundancy version, a modulation order to be used to send the transport block. The terminal device then determines a codebook corresponding to the modulation order according to a correspondence between a modulation order and a codebook in the codebook set, and uses the codebook to send the transport block.

For the embodiment in which the codebook indication information includes the second codebook set information and the second codebook information, the network device may send, for a transport block of the terminal device by using an uplink scheduling authorization message, the following information segments to indicate corresponding information:

Transport block i, i=1 or 2:
an information segment indicating a codebook set: $L_3$ bits, and used to indicate a codebook set to be used to send the transport block;
an information segment about a modulation and coding scheme and a redundancy version: 5 bits, and used to indicate a size of the transport block, a modulation order, and a redundancy version number; and
an information segment indicating new data: 1 bit, and used to indicate whether the transport block is retransmitted data or new data.

After the terminal device receives and decodes the uplink scheduling authorization message, for each transport block, the terminal device may know, according to the corresponding information segment indicating a codebook set, a codebook set in which a codebook is to be used to send the transport block; and may know, according to the information segment about a modulation and coding scheme and a redundancy version, a modulation order to be used to send the transport block. The terminal device then determines a codebook corresponding to the modulation order according to a correspondence between a modulation order and a codebook in the codebook set, and uses the codebook to send the transport block.

For the embodiment in which the codebook indication information includes the first characteristic matrix information, the first characteristic sequence information, and the fourth codebook information, the network device may send, for a transport block of the terminal device by using an uplink scheduling authorization message, the following information segments to indicate corresponding information:

Transport block i, i=1 or 2:
an information segment indicating a characteristic matrix: $L_4$ bits, and used to indicate a characteristic matrix to be used to send the transport block;
an information segment indicating a characteristic sequence: $L_5$ bits, and used to indicate a characteristic sequence to be used to send the transport block;
an information segment about a modulation and coding scheme and a redundancy version: 5 bits, and used to indicate a size of the transport block, a modulation order, and a redundancy version number; and
an information segment indicating new data: 1 bit, and used to indicate whether the transport block is retransmitted data or new data.

After the terminal device receives and decodes the uplink scheduling authorization message, for each transport block, the terminal device may know, according to the corresponding information segment indicating a characteristic matrix, which characteristic matrix is to be used to send the transport block; and may know, according to the corresponding information segment indicating a characteristic sequence, which characteristic sequence in the characteristic matrix is to be used to send the transport block. Because a characteristic sequence and a codebook set have a one-to-one correspondence, the terminal device may know, according to the correspondence, a codebook set in which a codebook is to be used to send the transport block. Further, the terminal device may know, according to the information segment about a modulation and coding scheme and a redundancy version, a modulation order to be used to send the transport block. The terminal device then determines a codebook corresponding to the modulation order according to a correspondence between a modulation order and a codebook in the codebook set, and uses the codebook to send the transport block.

For the embodiment in which the codebook indication information includes the second characteristic sequence information and the sixth codebook information, the network device may send, for a transport block of the terminal device by using an uplink scheduling authorization message, the following information segments to indicate corresponding information:

Transport block i, i=1 or 2:

an information segment indicating a characteristic sequence: $L_6$ bits, and used to indicate characteristic sequence to be used to send the transport block;

an information segment about a modulation and coding scheme and a redundancy version: 5 bits, and used to indicate a size of the transport block, a modulation order, and a redundancy version number; and an information segment indicating new data: 1 bit, and used to indicate whether the transport block is retransmitted data or new data.

After the terminal device receives and decodes the uplink scheduling authorization message, for each transport block, the terminal device may know, according to the corresponding information segment indicating a characteristic sequence, that a characteristic sequence is to be used to send the transport block. Because a characteristic sequence and a codebook set have a one-to-one correspondence, a user may know, according to the correspondence, a codebook set in which a codebook is to be used to send the transport block. Furthermore, the terminal device may know, according to the information segment about a modulation and coding scheme and a redundancy version, a modulation order to be used to send the transport block. The terminal device then determines a codebook corresponding to the modulation order according to a correspondence between a modulation order and a codebook in the codebook set, and uses the codebook to send the transport block.

In the embodiments of the present invention, optionally, the codebook is a sparse code multiple access SCMA codebook. Further, optionally, a quantity of zero modulation symbols is greater than or equal to a quantity of non-zero modulation symbols in a codeword included in the codebook.

It should be understood that only several possible specific applications of the embodiments of the present invention in the LTE system are described above, but the present invention is not limited thereto. In the LTE system using the non-orthogonal multiple access technology, the network device may further send another information segment to indicate the codebook indication information.

It should also be understood that sequence numbers of the foregoing processes in the various embodiments of the present invention do not mean execution orders. The execution orders of the processes should be determined according to functions and internal logic of the processes, and should not be construed as any limitation on the implementation processes of the embodiments of the present invention.

Therefore, for the method for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

The method for transmitting indication information according to the embodiments of the present invention is described above in detail from the perspective of a network device with reference to FIG. 3 to FIG. 9. A method for transmitting indication information according to embodiments of the present invention is described below from the perspective of a terminal device with reference to FIG. 10 to FIG. 17.

As shown in FIG. 10, a method 300 for transmitting indication information according to an embodiment of the present invention may be, for example, performed by a terminal device in a communications system. The terminal device is, for example, user equipment. The method 300 includes the following steps:

S310: Receive codebook indication information sent by a network device, where the codebook indication information is used to indicate a first codebook of one or more codebooks, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

S320: Determine the first codebook according to the codebook indication information.

S330: Send an uplink data stream according to the first codebook.

Specifically, in a non-orthogonal multiple access system such as an SCMA system, the network device assigns or designates a first codebook to a to-be-sent uplink data stream of the terminal device. To notify the terminal device of the first codebook assigned by the network device, the network device may determine codebook indication information, and send the codebook indication information to the terminal device. The codebook indication information is used to indicate the first codebook to be used by the terminal device to send the uplink data stream. After receiving the codebook indication information sent by the network device, the terminal device may determine, according to the codebook indication information, the first codebook to be used to send the uplink data stream, and can send the uplink data stream according to the first codebook. Therefore, by means of information exchange between the network device and the terminal device, the terminal device can determine the first codebook assigned by the network device, and the non-orthogonal multiple access system can operate normally.

Therefore, for the method for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In this embodiment of the present invention, in a non-orthogonal multiple access technology, multiple different data streams are transmitted on a same resource unit by using codebooks, that is, the multiple different data streams are multiplexed on the same resource unit, and different codebooks are used for different data streams, so as to improve utilization of resources. The data streams may come from a same terminal device or from different terminal devices.

Therefore, in the non-orthogonal multiple access technology, data in a data stream is directly mapped, according to a particular mapping relationship, into a codeword, that is, a multidimensional complex vector in a codebook, to implement sending of the data on multiple resource units in a spreading manner. The data may be binary bit data or may be q-ary data. The resource unit may be a resource unit in a time domain, a frequency domain, a space domain, a time-frequency domain, a time-space domain or a time-frequency-space domain.

In this embodiment of the present invention, a codebook includes two or more codewords, the codeword is a multi-dimensional complex vector and is used to represent a mapping relationship between data and at least two modulation symbols, and the at least two modulation symbols include at least one zero modulation symbol and at least one non-zero modulation symbol. Each characteristic matrix includes two or more characteristic sequences, each characteristic matrix corresponds to one or more codebooks, and each characteristic sequence also corresponds to one or more codebooks. A characteristic sequence includes an element 0 and an element 1. The element 0 represents that modulation symbols that are of all codewords in a corresponding codebook and that are in a position corresponding to the element 0 are all zero modulation symbols. The element 1 represents that modulation symbols that are of all codewords in a corresponding codebook and that are in a position corresponding to the element 1 are not all zero modulation symbols or are all non-zero modulation symbols.

In this embodiment of the present invention, multiple codebooks may be grouped into one or more codebook clusters. Each codebook cluster may include one or more codebooks. Any two codebooks, for example, a codebook a and a codebook b, in a same codebook cluster have the following characteristic: A codeword in the codebook a and a codeword in the codebook b have a same total quantity of modulation symbols. Therefore, a codebook in the codebook cluster meets a condition that all codewords have a same total quantity of modulation symbols, that is, all the codewords have a same length, that is, data streams are multiplexed on a same quantity of resource units.

In this embodiment of the present invention, multiple codebooks may further be grouped into one or more codebook sets. Each codebook set may include one or more codebooks. Any two codebooks, for example, a codebook c and a codebook d in a same codebook set have the following characteristics: (1) A codeword in the codebook c and a codeword in the codebook d have a same total quantity of modulation symbols. (2) In positions in which modulation symbols of all codewords in the codebook c are zero modulation symbols, modulation symbols of all codewords in the codebook d are also all zero modulation symbols.

In this embodiment of the present invention, each codebook cluster includes one or more codebook sets, each codebook set includes one or more codebooks, and each codebook includes two or more codewords. Each codebook cluster meets a condition that codewords in a same codebook cluster have a same total quantity of modulation symbols. Each codebook set meets a condition that codewords in a same codebook set have a same total quantity of modulation symbols and that any two codebooks in a same codebook set have same positions in which modulation symbols of all codewords of the two codebooks are zero modulation symbols.

It should be understood that in the non-orthogonal multiple access system, a codebook may be directly represented and stored. For example, the foregoing codebook or the codewords in the codebook are directly stored, or only modulation symbols in positions at which corresponding characteristic sequence elements are elements 1 in the codeword are stored. Therefore, during application of the present invention, it needs to be assumed that the network device and the terminal device in the non-orthogonal multiple access system can both store a part or all of the following predesigned content:

(1) one or more characteristic matrices:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m} \in \{0,1\}$, where $1 \leq n \leq N$, $1 \leq m \leq M$, M and N are both positive integers greater than 1, M may represent a quantity of multiplexed data streams, and N may represent a quantity of resource units included in one encoding unit, or may be understood as a length of a codeword;

(2) one or more characteristic sequences:

$$\begin{pmatrix} r_{1,m} \\ r_{2,m} \\ \vdots \\ r_{N,m} \end{pmatrix},$$

where $1 \leq m \leq M$; and (3) one or more codebooks:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\},$$

where $Q_m \geq 2$, $Q_m$ may represent a modulation order corresponding to the codebook, each codebook may correspond to a modulation order, and N is a positive integer greater than 1, and may be represented as a quantity of resource units included in one encoding unit, or may be understood as a length of a codeword.

A method 320 for determining a first codebook according to embodiments of the present invention is described below in detail with reference to FIG. 11 to FIG. 17.

As shown in FIG. 11, in an embodiment of the present invention, optionally, the codebook indication information includes first codebook cluster information, first codebook set information, and first codebook information. The first codebook cluster information is used to indicate a first codebook cluster, the first codebook set information is used to indicate a first codebook set in the first codebook cluster, and the first codebook information is used to indicate the first codebook in the first codebook set.

The determining the first codebook according to the codebook indication information includes the following step.

S321: Determine the first codebook in the first codebook set included in the first codebook cluster according to the first codebook cluster information, the first codebook set information, and the first codebook information, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

Specifically, in this embodiment of the present invention, the network device and the terminal device may store a predesigned codebook. Codebooks may be grouped into one or more codebook sets. Each codebook set includes one or more codebooks. Each codebook corresponds to a modulation order. Any two codebooks, for example, a codebook a and a codebook b, in a same codebook set have the following characteristics: A codeword in the codebook a and a codeword in the codebook b have a same total quantity of modulation symbols. In positions in which modulation symbols of all codewords are zero modulation symbols in the codebook a, modulation symbols of all codewords in the codebook b are also all zero modulation symbols. That is, the codebook set meets a condition that codewords in a same codebook set have a same total quantity of modulation symbols and that any two codebooks in a same codebook set have same positions in which modulation symbols of all codewords of the two codebooks are zero modulation symbols.

One or more codebook sets obtained by grouping in the foregoing manner may be further grouped into one or more codebook clusters. Each codebook cluster includes one or more codebook sets. Any two codebook sets, for example, a codebook set A and a codebook set B, in a same codebook cluster have the following characteristics: A codeword in the codebook set A and a codeword in the codebook set B have a same total quantity of modulation symbols, that is, all the codewords have a same length, that is, data streams are multiplexed on a same quantity of resource units. That is, a codebook cluster meets a condition that codewords in a same codebook cluster have a same total quantity of modulation symbols.

In this embodiment of the present invention, the codebook indication information that is sent by the network device and that is received by the terminal device may include the first codebook cluster information, the first codebook set information, and the first codebook information. For example, the codebook indication information may include three logical information segments. A logical information segment 1 may carry the first codebook cluster information used to indicate the first codebook cluster to be used by the terminal device to send a data stream. A logical information segment 2 may carry the first codebook set information used to indicate the first codebook set that is in the first codebook cluster and that is to be used by the terminal device to send the data stream. A logical information segment 3 may carry the first codebook information used to indicate the first codebook that is in the first codebook set and that is to be used by the terminal device to send the data stream.

It should be understood that in this embodiment of the present invention, the logical information segments of the codebook indication information may appear consecutively or nonconsecutively in any sequence in an instruction at which the codebook indication information is located. This is not limited in this embodiment of the present invention.

For example, after the terminal device receives an instruction or a message that carries the codebook indication information, the terminal device may know, according to the logical information segment 1, a codebook cluster in which a codebook is to be used to send a to-be-sent uplink data stream; may know, according to the logical information segment 2, a codebook set that is in the codebook cluster indicated by the logical information segment 1 and in which a codebook is to be used to send the to-be-sent uplink data stream; and may know, according to the logical information segment 3, which codebook in the codebook set indicated by the logical information segment 2 is to be used to send the to-be-sent uplink data stream. Therefore, the terminal device can send the uplink data stream according to the eventually determined first codebook, the non-orthogonal multiple access system operates normally, and network capacity of the system can be effectively improved.

In this embodiment of the present invention, when any two different codebooks in a codebook set correspond to different modulation orders, the logical information segment 3 may further indicate, by indicating a modulation order, the codebook that is in the codebook set and that is to be used by the terminal device to send the to-be-sent uplink data stream. Accordingly, the terminal device may know, according to the logical information segment 3, a modulation order corresponding to the to-be-sent uplink data stream, so that the first codebook that is in the codebook set indicated by the first codebook set information and that is in a one-to-one correspondence with the modulation order can be determined.

That is, in this embodiment of the present invention, optionally, the first codebook information includes modulation order information of the first codebook, and modulation orders of codebooks included in the first codebook set are different, that is, codebooks in the first codebook set are in a one-to-one correspondence with modulation orders.

It should be understood that in this embodiment of the present invention, if logical information segments indicate index values, consistent index relationships of related information need to be established in advance on a network device side and a terminal device side. The index relationships are, for example, an index relationship between a codebook cluster index value and a codebook cluster, an index relationship between a codebook set index value and a codebook set in each codebook cluster, and an index relationship between a codebook index value and a codebook in each codebook set. Therefore, the network device and the terminal device can uniquely determine a corresponding codebook cluster, codebook set, and codebook according to the index values indicated by the logical information segments and by using the related index relationships that are established in advance.

It should be further understood that in this embodiment of the present invention, the network device and the terminal device may store a codebook in advance by using multiple methods, but the following two conditions need to be met: First, the network device and the terminal device may know, according to the stored codebook, a quantity of resource units or subcarriers or resource elements included in one encoding unit. Second, the network device and the terminal device may know, according to the stored codebook, non-zero modulation symbols to be sent by the terminal device and resource units or subcarriers or resource elements of one encoding unit to be used.

A simple and direct method to meet the foregoing storage conditions is storing a codebook in the foregoing form, and all zero modulation symbols and non-zero modulation symbols of a codeword are stored:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\}.$$

For example, when a modulation order is QPSK or 4-order modulation, a codebook used in a variable node 3 in FIG. 2 may be stored as:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

After a codebook is stored in the foregoing manner, a total quantity of zero modulation symbols and non-zero modulation symbols in the codeword is a quantity of resource units or subcarriers or resource elements included in one encoding unit. A position and a value of a non-zero modulation symbol represent that the terminal device is to send the non-zero modulation symbol having the corresponding value on a resource unit or a subcarrier or a resource element in a corresponding position of one encoding unit. For example, when the codebook in the variable node 3 in FIG. 2 is used, the terminal device sends a modulation symbol $c_{1,q}$ on a first resource unit or subcarrier or resource element of one encoding unit; the terminal device sends a modulation symbol $c_{2,q}$ on a second resource unit or subcarrier or resource element; and the terminal device sends zero modulation symbols on third and fourth resource units or subcarriers or resource elements, where $c_{n,q}=\alpha*\exp(j*\beta)$, where $1 \leq n \leq 2$, $1 \leq q \leq 4$, and $\alpha$ and $\beta$ may be any real numbers; for any q, $1 \leq q \leq 4$; $c_{1,q}$ and $c_{2,q}$ are not zero at the same time; and at least one group including q1 and q2 enables $c_{1,q_1} \neq 0$ and $c_{2,q_2} \neq 0$, where $1 \leq q1 \leq 4$ and $1 \leq q2 \leq 4$.

It should be further understood that this embodiment of the present invention is described only by using the foregoing solution as an example, but the present invention is not limited thereto. For example, when all codebooks that are stored in advance by the network device and the terminal device belong to a same codebook cluster, the codebook indication information may include only the first codebook set information and the first codebook information. For another example, when all codebooks that are stored in advance by the network device and the terminal device belong to a same codebook set, the codebook indication information may include only the first codebook cluster information and the first codebook information. For another example, when both the network device and the terminal device use a same fixed modulation order by default, the codebook indication information may include only the first codebook cluster information and the first codebook set information. For another example, when both the network device and the terminal device use, by default, a codebook set having a same fixed number, the codebook indication information may include only the first codebook cluster information and the first codebook information.

Therefore, in the foregoing method, a first codebook to be used by a terminal device to send an uplink data stream may be determined based on less codebook indication information. Therefore, according to the foregoing method, not only network capacity of a system can be effectively improved, but also system overheads can be reduced.

FIG. 12 shows another embodiment of a method 320 for determining a first codebook according to the embodiments of the present invention. As shown in FIG. 12, in this embodiment of the present invention, optionally, the codebook indication information includes second codebook set information and second codebook information. The second codebook set information is used to indicate a second codebook set, and the second codebook information is used to indicate the first codebook in the second codebook set.

The determining the first codebook according to the codebook indication information includes the following step:

S322: Determine the first codebook in the second codebook set according to the second codebook set information and the second codebook information, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

Optionally, the second codebook information includes modulation order information of the first codebook, and modulation orders of codebooks included in the second codebook set are different.

It should be understood that interaction between the network device and the terminal device and related characteristics and functions that are described from the perspective of the network device correspond to related characteristics and functions on from the perspective of the terminal device. Details are not described herein again for brevity.

Figure 13:
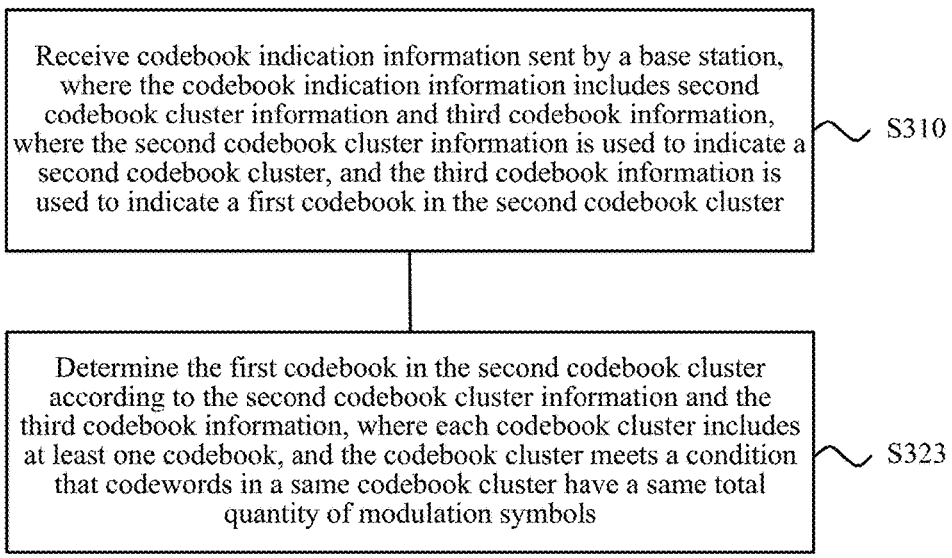
FIG. 13 is still another schematic flowchart of a method for determining a first codebook according to an embodiment of the present invention.

FIG. 13 shows still another embodiment of a method 320 for determining a first codebook according to the embodiments of the present invention. As shown in FIG. 13, in this embodiment of the present invention, optionally, the codebook indication information includes second codebook cluster information and third codebook information. The second codebook cluster information is used to indicate a second codebook cluster, and the third codebook information is used to indicate the first codebook in the second codebook cluster.

The determining the first codebook according to the codebook indication information includes the following step:

S323: Determine the first codebook in the second codebook cluster according to the second codebook cluster information and the third codebook information, where each codebook cluster includes at least one codebook, and the codebook cluster meets a condition that codewords in a same codebook cluster have a same total quantity of modulation symbols.

Figure 14:
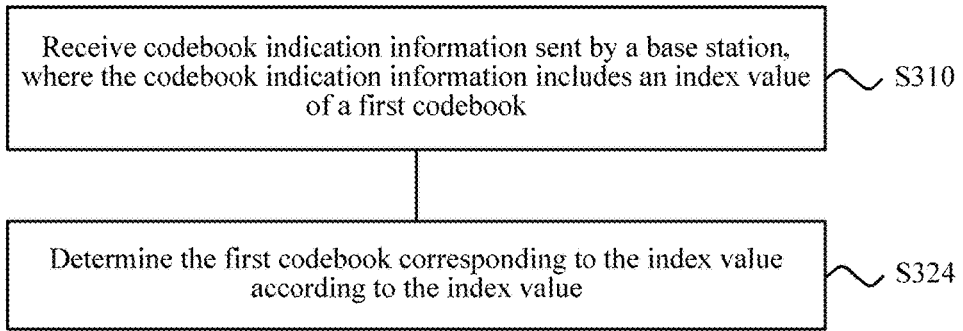
FIG. 14 is still another schematic flowchart of a method for determining a first codebook according to an embodiment of the present invention.

In an embodiment of the present invention, optionally, as shown in FIG. 14, the codebook indication information includes an index value of the first codebook.

The determining the first codebook according to the codebook indication information includes the following step:

S324: Determine the first codebook corresponding to the index value according to the index value.

In an embodiment of the present invention, optionally, as shown in FIG. 15, the codebook indication information includes first characteristic matrix information, first characteristic sequence information, and fourth codebook information. The first characteristic matrix information is used to indicate a first characteristic matrix, the first characteristic sequence information is used to indicate a first characteristic sequence in the first characteristic matrix, and the fourth codebook information is used to indicate the first codebook of one or more codebooks corresponding to the first characteristic sequence.

The determining the first codebook according to the codebook indication information includes the following step:

S325: Determine the first codebook of the one or more codebooks corresponding to the first characteristic sequence in the first characteristic matrix according to the first characteristic matrix information, the first characteristic sequence information, and the fourth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

In this embodiment of the present invention, optionally, the fourth codebook information includes modulation order information of the first codebook, and modulation orders of the one or more codebooks corresponding to the first characteristic sequence are different.

As shown in FIG. 16, in an embodiment of the present invention, optionally, the codebook indication information includes second characteristic matrix information and fifth codebook information. The second characteristic matrix information is used to indicate a second characteristic matrix, and the fifth codebook information is used to indicate the first codebook of one or more codebooks corresponding to the second characteristic matrix.

The determining the first codebook according to the codebook indication information includes the following step.

S326: Determine the first codebook of the one or more codebooks corresponding to the second characteristic matrix according to the second characteristic matrix information and the fifth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

As shown in FIG. 17, in an embodiment of the present invention, optionally, the codebook indication information includes second characteristic sequence information and sixth codebook information. The second characteristic sequence information is used to indicate a second characteristic sequence, and the sixth codebook information is used to indicate the first codebook of one or more codebooks corresponding to the second characteristic sequence.

The determining the first codebook according to the codebook indication information includes the following step.

S327: Determine the first codebook of the one or more codebooks corresponding to the second characteristic sequence according to the second characteristic sequence information and the sixth codebook information, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

Optionally, in this embodiment of the present invention, the sixth codebook information includes modulation order information of the first codebook, and modulation orders of the one or more codebooks corresponding to the second characteristic sequence are different.

It should be understood that interaction between the network device and the terminal device and related characteristics and functions that are described from the perspective of the network device correspond to related characteristics and functions from the perspective of the terminal device. Details are not described herein again for brevity.

Optionally, in the embodiments of the present invention, the receiving codebook indication information sent by a network device includes: receiving an uplink scheduling authorization message, dedicated high-layer control signaling, or a system broadcast message sent by the network device. The uplink scheduling authorization message, the dedicated high-layer control signaling, or the system broadcast message includes the codebook indication information. Optionally, in the embodiments of the present invention, the dedicated high-layer control signaling includes a radio resource control RRC connection setup message and an RRC connection reconfiguration message.

In the embodiments of the present invention, the terminal device may receive the codebook indication information sent by the network device by using at least one of a bit string manner or a table manner. Optionally, the codebook indication information is bit string information.

In the embodiments of the present invention, optionally, the codebook is a sparse code multiple access SCMA codebook. Furthermore, optionally, a quantity of zero modulation symbols is greater than or equal to a quantity of non-zero modulation symbols in a codeword included in the codebook.

It should be understood that interaction between the network device and the terminal device and related characteristics and functions that are described from the perspective of the network device correspond to related characteristics and functions from the perspective of the terminal device. Details are not described herein again for brevity.

It should also be understood that sequence numbers of the foregoing processes in the various embodiments of the present invention do not mean execution orders. The execution orders of the processes should be determined according to functions and internal logic of the processes, and should not be construed as any limitation on the implementation processes of the embodiments of the present invention.

Therefore, for the method for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

The method for transmitting indication information according to the embodiments of the present invention is described above in detail with reference to FIG. 3 to FIG. 17. An apparatus for transmitting indication information according to embodiments of the present invention is described below with reference to FIG. 18 to FIG. 28.

FIG. 18 shows an apparatus 500 for transmitting indication information according to an embodiment of the present invention. As shown in FIG. 18, the apparatus 500 includes: a first determining module 510, configured to determine, according to one or more codebooks, a first codebook to be used by a terminal device to send an uplink data stream, where the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol; a second determining module 520, configured to determine codebook indication information used to indicate the first codebook determined by the first determining module 510; and a sending module 530, configured to send the codebook indication information determined by the second determining module 520 to the terminal device.

Therefore, for the apparatus for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In an embodiment of the present invention, optionally, as shown in FIG. 19, the second determining module 520 includes: a first determining unit 5211, configured to determine a first codebook set to which the first codebook belongs and a first codebook cluster to which the first codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols; and a second determining unit 5212, configured to determine the codebook indication information, where the codebook indication information includes first codebook cluster information, first codebook set information, and first codebook information, where the first codebook cluster information is used to indicate the first codebook cluster, the first codebook set information is used to indicate the first codebook set in the first codebook cluster, and the first codebook information is used to indicate the first codebook in the first codebook set.

In this embodiment of the present invention, optionally, the first codebook information determined by the second determining unit 5212 includes modulation order information of the first codebook, and modulation orders of codebooks included in the first codebook set are different.

Figure 20:
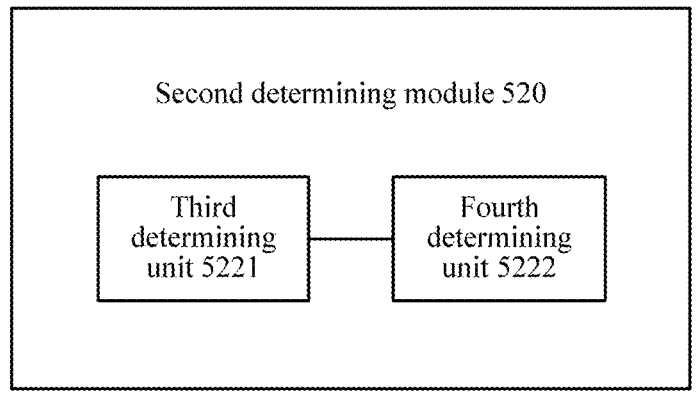
FIG. 20 is another schematic block diagram of a second determining module according to an embodiment of the present invention.

In an embodiment of the present invention, optionally, as shown in FIG. 20, the second determining module 520 includes: a third determining unit 5221, configured to determine a second codebook set to which the first codebook belongs, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols; and a fourth determining unit 5222, configured to determine the codebook indication information, where the codebook indication information includes second codebook set information and second codebook information, where the second codebook set information is used to indicate the second codebook set, and the second codebook information is used to indicate the first codebook in the second codebook set.

In this embodiment of the present invention, optionally, the second codebook information determined by the fourth determining unit 5222 includes modulation order information of the first codebook, and modulation orders of codebooks included in the second codebook set are different.

Figure 21:
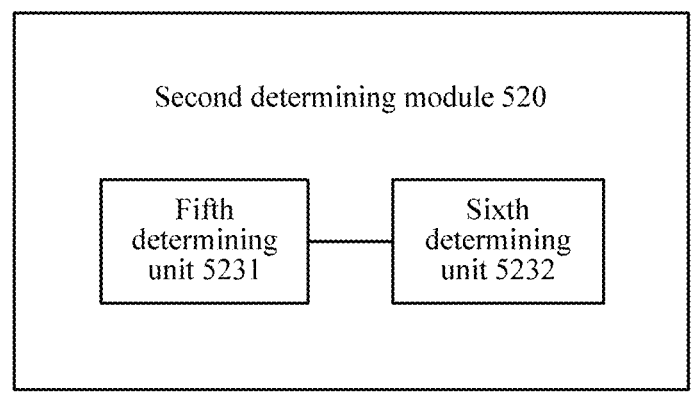
FIG. 21 is still another schematic block diagram of a second determining module according to an embodiment of the present invention.

As shown in FIG. 21, in an embodiment of the present invention, optionally, the second determining module 520 includes: a fifth determining unit 5231, configured to determine a second codebook cluster to which the first codebook belongs, where each codebook cluster includes at least one codebook, and the codebook cluster meets a condition that codewords in a same codebook cluster have a same total quantity of modulation symbols; and a sixth determining unit 5232, configured to determine the codebook indication information, where the codebook indication information includes second codebook cluster information and third codebook information, where the second codebook cluster information is used to indicate the second codebook cluster, and the third codebook information is used to indicate the first codebook in the second codebook cluster.

Optionally, in this embodiment of the present invention, the codebook indication information determined by the second determining module 520 includes an index value of the first codebook.

Figure 22:
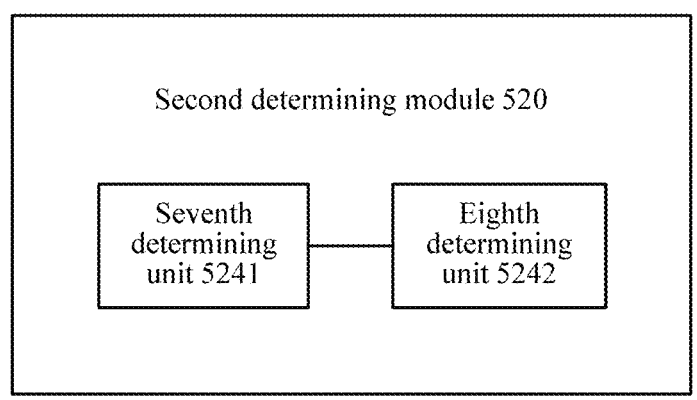
FIG. 22 is still another schematic block diagram of a second determining module according to an embodiment of the present invention.

As shown in FIG. 22, in an embodiment of the present invention, optionally, the second determining module 520 includes: a seventh determining unit 5241, configured to determine a first characteristic sequence to which the first codebook belongs and a first characteristic matrix to which the first characteristic sequence belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and an eighth determining unit 5242, configured to determine the codebook indication information, where the codebook indication information includes first characteristic matrix information, first characteristic sequence information, and fourth codebook information, where the first characteristic matrix information is used to indicate the first characteristic matrix, the first characteristic sequence information is used to indicate the first characteristic sequence in the first characteristic matrix, and the fourth codebook information is used to indicate the first codebook of one or more codebooks corresponding to the first characteristic sequence.

Optionally, in this embodiment of the present invention, the fourth codebook information determined by the eighth determining unit 5242 includes modulation order information of the first codebook, and modulation orders of the one or more codebooks corresponding to the first characteristic sequence are different.

Figure 23:
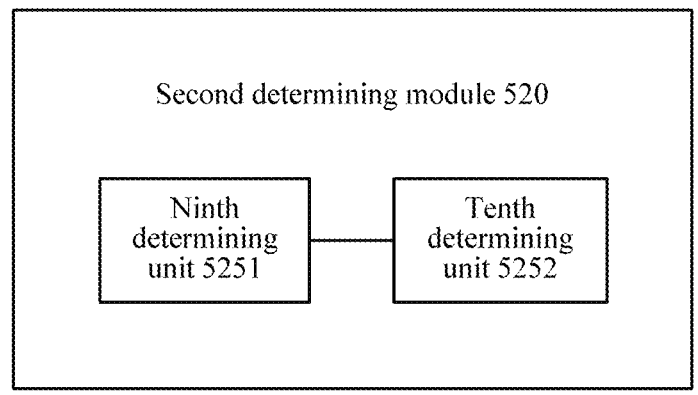
FIG. 23 is still another schematic block diagram of a second determining module according to an embodiment of the present invention.

As shown in FIG. 23, in an embodiment of the present invention, optionally, the second determining module 520 includes: a ninth determining unit 5251, configured to determine a second characteristic matrix to which the first codebook belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and a tenth determining unit 5252, configured to determine the codebook indication information, where the codebook indication information includes second characteristic matrix information and fifth codebook information, where the second characteristic matrix information is used to indicate the second characteristic matrix, and the fifth codebook information is used to indicate the first codebook of one or more codebooks corresponding to the second characteristic matrix.

Figure 24:
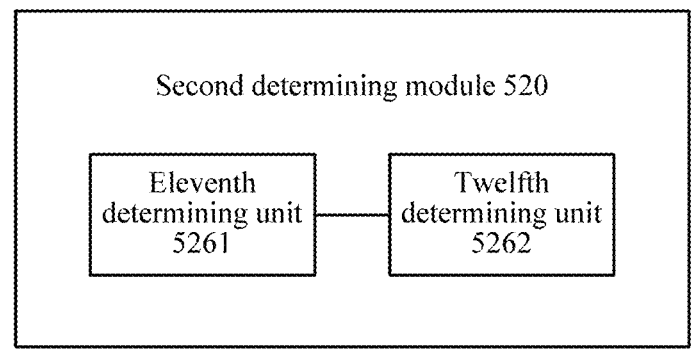
FIG. 24 is still another schematic block diagram of a second determining module according to an embodiment of the present invention.

In an embodiment of the present invention, optionally, as shown in FIG. 24, the second determining module 520 includes: an eleventh determining unit 5261, configured to determine a second characteristic sequence to which the first codebook belongs, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and a twelfth determining unit 5262, configured to determine the codebook indication information, where the codebook indication information includes second characteristic sequence information and sixth codebook information, where the second characteristic sequence information is used to indicate the second characteristic sequence, and the sixth codebook information is used to indicate the first codebook of one or more codebooks corresponding to the second characteristic sequence.

In this embodiment of the present invention, optionally, the sixth codebook information determined by the twelfth determining unit 5262 includes modulation order information of the first codebook, and modulation orders of the one or more codebooks corresponding to the second characteristic sequence are different.

Optionally, in the embodiments of the present invention, the sending module 530 is specifically configured to send an uplink scheduling authorization message, dedicated high-layer control signaling, or a system broadcast message to the terminal device. The uplink scheduling authorization message, the dedicated high-layer control signaling, or the system broadcast message includes the codebook indication information.

Optionally, in the embodiments of the present invention, the dedicated high-layer control signaling includes a radio resource control RRC connection setup message and an RRC connection reconfiguration message.

In the embodiments of the present invention, optionally, the codebook indication information sent by the sending module 530 is bit string information.

In the embodiments of the present invention, optionally, the codebook is a sparse code multiple access SCMA codebook.

In the embodiments of the present invention, optionally, a quantity of zero modulation symbols is greater than or equal to a quantity of non-zero modulation symbols in a codeword included in the codebook.

In the embodiments of the present invention, optionally, the apparatus 500 is a network device.

It should be understood that the apparatus 500 according to the embodiments of the present invention may correspond to the network device in the method embodiments of the present invention. The foregoing and other operations and/or functions of the modules in the apparatus 500 are separately used to implement corresponding procedures in the method 200 in FIG. 3 to FIG. 9, and details are not described herein again for brevity.

Therefore, for the apparatus for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In addition, the apparatus for transmitting indication information according to the embodiments of the present invention may use less information to indicate a first codebook to be used by a terminal device to send an uplink data stream. Therefore, by means of the foregoing apparatus, not only network capacity of a system can be effectively improved, but also system overheads can be reduced.

The apparatus for transmitting indication information according to the embodiments of the present invention is described above in detail from the perspective of the network device with reference to FIG. 18 to FIG. 24. An apparatus for transmitting indication information according to embodiments of the present invention is described below in detail from the perspective of a terminal device with reference to FIG. 25 and FIG. 26.

Figure 25:
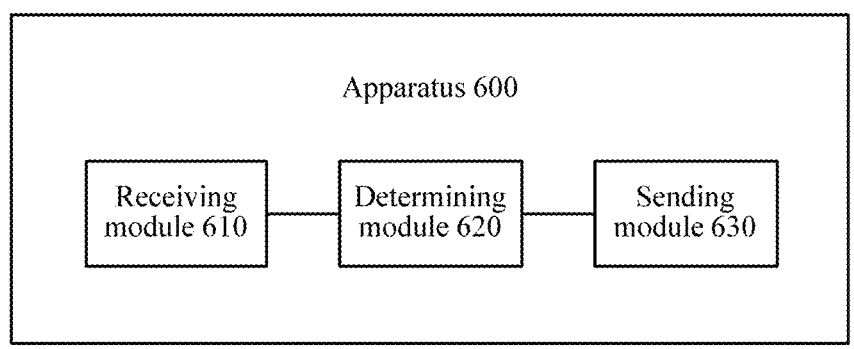
FIG. 25 is a schematic block diagram of an apparatus for transmitting indication information according to an embodiment of the present invention.

FIG. 25 shows an apparatus 600 for transmitting indication information according to an embodiment of the present invention. As shown in FIG. 25, the apparatus 600 includes: a receiving module 610, configured to receive codebook indication information sent by a network device, where the codebook indication information is used to indicate a first codebook of one or more codebooks, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol; a determining module 620, configured to determine the first codebook according to the codebook indication information received by the receiving module 610; and a sending module 630, configured to send an uplink data stream according to the first codebook determined by the determining module 620.

Therefore, for the apparatus for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

Figure 26:
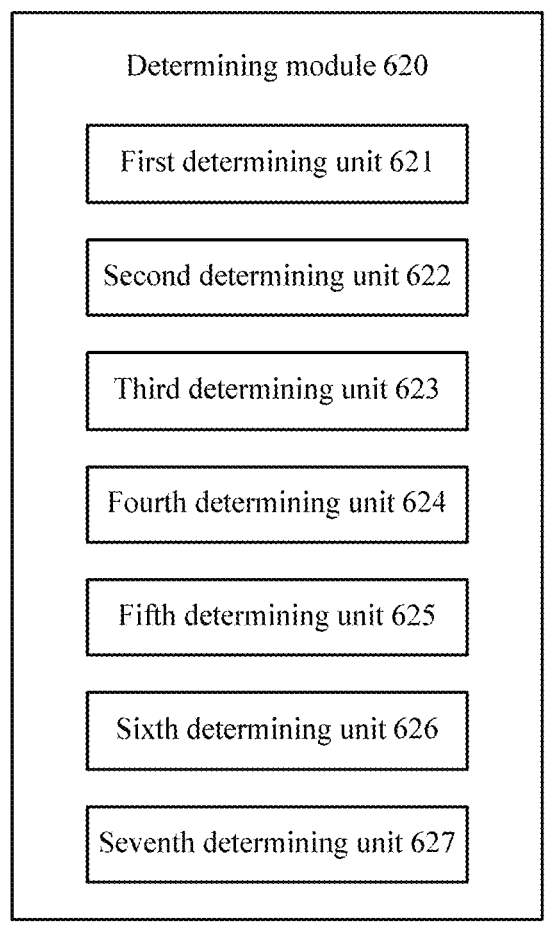
FIG. 26 is a schematic block diagram of a determining module according to an embodiment of the present invention.

In an embodiment of the present invention, optionally, as shown in FIG. 26, the codebook indication information received by the receiving module 610 includes first codebook cluster information, first codebook set information, and first codebook information. The first codebook cluster information is used to indicate a first codebook cluster, the first codebook set information is used to indicate a first codebook set in the first codebook cluster, and the first codebook information is used to indicate the first codebook in the first codebook set.

The determining module 620 includes: a first determining unit 621, configured to determine the first codebook in the first codebook set included in the first codebook cluster according to the first codebook cluster information, the first codebook set information, and the first codebook information. Each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

Optionally, in this embodiment of the present invention, the first codebook information received by the receiving module 610 includes modulation order information of the first codebook, and modulation orders of codebooks included in the first codebook set are different.

As shown in FIG. 26, optionally, in an embodiment of the present invention, the codebook indication information received by the receiving module 610 includes second codebook set information and second codebook information. The second codebook set information is used to indicate a second codebook set, and the second codebook information is used to indicate the first codebook in the second codebook set.

The determining module 620 includes: a second determining unit 622, configured to determine the first codebook in the second codebook set according to the second codebook set information and the second codebook information. Each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

Optionally, in this embodiment of the present invention, the second codebook information received by the receiving module 610 includes modulation order information of the first codebook, and modulation orders of codebooks included in the second codebook set are different.

As shown in FIG. 26, optionally, in an embodiment of the present invention, the codebook indication information received by the receiving module 610 includes second codebook cluster information and third codebook information. The second codebook cluster information is used to indicate a second codebook cluster, and the third codebook information is used to indicate the first codebook in the second codebook cluster.

The determining module 620 includes: a third determining unit 623, configured to determine the first codebook in the second codebook cluster according to the second codebook cluster information and the third codebook information. Each codebook cluster includes at least one codebook, and the codebook cluster meets a condition that codewords in a same codebook cluster have a same total quantity of modulation symbols.

As shown in FIG. 26, optionally, in an embodiment of the present invention, the codebook indication information received by the receiving module 610 includes an index value of the first codebook.

The determining module 620 includes: a fourth determining unit 624, configured to determine the first codebook corresponding to the index value according to the index value.

Optionally, in an embodiment of the present invention, as shown in FIG. 26, the codebook indication information received by the receiving module 610 includes first characteristic matrix information, first characteristic sequence information, and fourth codebook information. The first characteristic matrix information is used to indicate a first characteristic matrix, the first characteristic sequence information is used to indicate a first characteristic sequence in the first characteristic matrix, and the fourth codebook information is used to indicate the first codebook of one or more codebooks corresponding to the first characteristic sequence.

The determining module 620 includes: a fifth determining unit 625, configured to determine the first codebook of the one or more codebooks corresponding to the first characteristic sequence in the first characteristic matrix according to the first characteristic matrix information, the first characteristic sequence information, and the fourth codebook information. Each characteristic matrix includes two or more characteristic sequences, each characteristic sequence corresponds to one or more codebooks, and the characteristic sequence includes an element 0 and an element 1. The element 0 represents that modulation symbols that are of all codewords in a corresponding codebook and that are in a position corresponding to the element 0 are all zero modulation symbols. The element 1 represents that modulation symbols that are of all codewords in a corresponding codebook and that are in a position corresponding to the element 1 are not all zero modulation symbols or are all non-zero modulation symbols.

Optionally, in this embodiment of the present invention, the fourth codebook information received by the receiving module 610 includes modulation order information of the first codebook, and modulation orders of the one or more codebooks corresponding to the first characteristic sequence are different.

As shown in FIG. 26, optionally, in an embodiment of the present invention, the codebook indication information received by the receiving module 610 includes second characteristic matrix information and fifth codebook information. The second characteristic matrix information is used to indicate a second characteristic matrix, and the fifth codebook information is used to indicate the first codebook of one or more codebooks corresponding to the second characteristic matrix.

The determining module 620 includes: a sixth determining unit 626, configured to determine the first codebook of the one or more codebooks corresponding to the second characteristic matrix according to the second characteristic matrix information and the fifth codebook information. Each characteristic matrix includes two or more characteristic sequences, each characteristic sequence corresponds to one or more codebooks, and the characteristic sequence includes an element 0 and an element 1. The element 0 represents that modulation symbols that are of all codewords in a corresponding codebook and that are in a position corresponding to the element 0 are all zero modulation symbols. The element 1 represents that modulation symbols that are of all codewords in a corresponding codebook and that are in a position corresponding to the element 1 are not all zero modulation symbols or are all non-zero modulation symbols.

Optionally, in an embodiment of the present invention, as shown in FIG. 26, the codebook indication information received by the receiving module 610 includes second characteristic sequence information and sixth codebook information. The second characteristic sequence information is used to indicate a second characteristic sequence, and the sixth codebook information is used to indicate the first codebook of one or more codebooks corresponding to the second characteristic sequence.

The determining module 620 includes: a seventh determining unit 627, configured to determine the first codebook of the one or more codebooks corresponding to the second characteristic sequence according to the second characteristic sequence information and the sixth codebook information. Each characteristic sequence corresponds to one or more codebooks, and the characteristic sequence includes an element 0 and an element 1. The element 0 represents that modulation symbols that are of all codewords in a corresponding codebook and that are in a position corresponding to the element 0 are all zero modulation symbols. The element 1 represents that modulation symbols that are of all codewords in a corresponding codebook and that are in a position corresponding to the element 1 are not all zero modulation symbols or are all non-zero modulation symbols.

Optionally, in this embodiment of the present invention, the sixth codebook information received by the receiving module 610 includes modulation order information of the first codebook, and modulation orders of the one or more codebooks corresponding to the second characteristic sequence are different.

Optionally, in the embodiments of the present invention, the receiving module 610 is specifically configured to receive an uplink scheduling authorization message, dedicated high-layer control signaling, or a system broadcast message sent by the network device. The uplink scheduling authorization message, the dedicated high-layer control signaling, or the system broadcast message includes the codebook indication information.

Optionally, in the embodiments of the present invention, the dedicated high-layer control signaling includes a radio resource control RRC connection setup message and an RRC connection reconfiguration message.

Optionally, in the embodiments of the present invention, the codebook indication information received by the receiving module 610 is bit string information.

In the embodiments of the present invention, optionally, the codebook is a sparse code multiple access SCMA codebook.

In the embodiments of the present invention, optionally, a quantity of zero modulation symbols is greater than or equal to a quantity of non-zero modulation symbols in a codeword included in the codebook.

In the embodiments of the present invention, optionally, the apparatus 600 is a terminal device.

It should be understood that the apparatus 600 for transmitting indication information according to the embodiments of the present invention may correspond to the terminal device in the method embodiments of the present invention. The foregoing and other operations and/or functions of the modules in the apparatus 600 are separately used to implement corresponding procedures in the method 300 in FIG. 10 to FIG. 17, and details are not described herein again for brevity.

Therefore, for the apparatus for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In addition, the apparatus for transmitting indication information according to the embodiments of the present invention may determine, according to less codebook indication information, a first codebook to be used by the apparatus to send an uplink data stream. Therefore, by means of the apparatus according to this embodiment of the present invention, not only network capacity of the system can be effectively improved, but also system overheads can be reduced.

Figure 27:
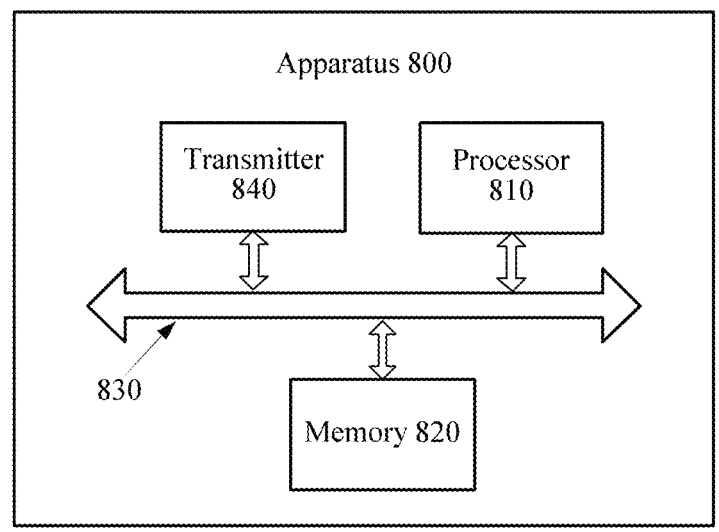
FIG. 27 is a schematic block diagram of an apparatus for transmitting indication information according to another embodiment of the present invention.

As shown in FIG. 27, an embodiment of the present invention further provides an apparatus 800 for transmitting indication information. The apparatus 800 includes: a processor 810, a memory 820, a bus system 830, and a transmitter 840. The processor 810, the memory 820, and the transmitter 840 are connected by using the bus system 830. The memory 820 is configured to store an instruction. The processor 810 is configured to execute the instruction stored in the memory 820, to control the transmitter 840 to send a signal. The processor 810 is configured to: determine, according to one or more codebooks, a first codebook to be used by a terminal device to send an uplink data stream, where the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol; and determine codebook indication information used to indicate the first codebook.

The transmitter 840 is configured to send the codebook indication information to the terminal device.

Therefore, for the apparatus for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved The network capacity includes a quantity of users who can access the system, spectral efficiency of the system, and the like.

It should be understood that in this embodiment of the present invention, the processor 810 may be a central processing unit (Central Processing Unit, "CPU" for short), or the processor 810 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 820 may include a read-only memory and a random access memory, and provides an instruction and data to the processor 810. A part of the memory 820 may further include a non-volatile random access memory. For example, the memory 820 may further store device type information.

The bus system 830 may include a power bus, a control bus, a status signal bus, and the like in addition to a data bus. However, for clear description, various types of buses in the figure are marked as the bus system 830.

In an implementation process, the steps of the foregoing method may be completed by using an integrated logical circuit of hardware in the processor 810 or an instruction in a form of software. Steps of the method disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 820, and the processor 810 reads information in the memory 820 and completes the steps of the foregoing method in combination with hardware of the processor 810. To avoid repetition, details are not described herein again.

Optionally, in an embodiment, the determining, by the processor 810, codebook indication information used to indicate the first codebook includes: determining a first codebook set to which the first codebook belongs and a first codebook cluster to which the first codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols; and determining the codebook indication information, where the codebook indication information includes first codebook cluster information, first codebook set information, and first codebook information, where the first codebook cluster information is used to indicate the first codebook cluster, the first codebook set information is used to indicate the first codebook set in the first codebook cluster, and the first codebook information is used to indicate the first codebook in the first codebook set.

Optionally, in an embodiment, the first codebook information determined by the processor 810 includes modulation order information of the first codebook, and modulation orders of codebooks included in the first codebook set are different.

Optionally, in an embodiment, the determining, by the processor 810, codebook indication information used to indicate the first codebook includes: determining a second codebook set to which the first codebook belongs, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols; and determining the codebook indication information, where the codebook indication information includes second codebook set information and second codebook information, where the second codebook set information is used to indicate the second codebook set, and the second codebook information is used to indicate the first codebook in the second codebook set.

Optionally, in an embodiment, the second codebook information determined by the processor 810 includes modulation order information of the first codebook, and modulation orders of codebooks included in the second codebook set are different.

Optionally, in an embodiment, the determining, by the processor 810, codebook indication information used to indicate the first codebook includes: determining a second codebook cluster to which the first codebook belongs, where each codebook cluster includes at least one codebook, and the codebook cluster meets a condition that codewords in a same codebook cluster have a same total quantity of modulation symbols; and determining the codebook indication information, where the codebook indication information includes second codebook cluster information and third codebook information, where the second codebook cluster information is used to indicate the second codebook cluster, and the third codebook information is used to indicate the first codebook in the second codebook cluster.

Optionally, in an embodiment, the codebook indication information determined by the processor 810 includes an index value of the first codebook.

Optionally, in an embodiment, the determining, by the processor 810, codebook indication information used to indicate the first codebook includes: determining a first characteristic sequence to which the first codebook belongs and a first characteristic matrix to which the first characteristic sequence belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes first characteristic matrix information, first characteristic sequence information, and fourth codebook information, where the first characteristic matrix information is used to indicate the first characteristic matrix, the first characteristic sequence information is used to indicate the first characteristic sequence in the first characteristic matrix, and the fourth codebook information is used to indicate the first codebook of one or more codebooks corresponding to the first characteristic sequence.

Optionally, in an embodiment, the fourth codebook information determined by the processor 810 includes modulation order information of the first codebook, and modulation orders of the one or more codebooks corresponding to the first characteristic sequence are different.

Optionally, in an embodiment, the determining, by the processor 810, codebook indication information used to indicate the first codebook includes: determining a second characteristic matrix to which the first codebook belongs, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes second characteristic matrix information and fifth codebook information, where the second characteristic matrix information is used to indicate the second characteristic matrix, and the fifth codebook information is used to indicate the first codebook of one or more codebooks corresponding to the second characteristic matrix.

Optionally, in an embodiment, the determining, by the processor 810, codebook indication information used to indicate the first codebook includes: determining a second characteristic sequence to which the first codebook belongs, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes second characteristic sequence information and sixth codebook information, where the second characteristic sequence information is used to indicate the second characteristic sequence, and the sixth codebook information is used to indicate the first codebook of one or more codebooks corresponding to the second characteristic sequence.

Optionally, in an embodiment, the sixth codebook information determined by the processor 810 includes modulation order information of the first codebook, and codebooks of at least one codebook of the one or more codebooks corresponding to the second characteristic sequence have different modulation orders.

Optionally, in an embodiment, the sending, by the transmitter 840, the codebook indication information to the terminal device includes: sending an uplink scheduling authorization message, dedicated high-layer control signaling, or a system broadcast message to the terminal device, where the uplink scheduling authorization message, the dedicated high-layer control signaling, or the system broadcast message includes the codebook indication information.

Optionally, in an embodiment, the dedicated high-layer control signaling includes a radio resource control RRC connection setup message and an RRC connection reconfiguration message.

Optionally, in an embodiment, the codebook indication information sent by the transmitter 840 is bit string information.

Optionally, in an embodiment, the codebook is a sparse code multiple access SCMA codebook.

Optionally, in an embodiment, a quantity of elements 0 is greater than or equal to a quantity of modulation symbols in a codeword included in the codebook.

Optionally, in an embodiment, the apparatus 800 is a network device.

It should be understood that the apparatus 800 for transmitting indication information according to the embodiments of the present invention may correspond to the network device and the apparatus 500 in the embodiments of the present invention, and may correspond to a corresponding object that performs the method according to the embodiments of the present invention. The foregoing and other operations and/or functions of the modules in the apparatus 800 are separately used to implement corresponding procedures in the method in FIG. 3 to FIG. 9, and details are not described herein again for brevity.

Therefore, for the apparatus for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In addition, the apparatus for transmitting indication information according to the embodiments of the present invention may use less information to indicate a first codebook to be used by a terminal device to send an uplink data stream. Therefore, by means of the foregoing apparatus, not only network capacity of the system can be effectively improved, but also system overheads can be reduced.

As shown in FIG. 28, an embodiment of the present invention further provides an apparatus 900 for transmitting indication information. The apparatus 900 includes: a processor 910, a memory 920, a bus system 930, a receiver 940, and a transmitter 950. The processor 910, the memory 920, the receiver 940, and the transmitter 950 are connected by using the bus system 930. The memory 920 is configured to store an instruction. The processor 910 is configured to execute the instruction stored in the memory 920, to control the receiver 940 to receive a signal, and control the transmitter 950 to send a signal.

The receiver 940 is configured to receive codebook indication information sent by a network device, where the codebook indication information is used to indicate a first codebook of one or more codebooks, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol; the processor 910 is configured to determine the first codebook according to the codebook indication information; and the transmitter 950 is configured to send an uplink data stream according to the first codebook.

Therefore, for the apparatus for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

It should be understood that in this embodiment of the present invention, the processor 910 may be a central processing unit ("CPU" for short), or the processor 910 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 920 may include a read-only memory and a random access memory, and provides an instruction and data to the processor 910. A part of the memory 920 may further include a non-volatile random access memory. For example, the memory 920 may further store device type information.

The bus system 930 may include a power bus, a control bus, a status signal bus, and the like in addition to a data bus. However, for clear description, various types of buses in the figure are marked as the bus system 930.

In an implementation process, the steps of the foregoing method may be completed by using an integrated logical circuit of hardware in the processor 910 or an instruction in a form of software. Steps of the method disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 920, and the processor 910 reads information in the memory 920 and completes the steps of the foregoing method in combination with hardware of the processor 910. To avoid repetition, details are not described herein again.

Optionally, in an embodiment, the codebook indication information received by the receiver 940 includes first codebook cluster information, first codebook set information, and first codebook information. The first codebook cluster information is used to indicate a first codebook cluster, the first codebook set information is used to indicate a first codebook set in the first codebook cluster, and the first codebook information is used to indicate the first codebook in the first codebook set.

The determining, by the processor 910, the first codebook according to the codebook indication information includes: determining the first codebook in the first codebook set included in the first codebook cluster according to the first codebook cluster information, the first codebook set information, and the first codebook information, where each codebook cluster includes at least one codebook set, each codebook set includes at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

Optionally, in an embodiment, the first codebook information received by the receiver 940 includes modulation order information of the first codebook, and modulation orders of codebooks included in the first codebook set are different.

Optionally, in an embodiment, the codebook indication information received by the receiver 940 includes second codebook set information and second codebook information. The second codebook set information is used to indicate a second codebook set, and the second codebook information is used to indicate the first codebook in the second codebook set.

The determining, by the processor 910, the first codebook according to the codebook indication information includes: determining the first codebook in the second codebook set according to the second codebook set information and the second codebook information, where each codebook set includes at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

Optionally, in an embodiment, the second codebook information received by the receiver 940 includes modulation order information of the first codebook, and modulation orders of codebooks included in the second codebook set are different.

Optionally, in an embodiment, the codebook indication information received by the receiver 940 includes second codebook cluster information and third codebook information. The second codebook cluster information is used to indicate a second codebook cluster, and the third codebook information is used to indicate the first codebook in the second codebook cluster.

The determining, by the processor 910, the first codebook according to the codebook indication information includes: determining the first codebook in the second codebook cluster according to the second codebook cluster information and the third codebook information, where each codebook cluster includes at least one codebook, and the codebook cluster meets a condition that codewords in a same codebook cluster have a same total quantity of modulation symbols.

Optionally, in an embodiment, the codebook indication information received by the receiver 940 includes an index value of the first codebook.

The determining, by the processor 910, the first codebook according to the codebook indication information includes: determining the first codebook corresponding to the index value according to the index value.

Optionally, in an embodiment, the codebook indication information received by the receiver 940 includes first characteristic matrix information, first characteristic sequence information, and fourth codebook information. The first characteristic matrix information is used to indicate a first characteristic matrix, the first characteristic sequence information is used to indicate a first characteristic sequence in the first characteristic matrix, and the fourth codebook information is used to indicate the first codebook of one or more codebooks corresponding to the first characteristic sequence.

The determining, by the processor 910, the first codebook according to the codebook indication information includes: determining the first codebook of the one or more codebooks corresponding to the first characteristic sequence in the first characteristic matrix according to the first characteristic matrix information, the first characteristic sequence information, and the fourth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

Optionally, in an embodiment, the fourth codebook information received by the receiver 940 includes modulation order information of the first codebook, and modulation orders of the one or more codebooks corresponding to the first characteristic sequence are different.

Optionally, in an embodiment, the codebook indication information received by the receiver 940 includes second characteristic matrix information and fifth codebook information. The second characteristic matrix information is used to indicate a second characteristic matrix, and the fifth codebook information is used to indicate the first codebook of one or more codebooks corresponding to the second characteristic matrix.

The determining, by the processor 910, the first codebook according to the codebook indication information includes: determining the first codebook of the one or more codebooks corresponding to the second characteristic matrix according to the second characteristic matrix information and the fifth codebook information, where each characteristic matrix includes two or more characteristic sequences, each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

Optionally, in an embodiment, the codebook indication information received by the receiver 940 includes second characteristic sequence information and sixth codebook information. The second characteristic sequence information is used to indicate a second characteristic sequence, and the sixth codebook information is used to indicate the first codebook of one or more codebooks corresponding to the second characteristic sequence.

The determining, by the processor 910, the first codebook according to the codebook indication information includes: determining the first codebook of the one or more codebooks corresponding to the second characteristic sequence according to the second characteristic sequence information and the sixth codebook information, where each characteristic sequence corresponds to one or more codebooks, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

Optionally, in an embodiment, the sixth codebook information received by the receiver 940 includes modulation order information of the first codebook, and modulation orders of the one or more codebooks corresponding to the second characteristic sequence are different.

Optionally, in an embodiment, the receiving, by the receiver 940, codebook indication information sent by a network device includes: receiving an uplink scheduling authorization message, dedicated high-layer control signaling, or a system broadcast message sent by the network device, where the uplink scheduling authorization message, the dedicated high-layer control signaling, or the system broadcast message includes the codebook indication information.

Optionally, in an embodiment, the dedicated high-layer control signaling includes a radio resource control RRC connection setup message and an RRC connection reconfiguration message.

Optionally, in an embodiment, the codebook indication information received by the receiver 940 is bit string information.

Optionally, in an embodiment, the codebook is a sparse code multiple access SCMA codebook.

Optionally, in an embodiment, a quantity of elements 0 is greater than or equal to a quantity of modulation symbols in a codeword included in the codebook.

Optionally, in an embodiment, the apparatus 900 is a terminal device.

It should be understood that the apparatus 900 for transmitting indication information according to the embodiments of the present invention may correspond to the terminal device and the apparatus 600 in the embodiments of the present invention, and may correspond to a corresponding object that performs the methods according to the embodiments of the present invention. The foregoing and other operations and/or functions of the modules in the apparatus 900 are separately used to implement corresponding procedures in the method in FIG. 10 to FIG. 17, and details are not described herein again for brevity.

Therefore, for the apparatus for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In addition, the apparatus for transmitting indication information according to the embodiments of the present invention may determine, according to less codebook indication information, a first codebook to be used by the apparatus to send an uplink data stream. Therefore, by means of the apparatus according to the embodiments of the present invention, not only network capacity of the system can be effectively improved, but also system overheads can be reduced.

To describe a codebook set systematically, the codebook set in the foregoing embodiments is described herein again. The method and the apparatus for transmitting indication information are described above with reference to FIG. 1 to FIG. 28 when a codebook set has the following characteristics: The codebook set meets a condition that codewords in a same codebook set have a same total quantity of modulation symbols and that any two codebooks in a same codebook set have same positions in which modulation symbols of all codewords of the two codebooks are zero modulation symbols. The description in this paragraph can claim priority to Patent Application No. PCT/CN2014/094538.

In the embodiments of the present invention, multiple codebooks may further be grouped into one or more codebook sets having other characteristics. Each codebook set may also include one or more codebooks. For example, the codebook set may also have the following characteristic: The codebook set meets a condition that codewords in a same codebook set have a same total quantity of modulation symbols and that codebooks in a same codebook set have a same total quantity of codewords. It may also be understood that codewords in the codebook set have a same length and that codebooks in the codebook set have a same quantity of codewords. In this case, the method and the apparatus for transmitting indication information are described below in detail with reference to FIG. 29 to FIG. 38 when a codebook set has the foregoing characteristic.

In an embodiment of the present invention, a method 200 for transmitting indication information shown in FIG. 3 may be, for example, performed by a network device in a non-orthogonal multiple access system. The network device is, for example, a base station. The method 200 may include the following steps.

S210: Determine, according to one or more codebooks, a first codebook to be used by a terminal device to send an uplink data stream, where the codebook includes two or more codewords, the codeword is a multidimensional complex vector and is used to represent a mapping relationship between data and at least two modulation symbols, the mapping relationship may be a direct mapping relationship, and the at least two modulation symbols include at least one zero modulation symbol and at least one non-zero modulation symbol.

S220: Determine codebook indication information used to indicate the first codebook.

S230: Send the codebook indication information to the terminal device.

Specifically, in a non-orthogonal multiple access system such as an SCMA system, the network device assigns or designates a codebook to a to-be-sent uplink data stream of a terminal device. To notify the terminal device of the codebook assigned by the network device, the network device may determine codebook indication information, and send the codebook indication information to the terminal device. The codebook indication information is used to indicate the codebook to be used by the terminal device to send the uplink data stream. After receiving the codebook indication information sent by the network device, the terminal device may determine, according to the codebook indication information, the codebook to be used to send the uplink data stream, and can send the uplink data stream according to the codebook. Therefore, by means of information exchange between the network device and the terminal device, the terminal device can determine a codebook assigned by the network device, and the non-orthogonal multiple access system can operate normally.

Therefore, for the method for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In this embodiment of the present invention, in a non-orthogonal multiple access technology, multiple different data streams are transmitted on a same resource unit by using codebooks, that is, the multiple different data streams are multiplexed on the same resource unit, and different codebooks are used for different data streams, so as to improve utilization of resources. The data streams may come from a same terminal device or from different terminal devices.

Therefore, in the non-orthogonal multiple access technology, data in a data stream is directly mapped, according to a particular mapping relationship, into a codeword, that is, a multidimensional complex vector in a codebook, to implement sending of the data on multiple resource units in a spreading manner. The data may be binary bit data or may be q-ary data. The resource unit may be a resource unit in a time domain, a frequency domain, a space domain, a time-frequency domain, a time-space domain or a time-frequency-space domain.

In this embodiment of the present invention, a codebook includes two or more codewords, the codeword is a multidimensional complex vector and is used to represent a mapping relationship between data and at least two modulation symbols, the mapping relationship may be a direct mapping relationship, and the at least two modulation symbols include at least one zero modulation symbol and at least one non-zero modulation symbol. Each characteristic matrix includes two or more characteristic sequences, each characteristic matrix corresponds to one or more codebooks, and each characteristic sequence also corresponds to one or more codebooks. A characteristic sequence includes an element 0 and an element 1. The element 0 represents that modulation symbols that are of all codewords in a corresponding codebook and that are in a position corresponding to the element 0 are all zero modulation symbols. The element 1 represents that modulation symbols that are of all codewords in a corresponding codebook and that are in a position corresponding to the element 1 are not all zero modulation symbols or are all non-zero modulation symbols.

In this embodiment of the present invention, multiple codebooks may be grouped into one or more codebook clusters. Each codebook cluster may include one or more codebooks. Any two codebooks, for example, a codebook a and a codebook b, in a same codebook cluster have the following characteristic: A codeword in the codebook a and a codeword in the codebook b have a same total quantity of modulation symbols. Therefore, a codebook in the codebook cluster meets a condition that all codewords have a same total quantity of modulation symbols, that is, all the codewords have a same length, that is, data streams are multiplexed on a same quantity of resource units.

In this embodiment of the present invention, multiple codebooks may further be grouped into one or more codebook sets. Each codebook set may include one or more codebooks. Any two codebooks, for example, a codebook c and a codebook d, in a same codebook set have the following characteristics: (1) A codeword in the codebook c and a codeword in the codebook d have a same total quantity of modulation symbols. (2) A quantity of codewords in the codebook c and a quantity of codewords in the codebook d are the same, that is, codebooks in a codebook set have a same total quantity of codewords.

It should be understood that in this embodiment of the present invention, "a total quantity of modulation symbols in a codeword" may represent a quantity of modulation symbols included in the codeword. Accordingly, in this embodiment of the present invention, "a total quantity of codewords in a codebook" may represent a quantity of codewords included in the codebook. For example, for the foregoing codebook 2, the codebook 2 has four codewords, and a codeword 1 has four modulation symbols. Therefore, a total quantity of codewords in the codebook 2 is 4, and a total quantity of modulation symbols in the codeword 1 of the codebook 2 is 4. The codebook 2 and the codeword 1 may be respectively represented as:

codebook 2

$$\left\{ \begin{pmatrix} d_{1,1} \\ d_{2,1} \\ 0 \\ 0 \end{pmatrix}, \begin{pmatrix} d_{1,2} \\ d_{2,2} \\ 0 \\ 0 \end{pmatrix}, \begin{pmatrix} d_{1,3} \\ d_{2,3} \\ 0 \\ 0 \end{pmatrix}, \begin{pmatrix} d_{1,4} \\ d_{2,4} \\ 0 \\ 0 \end{pmatrix} \right\},$$

$$\left\{ \begin{pmatrix} d_{1,1} \\ d_{2,1} \\ 0 \\ 0 \end{pmatrix} \right\}.$$

and codeword 1

$$\left\{ \begin{pmatrix} d_{1,1} \\ d_{2,1} \\ 0 \\ 0 \end{pmatrix}, \begin{pmatrix} d_{1,2} \\ d_{2,2} \\ 0 \\ 0 \end{pmatrix}, \begin{pmatrix} d_{1,3} \\ d_{2,3} \\ 0 \\ 0 \end{pmatrix}, \begin{pmatrix} d_{1,4} \\ d_{2,4} \\ 0 \\ 0 \end{pmatrix} \right\},$$

In this embodiment of the present invention, each codebook cluster includes one or more codebook sets, each codebook set includes one or more codebooks, and each codebook includes two or more codewords. Each codebook cluster meets a condition that codewords in a same codebook cluster have a same total quantity of modulation symbols. Each codebook set meets a condition that codewords in a same codebook set have a same total quantity of modulation symbols. Codebooks in a same codebook set have a same total quantity of codewords.

A method 220 for determining codebook indication information according to embodiments of the present invention is described below in detail with reference to FIG. 29 to FIG. 31.

As shown in FIG. 29, in an embodiment of the present invention, optionally, the determining codebook indication information used to indicate the first codebook includes the following steps:

S2271: Determine a third codebook set to which the first codebook belongs and a third codebook cluster to which the third codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

S2272: Determine the codebook indication information, where the codebook indication information includes third codebook cluster information, third codebook set information, and seventh codebook information, where the third codebook cluster information is used to indicate the third codebook cluster, the third codebook set information is used to indicate the third codebook set in the third codebook cluster, and the seventh codebook information is used to indicate the first codebook in the third codebook set.

Specifically, in this embodiment of the present invention, the network device and the terminal device may store a predesigned codebook. Codebooks may be grouped into one or more codebook sets. Each codebook set includes one or more codebooks. Any two codebooks, for example, a codebook a and a codebook b, in a same codebook set have the following characteristics: A codeword in the codebook a and a codeword in the codebook b have a same total quantity of modulation symbols, that is, a codeword in the codebook a and a codeword in the codebook b have a same length, that is, data streams are multiplexed on a same quantity of resource units. A quantity of codewords in the codebook a and a quantity of codewords in the codebook b are the same, that is, codebooks in a codebook set have a same total quantity of codewords. Therefore, in this embodiment of the present invention, codebooks in a codebook set have a same total quantity of codewords, a quantity of codewords may be referred to as a modulation order, and certainly the modulation order may also be referred to as another name by a person skilled in the art. Therefore, it may be understood that the codebook set in this embodiment of the present invention includes codebooks having a same modulation order, and further, codewords in a codebook have a same length.

One or more codebook sets obtained by grouping in the foregoing manner may be further grouped into one or more codebook clusters. Each codebook cluster includes one or more codebook sets. Any two codebook sets, for example, a codebook set A and a codebook set B, in a same codebook cluster have the following characteristic: A codeword in the codebook set A and a codeword in the codebook set B have a same total quantity of modulation symbols, that is, all the codewords have a same length, that is, data streams are multiplexed on a same quantity of resource units. That is, a codebook cluster meets a condition that codewords in a same codebook cluster have a same total quantity of modulation symbols.

In this embodiment of the present invention, the codebook indication information that is determined by the network device and that is used to indicate the first codebook may include the third codebook cluster information, the third codebook set information, and the seventh codebook information. A logical information segment 1 may carry the third codebook cluster information used to indicate the third codebook cluster to be used by the terminal device to send a data stream. A logical information segment 2 may carry the third codebook set information used to indicate the third codebook set that is in the third codebook cluster and that is to be used by the terminal device to send the data stream. A logical information segment 3 may carry the seventh codebook information used to indicate the first codebook that is in the third codebook set and that is to be used by the terminal device to send the data stream.

It should be understood that in this embodiment of the present invention, the logical information segments of the codebook indication information may appear consecutively or nonconsecutively in any sequence in an instruction at which the codebook indication information is located. This is not limited in this embodiment of the present invention.

Accordingly, for example, after receiving an instruction or a message that carries the codebook indication information, the terminal device may know, according to the logical information segment 1, a codebook cluster in which a codebook is to be used to send a to-be-sent uplink data stream; may know, according to the logical information segment 2, a codebook set that is in the codebook cluster indicated by the logical information segment 1 and in which a codebook is to be used to send the to-be-sent uplink data stream; and may know, according to the logical information segment 3, which codebook in the codebook set indicated by the logical information segment 2 is to be used to send the to-be-sent uplink data stream. Therefore, the terminal device can send the uplink data stream according to the eventually determined first codebook, the non-orthogonal multiple access system operates normally, and network capacity of the system can be effectively improved.

In this embodiment of the present invention, when any two different codebook sets in a codebook cluster correspond to different modulation orders, that is, when codebook sets in the codebook cluster have different quantities of codewords, the logical information segment 2 may further indicate, by indicating a modulation order, a codebook set that is in a codebook cluster and that is to be used by the terminal device to send the to-be-sent uplink data stream. Accordingly, the terminal device may know a modulation order corresponding to the to-be-sent uplink data stream according to the logical information segment 2, so that the third codebook set that is in the third codebook cluster indicated by the third codebook cluster information and that is in a one-to-one correspondence with the modulation order can be determined.

That is, in this embodiment of the present invention, optionally, the third codebook set information includes modulation order information of the first codebook, and modulation orders corresponding to codebook sets included in the third codebook cluster are different, that is, a codebook set in the third codebook cluster and a modulation order have a one-to-one correspondence.

It should be understood that in this embodiment of the present invention, if logical information segments indicate index values, consistent index relationships of related information need to be established in advance on a network device side and a terminal device side. The index relationships are, for example, an index relationship between a codebook cluster index value and a codebook cluster, an index relationship between a codebook set index value and a codebook set in each codebook cluster, and an index relationship between a codebook index value and a codebook in each codebook set. Therefore, the network device and the terminal device can uniquely determine a corresponding codebook cluster, codebook set, and codebook according to the index values indicated by the logical information segments and by using the related index relationships that are established in advance.

It should be further understood that in this embodiment of the present invention, the network device and the terminal device may store a codebook in advance by using multiple methods, but the following two conditions need to be met: First, the network device and the terminal device may know, according to the stored codebook, a quantity of resource units or subcarriers or resource elements included in one encoding unit. Second, the network device and the terminal device may know, according to the stored codebook, non-zero modulation symbols to be sent by the terminal device and resource units or subcarriers or resource elements of one encoding unit to be used.

A simple and direct method to meet the foregoing storage conditions is storing a codebook in the foregoing form, and all zero modulation symbols and non-zero modulation symbols of a codeword are stored:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\}.$$

For example, when the modulation order is 4-order modulation, a codebook used in a variable node 3 in FIG. 2 may be stored as:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

After a codebook is stored in the foregoing manner, a total quantity of zero modulation symbols and non-zero modulation symbols in the codeword is a quantity of resource units or subcarriers or resource elements included in one encoding unit. A position and a value of a non-zero modulation symbol represent that the terminal device is to send the non-zero modulation symbol having the corresponding value on a resource unit or a subcarrier or a resource element in a corresponding position of one encoding unit. For example, when the codebook in the variable node 3 in FIG. 2 is used, the terminal device sends a modulation symbol $c_{1,q}$ on a first resource unit or subcarrier or resource element of one encoding unit; the terminal device sends a modulation symbol $c_{2,q}$ on a second resource unit or subcarrier or resource element; and the terminal device sends zero modulation symbols on third and fourth resource units or subcarriers or resource elements, where $c_{n,q} = \alpha * \exp(j*\beta)$, where $1 \leq n \leq 2$, $1 \leq q \leq 4$, and $\alpha$ and $\beta$ may be any real numbers; for any q, $1 \leq q \leq 4$; $c_{1,q}$ and $c_{2,q}$ are not zero at the same time; and at least one group including q1 and q2 enables $c_{1,q_1} \neq 0$ and $c_{2,q_2} \neq 0$, where $1 \leq q1 \leq 4$ and $1 \leq q2 \leq 4$.

It should be further understood that this embodiment of the present invention is described only by using the foregoing solution as an example, but the present invention is not limited thereto. For example, when all codebooks that are stored in advance by the network device and the terminal device belong to a same codebook cluster, the codebook indication information may include only the third codebook set information and the seventh codebook information. For another example, when all codebooks that are stored in advance by the network device and the terminal device belong to a same codebook set, the codebook indication information may include only the third codebook cluster information and the seventh codebook information, or may include only the seventh codebook information. For another example, when codebook sets included in the third codebook cluster correspond to different modulation orders, that is, when a codebook set in the third codebook cluster and a modulation order have a one-to-one correspondence, if both the network device and the terminal device use a same fixed modulation order by default, that is, both the network device and the terminal device know the third codebook set information used to indicate a modulation order, the codebook indication information may include only the third codebook cluster information and the seventh codebook information.

Therefore, a network device may use less information to indicate a first codebook to be used by a terminal device to send an uplink data stream. Therefore, according to the foregoing method, not only network capacity of a system can be effectively improved, but also system overheads can be reduced.

It should be understood that in this embodiment of the present invention, the modulation order represents a quantity of codewords included in a codebook. Therefore, expressions such as "a modulation order corresponding to a codebook set" and "a modulation order of a codebook" all represent a quantity of codewords included in a codebook, and are no longer enumerated for brevity.

FIG. 30 shows still another embodiment of a method 220 for determining codebook indication information according to the embodiments of the present invention. As shown in FIG. 30, in this embodiment of the present invention, optionally, the determining codebook indication information used to indicate the first codebook includes the following steps.

S2281: Determine a fourth codebook set to which the first codebook belongs, where each codebook set includes at least one codebook, and the codebook set meets a condition that codewords in a same codebook set have a same total quantity of modulation symbols and that codebooks in a same codebook set have a same total quantity of codewords.

S2282: Determine the codebook indication information, where the codebook indication information includes fourth codebook set information and eighth codebook information, where the fourth codebook set information is used to indicate the fourth codebook set, and the eighth codebook information is used to indicate the first codebook in the fourth codebook set.

Specifically, in this embodiment of the present invention, the network device and the terminal device may store a predesigned codebook. Codebooks may be grouped into one or more codebook sets. Each codebook set includes one or more codebooks. Any two codebooks, for example, a codebook a and a codebook b, in a same codebook set have the following characteristics: A codeword in the codebook a and a codeword in the codebook b have a same total quantity of modulation symbols, that is, a codeword in the codebook a and a codeword in the codebook b have a same length, that is, data streams are multiplexed on a same quantity of resource units. A quantity of codewords in the codebook a and a quantity of codewords in the codebook b are the same, that is, codebooks in a codebook set have a same total quantity of codewords. Therefore, in this embodiment of the present invention, a codebook set includes codebooks having a same modulation order, and codewords in the codebook have a same length.

In this embodiment of the present invention, the codebook indication information that is determined by the network device and that is used to indicate the first codebook may include the fourth codebook set information and the eighth codebook information. For example, the codebook indication information may include two logical information segments. A logical information segment 1 may carry the fourth codebook set information used to indicate the fourth codebook set to be used by the terminal device to send a data stream. A logical information segment 2 may carry the eighth codebook information used to indicate the first codebook that is in the fourth codebook set and that is to be used by the terminal device to send the data stream.

It should be understood that in this embodiment of the present invention, the logical information segments of the codebook indication information may appear consecutively or nonconsecutively in any sequence in an instruction at which the codebook indication information is located. This is not limited in this embodiment of the present invention.

Accordingly, for example, after receiving an instruction or a message that carries the codebook indication information, the terminal device may know, according to the logical information segment 1, a codebook set in which a codebook is to be used to send the to-be-sent uplink data stream; and may know, according to the logical information segment 2, which codebook in the codebook set indicated by the logical information segment 1 is to be used to send the to-be-sent uplink data stream. Therefore, the terminal device can send the uplink data stream according to the eventually determined first codebook, the non-orthogonal multiple access system operates normally, and network capacity of the system can be effectively improved.

It should be understood that in this embodiment of the present invention, if logical information segments indicate index values, consistent index relationships of related information need to be established in advance on a network device side and a terminal device side. The index relationships are, for example, an index relationship between a codebook set index value and a codebook set and an index relationship between a codebook index value and a codebook in each codebook set, so that the network device and the terminal device can uniquely determine a corresponding codebook set and codebook according to the index values indicated by the logical information segments and by using the related index relationships that are established in advance.

It should be further understood that in this embodiment of the present invention, the network device and the terminal device may store a codebook in advance by using multiple methods. Details are not described again for brevity.

It should be further understood that this embodiment of the present invention is described only by using the foregoing solution as an example, but the present invention is not limited thereto. For example, when all codebooks that are stored in advance by the network device and the terminal device belong to a same codebook set, the codebook indication information may include only the eighth codebook information. For another example, when both the network device and the terminal device use, by default, a codebook set having a same fixed number, the codebook indication information may also include only the eighth codebook information.

Therefore, a network device may use less information to indicate a first codebook to be used by a terminal device to send an uplink data stream. Therefore, according to the foregoing method, not only network capacity of a system can be effectively improved, but also system overheads can be reduced.

FIG. 31 shows another embodiment of a method 220 for determining codebook indication information according to the embodiments of the present invention. As shown in FIG. 31, in this embodiment of the present invention, optionally, the determining codebook indication information used to indicate the first codebook includes the following steps.

S2291: Determine a fifth codebook set to which the first codebook belongs and a third characteristic matrix to which the fifth codebook set belongs, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

S2292: Determine the codebook indication information, where the codebook indication information includes third characteristic matrix information, fifth codebook set information, and ninth codebook information, where the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set.

Specifically, in this embodiment of the present invention, the network device and the terminal device may store a predesigned codebook. Codebooks may be grouped into one or more codebook sets. Each codebook set includes one or more codebooks. Any two codebooks, for example, a codebook a and a codebook b, in a same codebook set have the following characteristics: A codeword in the codebook a and a codeword in the codebook b have a same total quantity of modulation symbols, that is, a codeword in the codebook a and a codeword in the codebook b have a same length, that is, data streams are multiplexed on a same quantity of resource units. A quantity of codewords in the codebook a and a quantity of codewords in the codebook b are the same, that is, codebooks in a codebook set have a same total quantity of codewords. Therefore, in this embodiment of the present invention, a codebook set includes codebooks having a same modulation order, and codewords in the codebook have a same length.

After codebook sets are obtained in the foregoing manner, that is, one codebook set may uniquely correspond to one characteristic matrix; and one characteristic matrix may correspond to one or more codebook sets.

Therefore, in this embodiment of the present invention, the codebook indication information that is determined by the network device and that is used to indicate the first codebook may include the third characteristic matrix information, the fifth codebook set information, and the ninth codebook information. For example, the codebook indication information may include three logical information segments. A logical information segment 1 may carry the third characteristic matrix information used to indicate the third characteristic matrix to be used by the terminal device to send a data stream. A logical information segment 2 may carry the fifth codebook set information used to indicate the fifth codebook set that is of one or more codebook sets corresponding to the third characteristic matrix and that is to be used by the terminal device to send the data stream. A logical information segment 3 may carry the ninth codebook information used to indicate the first codebook that is in the fifth codebook set and that is to be used by the terminal device to send the data stream.

It should be understood that in this embodiment of the present invention, the logical information segments of the codebook indication information may appear consecutively or nonconsecutively in any sequence in an instruction at which the codebook indication information is located. This is not limited in this embodiment of the present invention.

Accordingly, for example, after receiving an instruction or a message that carries the codebook indication information, the terminal device may know, according to the logical information segment 1, which characteristic matrix is to be used to send the to-be-sent uplink data stream; and may know, according to the logical information segment 2, which codebook set of one or more codebook sets corresponding to the characteristic matrix indicated by the logical information segment 1 is to be used to send the to-be-sent uplink data stream. Furthermore, the terminal device may know, according to the logical information segment 3, which codebook in the fifth codebook set indicated by the logical information segment 2 is to be used to send the to-be-sent uplink data stream. Therefore, the terminal device can send the uplink data stream according to the eventually determined first codebook, the non-orthogonal multiple access system operates normally, and network capacity of the system can be effectively improved.

In this embodiment of the present invention, when any two different codebook sets of one or more codebook sets corresponding to the third characteristic matrix correspond to different modulation orders, the logical information segment 2 may further indicate, by indicating a modulation order, a codebook set of one or more codebook sets that is to be used by the terminal device to send the to-be-sent uplink data stream. Accordingly, the terminal device may know a modulation order corresponding to the to-be-sent uplink data stream according to the logical information segment 2, so that the fifth codebook set that is of one or more codebook sets corresponding to the third characteristic matrix and that is in a one-to-one correspondence with the modulation order can be determined.

That is, in this embodiment of the present invention, optionally, the fifth codebook set information includes modulation order information of the first codebook, and modulation orders corresponding to the one or more codebook sets corresponding to the third characteristic matrix are different, that is, a codebook set of one or more codebook sets corresponding to the third characteristic matrix and a modulation order have a one-to-one correspondence.

In this embodiment of the present invention, when a quantity of codebooks in a codebook set is the same as a quantity of characteristic sequences in a characteristic matrix corresponding to the codebook set, and each codebook in the codebook set corresponds to each characteristic sequence respectively, that is, a codebook in the codebook set and a characteristic sequence in the characteristic matrix have a correspondence, a codebook in the codebook set may be indicated by indicating a characteristic sequence.

Therefore, optionally, in this embodiment of the present invention, the ninth codebook information includes third characteristic sequence information. The third characteristic sequence information is used to indicate a third characteristic sequence in the third characteristic matrix. A quantity of codebooks in the fifth codebook set is the same as a quantity of characteristic sequences in the third characteristic matrix, and an order of the third characteristic sequence in at least two characteristic sequences included in the third characteristic matrix is the same as an order of the first codebook in the fifth codebook set.

It should be understood that in this embodiment of the present invention, only an example in which a quantity of codebooks in a codebook set is the same as a quantity of characteristic sequences in a characteristic matrix corresponding to the codebook set is used for description. However, the present invention is not limited thereto. When a quantity of codebooks in a codebook set and a quantity of characteristic sequences in a characteristic matrix corresponding to the codebook set are different, a codebook in the codebook set may still be indicated by indicating a characteristic sequence.

It should be understood that in this embodiment of the present invention, if logical information segments indicate index values, consistent index relationships of related information need to be established in advance on a network device side and a terminal device side. The index relationships are, for example, an index relationship between a characteristic matrix index value and a characteristic matrix, an index relationship between a codebook set index value and a codebook set in each codebook cluster, and an index relationship between a codebook index value and a codebook of one or more codebooks, so that the network device and the terminal device can uniquely determine a corresponding characteristic matrix, codebook set, and codebook according to the index values indicated by the logical information segments and by using the related index relationships that are established in advance.

It should be further understood that in this embodiment of the present invention, the network device and the terminal device may store a codebook, a characteristic sequence or a characteristic matrix in advance by using multiple methods. Details are not described again for brevity.

It should be further understood that this embodiment of the present invention is described only by using the foregoing solution as an example, but the present invention is not limited thereto. For example, when the network device and the terminal device store only one characteristic matrix in advance, or when both the network device and the terminal device use a characteristic matrix having a same fixed number by default, the codebook indication information may include only the fifth codebook set information and the ninth codebook information. For another example, when both the network device and the terminal device use a characteristic sequence having a same fixed number by default, the codebook indication information may include only the third characteristic matrix information and the fifth codebook set information.

It should be understood that the present invention is described by using the embodiments shown in FIG. 29 to FIG. 31 only as an example, but the present invention is not limited thereto. Another method may be further used to indicate, to the terminal device, the first codebook that is assigned or designated by the network device and that is used to transmit the uplink data stream.

Therefore, for the method for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In the embodiments of the present invention, the network device may send the codebook indication information to the terminal device in multiple manners. For example, the network device may indicate the codebook indication information to the terminal device through a downlink control channel in a dynamic or semi-persistent manner. The network device may indicate the codebook indication information to the terminal device through a data channel in a semi-persistent manner. The network device may indicate the codebook indication information to the terminal device through a broadcast channel or a data channel in a static manner.

Optionally, in the embodiments of the present invention, the sending the codebook indication information to the terminal device includes: sending an uplink scheduling authorization message, dedicated high-layer control signaling, or a system broadcast message to the terminal device. The uplink scheduling authorization message, the dedicated high-layer control signaling, or the system broadcast message includes the codebook indication information.

Optionally, the dedicated high-layer control signaling includes a radio resource control RRC connection setup message and an RRC connection reconfiguration message. It should be understood that in the embodiments of the present invention, only an example in which the dedicated high-layer control signaling includes the RRC connection setup message and the RRC connection reconfiguration message is used for description. However, the present invention is not limited thereto. Other dedicated high-layer control signaling may be used to send the codebook indication information to the terminal device.

In the embodiments of the present invention, optionally, the codebook is a sparse code multiple access SCMA codebook. Furthermore, optionally, a quantity of zero modulation symbols is greater than or equal to a quantity of non-zero modulation symbols in a codeword included in the codebook.

In the embodiments of the present invention, the network device sends the codebook indication information to the terminal device by using at least one of a bit string manner or a table manner. Optionally, the codebook indication information is bit string information.

Specifically, in the embodiments of the present invention, a logical information segment in the codebook indication information may be implemented by using multiple methods including, but is not limited to, the following several methods.

Method 1: For a logical information segment, a separate bit string or bitmap is used to implement an information indication function.

Manner 2: Combined indication by using multiple logical information segments.

Manner 3: Combined indication by using a logical information segment and an information segment that is in a message or an instruction at which the codebook indication information is located and that has another indication function.

For specific examples of implementing a logical information segment in the codebook indication information in the foregoing several manners, refer to the foregoing description. Details are not described again for brevity.

It should also be understood that sequence numbers of the foregoing processes in the various embodiments of the present invention do not mean execution orders. The execution orders of the processes should be determined according to functions and internal logic of the processes, and should not be construed as any limitation on the implementation processes of the embodiments of the present invention.

Therefore, for the method for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

The method for transmitting indication information according to the embodiments of the present invention is described above in detail from the perspective of the network device with reference to FIG. 29 to FIG. 31. The codebook set meets a condition that codewords in a same codebook set have a same total quantity of modulation symbols and that codebooks in a same codebook set have a same total quantity of codewords. A method for transmitting indication information according to embodiments of the present invention is described below from the perspective of a terminal device with reference to FIG. 32 to FIG. 34.

In an embodiment of the present invention, a method 300 for transmitting indication information shown in FIG. 10 may be, for example, performed by a terminal device in a communications system. The terminal device is, for example, user equipment. The method 300 includes the following steps.

S310: Receive codebook indication information, where the codebook indication information may be sent by a network device, the codebook indication information is used to indicate a first codebook of one or more codebooks, the codebook includes two or more codewords, the codeword is a multidimensional complex vector and is used to represent a mapping relationship between data and at least two modulation symbols, the mapping relationship may be a direct mapping relationship, and the at least two modulation symbols include at least one zero modulation symbol and at least one non-zero modulation symbol.

S320: Determine the first codebook according to the codebook indication information.

S330: Send a data stream according to the first codebook.

It should be understood that in this embodiment of the present invention, the data stream may be an uplink data stream, or may be a data stream sent by the terminal device to the network device.

Specifically, in a non-orthogonal multiple access system such as an SCMA system, the network device assigns or designates a first codebook to a to-be-sent uplink data stream of the terminal device. To notify the terminal device of the first codebook assigned by the network device, the network device may determine codebook indication information, and send the codebook indication information to the terminal device. The codebook indication information is used to indicate the first codebook to be used by the terminal device to send the uplink data stream. After receiving the codebook indication information sent by the network device, the terminal device may determine, according to the codebook indication information, the first codebook to be used to send the uplink data stream, and can send the uplink data stream according to the first codebook. Therefore, by means of information exchange between the network device and the terminal device, the terminal device can determine the first codebook assigned by the network device, and the non-orthogonal multiple access system can operate normally.

Therefore, for the method for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In this embodiment of the present invention, in a non-orthogonal multiple access technology, multiple different data streams are transmitted on a same resource unit by using codebooks, that is, the multiple different data streams are multiplexed on the same resource unit, and different codebooks are used for different data streams, so as to improve utilization of resources. The data streams may come from a same terminal device or from different terminal devices.

Therefore, in the non-orthogonal multiple access technology, data in a data stream is directly mapped, according to a particular mapping relationship, into a codeword, that is, a multidimensional complex vector in a codebook, to implement sending of the data on multiple resource units in a spreading manner. The data may be binary bit data or may be q-ary data. The resource unit may be a resource unit in a time domain, a frequency domain, a space domain, a time-frequency domain, a time-space domain or a time-frequency-space domain.

In this embodiment of the present invention, a codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol. Each characteristic matrix includes two or more characteristic sequences, each characteristic matrix corresponds to one or more codebooks, and each characteristic sequence also corresponds to one or more codebooks. A characteristic sequence includes an element 0 and an element 1. The element 0 represents that modulation symbols that are of all codewords in a corresponding codebook and that are in a position corresponding to the element 0 are all zero modulation symbols. The element 1 represents that modulation symbols that are of all codewords in a corresponding codebook and that are in a position corresponding to the element 1 are not all zero modulation symbols or are all non-zero modulation symbols.

In this embodiment of the present invention, multiple codebooks may be grouped into one or more codebook clusters. Each codebook cluster may include one or more codebooks. Any two codebooks, for example, a codebook a and a codebook b, in a same codebook cluster have the following characteristic: A codeword in the codebook a and a codeword in the codebook b have a same total quantity of modulation symbols. Therefore, a codebook in the codebook cluster meets a condition that all codewords have a same total quantity of modulation symbols, that is, all the codewords have a same length, that is, data streams are multiplexed on a same quantity of resource units.

In this embodiment of the present invention, multiple codebooks may further be grouped into one or more codebook sets. Each codebook set may include one or more codebooks. Any two codebooks, for example, a codebook c and a codebook d, in a same codebook set have the following characteristics: (1) A codeword in the codebook c and a codeword in the codebook d have a same total quantity of modulation symbols. (2) A quantity of codewords in the codebook c and a quantity of codewords in the codebook d are the same, that is, codebooks in a codebook set have a same total quantity of codewords.

In this embodiment of the present invention, each codebook cluster includes one or more codebook sets, each codebook set includes one or more codebooks, and each codebook includes two or more codewords. Each codebook cluster meets a condition that codewords in a same codebook cluster have a same total quantity of modulation symbols. Each codebook set meets a condition that codewords in a same codebook set have a same total quantity of modulation symbols and that codebooks in a same codebook set have a same total quantity of codewords.

A method 320 for determining a first codebook according to embodiments of the present invention is described below in detail with reference to FIG. 32 to FIG. 34.

As shown in FIG. 32, in an embodiment of the present invention, optionally, the codebook indication information includes third codebook cluster information, third codebook set information, and seventh codebook information. The third codebook cluster information is used to indicate a third codebook cluster, the third codebook set information is used to indicate a third codebook set in the third codebook cluster, and the seventh codebook information is used to indicate the first codebook in the third codebook set.

The determining the first codebook according to the codebook indication information includes the following step.

S328: Determine the first codebook in the third codebook set included in the third codebook cluster according to the third codebook cluster information, the third codebook set information, and the seventh codebook information, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

Specifically, in this embodiment of the present invention, the network device and the terminal device may store a predesigned codebook. Codebooks may be grouped into one or more codebook sets. Each codebook set includes one or more codebooks. The codebook set meets a condition that codewords in a same codebook set have a same total quantity of modulation symbols and that codebooks in a same codebook set have a same total quantity of codewords. One or more codebook sets obtained by grouping in the foregoing manner may be further grouped into one or more codebook clusters. Each codebook cluster includes one or more codebook sets. Any two codebook sets in a same codebook cluster have a same total quantity of modulation symbols. That is, all codewords in a codebook cluster have a same length, that is, data streams are multiplexed on a same quantity of resource units.

In this embodiment of the present invention, the codebook indication information that is sent by the network device and that is received by the terminal device may include the third codebook cluster information, the third codebook set information, and the seventh codebook information. For example, the codebook indication information may include three logical information segments. A logical information segment 1 may carry the third codebook cluster information used to indicate the third codebook cluster to be used by the terminal device to send a data stream. A logical information segment 2 may carry the third codebook set information used to indicate the third codebook set that is in the third codebook cluster and that is to be used by the terminal device to send the data stream. A logical information segment 3 may carry the seventh codebook information used to indicate the first codebook that is in the third codebook set and that is to be used by the terminal device to send the data stream.

It should be understood that in this embodiment of the present invention, the logical information segments of the codebook indication information may appear consecutively or nonconsecutively in any sequence in an instruction at which the codebook indication information is located. This is not limited in this embodiment of the present invention.

For example, after receiving an instruction or a message that carries the codebook indication information, the terminal device may know, according to the logical information segment 1, a codebook cluster in which a codebook is to be used to send a to-be-sent uplink data stream; may know, according to the logical information segment 2, a codebook set that is in the codebook cluster indicated by the logical information segment 1 and in which a codebook is to be used to send the to-be-sent uplink data stream; and may know, according to the logical information segment 3, which codebook in the codebook set indicated by the logical information segment 2 is to be used to send the to-be-sent uplink data stream. Therefore, the terminal device can send the uplink data stream according to the eventually determined first codebook, the non-orthogonal multiple access system operates normally, and network capacity of the system can be effectively improved.

In this embodiment of the present invention, when any two different codebook sets in a codebook cluster correspond to different modulation orders, that is, when codebook sets in the codebook cluster have different quantities of codewords, the logical information segment 2 may further indicate, by indicating a modulation order, a codebook set that is in a codebook cluster and that is to be used by the terminal device to send the to-be-sent uplink data stream. Accordingly, the terminal device may know a modulation order corresponding to the to-be-sent uplink data stream according to the logical information segment 2, so that the third codebook set that is in the third codebook cluster indicated by the third codebook cluster information and that is in a one-to-one correspondence with the modulation order can be determined.

That is, in this embodiment of the present invention, optionally, the third codebook set information includes modulation order information of the first codebook, and modulation orders corresponding to codebook sets included in the third codebook cluster are different, that is, the third codebook set in a codebook cluster and the modulation order have a one-to-one correspondence.

It should be understood that in this embodiment of the present invention, if logical information segments indicate index values, consistent index relationships of related information need to be established in advance on a network device side and a terminal device side. The index relationships are, for example, an index relationship between a codebook cluster index value and a codebook cluster, an index relationship between a codebook set index value and a codebook set in each codebook cluster, and an index relationship between a codebook index value and a codebook in each codebook set. Therefore, the network device and the terminal device can uniquely determine a corresponding codebook cluster, codebook set, and codebook according to the index values indicated by the logical information segments and by using the related index relationships that are established in advance.

It should be further understood that in this embodiment of the present invention, the network device and the terminal device may store a codebook, a codeword or the like in advance by using multiple methods. Details are not described herein again for brevity.

It should be further understood that this embodiment of the present invention is described only by using the foregoing solution as an example, but the present invention is not limited thereto. For example, when all codebooks that are stored in advance by the network device and the terminal device belong to a same codebook cluster, the codebook indication information may include only the third codebook set information and the seventh codebook information. For another example, when all codebooks that are stored in advance by the network device and the terminal device belong to a same codebook set, the codebook indication information may include only the third codebook cluster information and the seventh codebook information. For another example, when both the network device and the terminal device use a same fixed modulation order by default, the codebook indication information may include only the third codebook cluster information and the seventh codebook information. For another example, when both the network device and the terminal device use, by default, a codebook set having a same fixed number, the codebook indication information may include only the third codebook cluster information and the seventh codebook information.

Therefore, a network device may use less information to indicate a first codebook to be used by a terminal device to send an uplink data stream. Therefore, according to the foregoing method, not only network capacity of a system can be effectively improved, but also system overheads can be reduced.

FIG. 33 shows another embodiment of a method 320 for determining a first codebook according to the embodiments of the present invention. As shown in FIG. 33, in this embodiment of the present invention, optionally, the codebook indication information includes fourth codebook set information and eighth codebook information. The fourth codebook set information is used to indicate a fourth codebook set, and the eighth codebook information is used to indicate the first codebook in the fourth codebook set.

The determining the first codebook according to the codebook indication information includes the following step.

S329: Determine the first codebook in the fourth codebook set according to the fourth codebook set information and the eighth codebook information, where each codebook set includes at least one codebook, and the codebook set meets a condition that codewords in a same codebook set have a same total quantity of modulation symbols and that codebooks in a same codebook set have a same total quantity of codewords.

It should be understood that interaction between the network device and the terminal device and related characteristics and functions that are described from the perspective of the network device correspond to related characteristics and functions from the perspective of the terminal device. Details are not described herein again for brevity.

FIG. 34 shows still another embodiment of a method 320 for determining a first codebook according to the embodiments of the present invention. As shown in FIG. 34, in this embodiment of the present invention, optionally, the codebook indication information includes third characteristic matrix information, fifth codebook set information, and ninth codebook information. The third characteristic matrix information is used to indicate a third characteristic matrix, the fifth codebook set information is used to indicate a fifth codebook set of one or more codebook sets corresponding to the third characteristic matrix, and the ninth codebook information is used to indicate the first codebook in the fifth codebook set.

The determining the first codebook according to the codebook indication information includes the following step.

Determine the first codebook in the fifth codebook set of one or more codebook sets corresponding to the third characteristic matrix according to the third characteristic matrix information, the fifth codebook set information, and the ninth codebook information, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

In this embodiment of the present invention, when any two different codebook sets of one or more codebook sets corresponding to the third characteristic matrix correspond to different modulation orders, the logical information segment 2 may further indicate, by indicating a modulation order, a codebook set of one or more codebook sets that is to be used by the terminal device to send the to-be-sent uplink data stream. Accordingly, the terminal device may know a modulation order corresponding to the to-be-sent uplink data stream according to the logical information segment 2, so that the fifth codebook set that is of one or more codebook sets corresponding to the third characteristic matrix and that is in a one-to-one correspondence with the modulation order can be determined.

That is, in this embodiment of the present invention, optionally, the fifth codebook set information includes modulation order information of the first codebook, and modulation orders corresponding to the one or more codebook sets corresponding to the third characteristic matrix are different, that is, a codebook set of one or more codebook sets corresponding to the third characteristic matrix and a modulation order have a one-to-one correspondence.

In this embodiment of the present invention, when a quantity of codebooks in a codebook set is the same as a quantity of characteristic sequences in a characteristic matrix corresponding to the codebook set, and each codebook in the codebook set corresponds to each characteristic sequence respectively, that is, a codebook in the codebook set and a characteristic sequence in the characteristic matrix have a correspondence, a codebook in the codebook set may be indicated by indicating a characteristic sequence.

Therefore, optionally, in this embodiment of the present invention, the ninth codebook information includes third characteristic sequence information, and the third characteristic sequence information is used to indicate a third characteristic sequence in the third characteristic matrix. A quantity of codebooks in the fifth codebook set is the same as a quantity of characteristic sequences in the third characteristic matrix, and an order of the third characteristic sequence in at least two characteristic sequences included in the third characteristic matrix is the same as an order of the first codebook in the fifth codebook set.

It should be understood that in this embodiment of the present invention, only an example in which a quantity of codebooks in a codebook set is the same as a quantity of characteristic sequences in a characteristic matrix corresponding to the codebook set is used for description. However, the present invention is not limited thereto. When a quantity of codebooks in a codebook set and a quantity of characteristic sequences in a characteristic matrix corresponding to the codebook set are different, a codebook in the codebook set may still be indicated by indicating a characteristic sequence.

It should be understood that in this embodiment of the present invention, if logical information segments indicate index values, consistent index relationships of related information need to be established in advance on a network device side and a terminal device side. The index relationships are, for example, an index relationship between a characteristic matrix index value and a characteristic matrix, an index relationship between a codebook set index value and a codebook set in each codebook cluster, and an index relationship between a codebook index value and a codebook of one or more codebooks, so that the network device and the terminal device can uniquely determine a corresponding characteristic matrix, codebook set, and codebook according to the index values indicated by the logical information segments and by using the related index relationships that are established in advance.

It should be further understood that in this embodiment of the present invention, the network device and the terminal device may store a codebook, a characteristic sequence or a characteristic matrix in advance by using multiple methods. Details are not described again for brevity.

It should be further understood that this embodiment of the present invention is described only by using the foregoing solution as an example, but the present invention is not limited thereto. For example, when the network device and the terminal device store only one characteristic matrix in advance, or when both the network device and the terminal device use a characteristic matrix having a same fixed number by default, the codebook indication information may include only the fifth codebook set information and the ninth codebook information. For another example, when both the network device and the terminal device use a characteristic sequence having a same fixed number by default, the codebook indication information may include only the third characteristic matrix information and the fifth codebook set information.

It should be understood that the present invention is described by using the embodiments shown in FIG. 32 to FIG. 34 only as an example. However, the present invention is not limited thereto. The terminal device may further receive the first codebook that is indicated by the network device by using another method and that is used to transmit the uplink data stream.

It should be understood that interaction between the network device and the terminal device and related characteristics and functions that are described from the perspective of the network device correspond to related characteristics and functions from the perspective of the terminal device. Details are not described herein again for brevity.

Optionally, in the embodiments of the present invention, the receiving codebook indication information sent by a network device includes: receiving an uplink scheduling authorization message, dedicated high-layer control signaling, or a system broadcast message sent by the network device. The uplink scheduling authorization message, the dedicated high-layer control signaling, or the system broadcast message includes the codebook indication information.

Optionally, in the embodiments of the present invention, the dedicated high-layer control signaling includes a radio resource control RRC connection setup message and an RRC connection reconfiguration message.

In the embodiments of the present invention, the terminal device may receive the codebook indication information sent by the network device by using at least one of a bit string manner or a table manner. Optionally, the codebook indication information is bit string information.

In the embodiments of the present invention, optionally, the codebook is a sparse code multiple access SCMA codebook. Furthermore, optionally, a quantity of zero modulation symbols is greater than or equal to a quantity of non-zero modulation symbols in a codeword included in the codebook.

It should be understood that interaction between the network device and the terminal device and related characteristics and functions that are described from the perspective of the network device correspond to related characteristics and functions from the perspective of the terminal device. Details are not described herein again for brevity.

It should also be understood that sequence numbers of the foregoing processes in the various embodiments of the present invention do not mean execution orders. The execution orders of the processes should be determined according to functions and internal logic of the processes, and should not be construed as any limitation on the implementation processes of the embodiments of the present invention.

Therefore, for the method for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

The method for transmitting indication information according to the embodiments of the present invention is described above in detail with reference to FIG. 29 to FIG. 34. An apparatus for transmitting indication information according to embodiments of the present invention is described below with reference to FIG. 35 to FIG. 38, FIG. 27, and FIG. 28.

The apparatus 500 for transmitting indication information shown in FIG. 18 includes: a first determining module 510, a second determining module 520, and a sending module 530.

The first determining module 510 is configured to determine, according to one or more codebooks, a first codebook to be used by a terminal device to send an uplink data stream. The codebook includes two or more codewords, the codeword is a multidimensional complex vector and is used to represent a mapping relationship between data and at least two modulation symbols, the mapping relationship may be a direct mapping relationship, and the at least two modulation symbols include at least one zero modulation symbol and at least one non-zero modulation symbol.

The second determining module 520 is configured to determine codebook indication information used to indicate the first codebook determined by the first determining module 510.

The sending module 530 is configured to send the codebook indication information determined by the second determining module 520 to the terminal device.

Therefore, for the apparatus for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In an embodiment of the present invention, optionally, as shown in FIG. 35, the second determining module 520 includes: a thirteenth determining unit 5271, configured to determine a third codebook set to which the first codebook belongs and a third codebook cluster to which the third codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords; and a fourteenth determining unit 5272, configured to determine the codebook indication information, where the codebook indication information includes third codebook cluster information, third codebook set information, and seventh codebook information, where the third codebook cluster information is used to indicate the third codebook cluster, the third codebook set information is used to indicate the third codebook set in the third codebook cluster, and the seventh codebook information is used to indicate the first codebook in the third codebook set.

In this embodiment of the present invention, optionally, the third codebook set information determined by the thirteenth determining unit 5271 includes modulation order information of the first codebook, and modulation orders corresponding to codebook sets included in the third codebook cluster are different.

Figure 36:
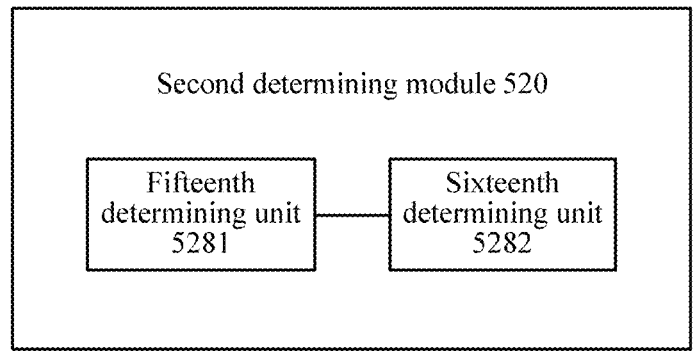
FIG. 36 is still another schematic block diagram of a second determining module according to an embodiment of the present invention.

In an embodiment of the present invention, optionally, as shown in FIG. 36, the second determining module 520 includes: a fifteenth determining unit 5281, configured to determine a fourth codebook set to which the first codebook belongs, where each codebook set includes at least one codebook, and the codebook set meets a condition that codewords in a same codebook set have a same total quantity of modulation symbols and that codebooks in a same codebook set have a same total quantity of codewords; and a sixteenth determining unit 5282, configured to determine the codebook indication information, where the codebook indication information includes fourth codebook set information and eighth codebook information, where the fourth codebook set information is used to indicate the fourth codebook set, and the eighth codebook information is used to indicate the first codebook in the fourth codebook set.

Figure 37:
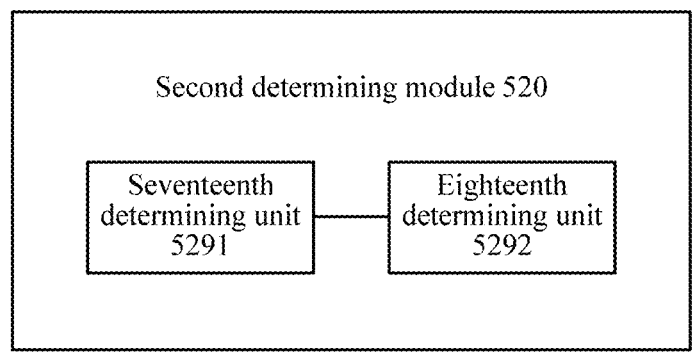
FIG. 37 is still another schematic block diagram of a second determining module according to an embodiment of the present invention.

In an embodiment of the present invention, optionally, as shown in FIG. 37, the second determining module 520 includes: a seventeenth determining unit 5291, configured to determine a fifth codebook set to which the first codebook belongs and a third characteristic matrix to which the fifth codebook set belongs, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and an eighteenth determining unit 5292, configured to determine the codebook indication information, where the codebook indication information includes third characteristic matrix information, fifth codebook set information, and ninth codebook information, where the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set.

In this embodiment of the present invention, optionally, the fifth codebook set information determined by the seventeenth determining unit 5291 includes modulation order information of the first codebook, and modulation orders corresponding to the one or more codebook sets corresponding to the third characteristic matrix are different.

It should be understood that the apparatus 500 according to the embodiments of the present invention may correspond to the network device in the method embodiments of the present invention. The foregoing and other operations and/or functions of the modules in the apparatus 500 are separately used to implement corresponding procedures in the method 200 in FIG. 3 to FIG. 9 and FIG. 29 to FIG. 31, and details are not described herein again for brevity.

Therefore, for the apparatus for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In addition, the apparatus for transmitting indication information according to the embodiments of the present invention may use less information to indicate a first codebook to be used by a terminal device to send an uplink data stream. Therefore, according to the foregoing method, not only network capacity of a system can be effectively improved, but also system overheads can be reduced.

The apparatus for transmitting indication information according to the embodiments of the present invention is described above in detail from the perspective of the network device with reference to FIG. 35 to FIG. 37. An apparatus for transmitting indication information according to an embodiment of the present invention is described below in detail from the perspective of a terminal device with reference to FIG. 38.

An apparatus 600 for transmitting indication information shown in FIG. 25 includes: a receiving module 610, a determining module 620, and a sending module 630.

The receiving module 610 is configured to receive codebook indication information. The codebook indication information may be sent by a network device, the codebook indication information is used to indicate a first codebook of one or more codebooks, the codebook includes two or more codewords, the codeword is a multidimensional complex vector and is used to represent a mapping relationship between data and at least two modulation symbols, the mapping relationship may be a direct mapping relationship, and the at least two modulation symbols include at least one zero modulation symbol and at least one non-zero modulation symbol.

The determining module 620 is configured to determine the first codebook according to the codebook indication information received by the receiving module 610.

The sending module 630 is configured to send a data stream according to the first codebook determined by the determining module 620.

It should be understood that in this embodiment of the present invention, the data stream may be an uplink data stream, or may be a data stream sent by a terminal device to the network device.

Therefore, for the apparatus for transmitting indication information according to this embodiment of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

Figure 38:
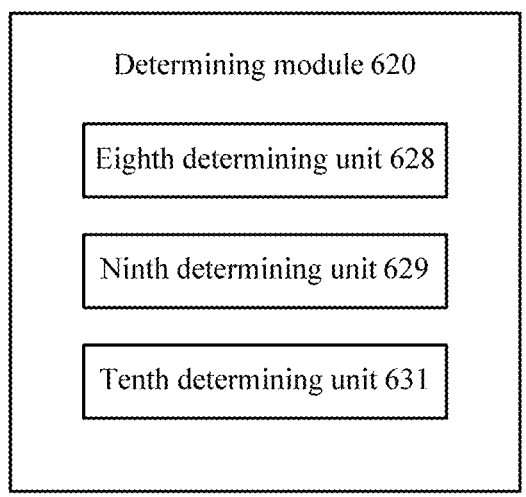
FIG. 38 is another schematic block diagram of a determining module according to an embodiment of the present invention.

In an embodiment of the present invention, optionally, as shown in FIG. 38, the codebook indication information received by the receiving module 610 includes third codebook cluster information, third codebook set information, and seventh codebook information. The third codebook cluster information is used to indicate a third codebook cluster, the third codebook set information is used to indicate a third codebook set in the third codebook cluster, and the seventh codebook information is used to indicate the first codebook in the third codebook set.

The determining module 620 includes: an eighth determining unit 628, configured to determine the first codebook in the third codebook set included in the third codebook cluster according to the third codebook cluster information, the third codebook set information, and the seventh codebook information. Each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

Optionally, in this embodiment of the present invention, the third codebook set information received by the receiving module 610 includes modulation order information of the first codebook, and modulation orders corresponding to codebook sets included in the third codebook cluster are different.

As shown in FIG. 38, optionally, in an embodiment of the present invention, the codebook indication information received by the receiving module 610 includes fourth codebook set information and eighth codebook information. The fourth codebook set information is used to indicate a fourth codebook set, and the eighth codebook information is used to indicate the first codebook in the fourth codebook set.

The determining module 620 includes: a ninth determining unit 629, configured to determine the first codebook in the fourth codebook set according to the fourth codebook set information and the eighth codebook information. Each codebook set includes at least one codebook, and the codebook set meets a condition that codewords in a same codebook set have a same total quantity of modulation symbols and that codebooks in a same codebook set have a same total quantity of codewords.

Optionally, in an embodiment of the present invention, as shown in FIG. 38, the codebook indication information received by the receiving module 610 includes third characteristic matrix information, fifth codebook set information, and ninth codebook information. The third characteristic matrix information is used to indicate a third characteristic matrix, the fifth codebook set information is used to indicate a fifth codebook set of one or more codebook sets corresponding to the third characteristic matrix, and the ninth codebook information is used to indicate the first codebook in the fifth codebook set.

The determining module 620 includes: a tenth determining unit 631, configured to determine the first codebook in the fifth codebook set of one or more codebook sets corresponding to the third characteristic matrix according to the third characteristic matrix information, the fifth codebook set information, and the ninth codebook information. Each codebook set includes at least one codebook, and the codebook set meets a condition that codewords in a same codebook set have a same total quantity of modulation symbols and that codebooks in a same codebook set have a same total quantity of codewords. Each characteristic matrix corresponds to one or more codebook sets, the characteristic matrix includes two or more characteristic sequences, the characteristic sequence includes an element 0 and an element 1. The element 0 represents that modulation symbols that are of all codewords in a corresponding codebook and that are in a position corresponding to the element 0 are all zero modulation symbols. The element 1 represents that modulation symbols that are of all codewords in a corresponding codebook and that are in a position corresponding to the element 1 are not all zero modulation symbols or are all non-zero modulation symbols.

Optionally, in this embodiment of the present invention, the fifth codebook set information received by the receiving module 610 includes modulation order information of the first codebook, and modulation orders corresponding to the one or more codebook sets corresponding to the third characteristic matrix are different.

It should be understood that the apparatus 600 for transmitting indication information according to this embodiment of the present invention may correspond to the terminal device in the method embodiments of the present invention. The foregoing and other operations and/or functions of the modules in the apparatus 600 are separately used to implement corresponding procedures in the method 300 in FIG. 10 to FIG. 17 and FIG. 32 to FIG. 34, and details are not described herein again for brevity.

Therefore, for the apparatus for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In addition, the apparatus for transmitting indication information according to the embodiments of the present invention may determine, according to less codebook indication information, a first codebook to be used by the apparatus to send an uplink data stream. Therefore, by means of the apparatus according to this embodiment of the present invention, not only network capacity of the system can be effectively improved, but also system overheads can be reduced.

In an embodiment of the present invention, the apparatus 800 for transmitting indication information shown in FIG. 27 includes: a processor 810, a memory 820, a bus system 830, and a transmitter 840. Optionally, in an embodiment, the determining, by the processor 810, codebook indication information used to indicate the first codebook includes: determining a third codebook set to which the first codebook belongs and a third codebook cluster to which the third codebook set belongs, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords; and determining the codebook indication information, where the codebook indication information includes third codebook cluster information, third codebook set information, and seventh codebook information, where the third codebook cluster information is used to indicate the third codebook cluster, the third codebook set information is used to indicate the third codebook set in the third codebook cluster, and the seventh codebook information is used to indicate the first codebook in the third codebook set.

Optionally, in an embodiment, the third codebook set information determined by the processor 810 includes modulation order information of the first codebook, and modulation orders corresponding to codebook sets included in the third codebook cluster are different.

Optionally, in an embodiment, the determining, by the processor 810, codebook indication information used to indicate the first codebook includes: determining a fourth codebook set to which the first codebook belongs, where each codebook set includes at least one codebook, and the codebook set meets a condition that codewords in a same codebook set have a same total quantity of modulation symbols and that codebooks in a same codebook set have a same total quantity of codewords; and determining the codebook indication information, where the codebook indication information includes fourth codebook set information and eighth codebook information, where the fourth codebook set information is used to indicate the fourth codebook set, and the eighth codebook information is used to indicate the first codebook in the fourth codebook set.

Optionally, in an embodiment, the determining, by the processor 810, codebook indication information used to indicate the first codebook includes: determining a fifth codebook set to which the first codebook belongs and a third characteristic matrix to which the fifth codebook set belongs, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, where the codebook indication information includes third characteristic matrix information, fifth codebook set information, and ninth codebook information, where the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set.

Optionally, in an embodiment, the fifth codebook set information determined by the processor 810 includes modulation order information of the first codebook, and modulation orders corresponding to the one or more codebook sets corresponding to the third characteristic matrix are different.

It should be understood that the apparatus 800 for transmitting indication information according to the embodiments of the present invention may correspond to the network device and the apparatus 500 in the embodiments of the present invention, and may correspond to a corresponding object that performs the method according to the embodiments of the present invention. The foregoing and other operations and/or functions of the parts of the apparatus 800 are separately used to implement corresponding procedures in the method in FIG. 3 to FIG. 9 and FIG. 29 to FIG. 31, and details are not described herein again for brevity.

Therefore, for the apparatus for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In addition, the apparatus for transmitting indication information according to the embodiments of the present invention may use less information to indicate a first codebook to be used by a terminal device to send an uplink data stream. Therefore, by means of the foregoing apparatus, not only network capacity of the system can be effectively improved, but also system overheads can be reduced.

In an embodiment of the present invention, the apparatus 900 for transmitting indication information shown in FIG. 28 includes: a processor 910, a memory 920, a bus system 930, a receiver 940, and a transmitter 950. Optionally, in an embodiment, the codebook indication information received by the receiver 940 includes third codebook cluster information, third codebook set information, and seventh codebook information. The third codebook cluster information is used to indicate a third codebook cluster, the third codebook set information is used to indicate the third codebook set in the third codebook cluster, and the seventh codebook information is used to indicate the first codebook in the third codebook set.

The determining, by the processor 910, the first codebook according to the codebook indication information includes: determining the first codebook in the third codebook set included in the third codebook cluster according to the third codebook cluster information, the third codebook set information, and the seventh codebook information, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

Optionally, in an embodiment, the third codebook set information received by the receiver 940 includes modulation order information of the first codebook, and modulation orders corresponding to codebook sets included in the third codebook cluster are different.

Optionally, in an embodiment, the codebook indication information received by the receiver 940 includes fourth codebook set information and eighth codebook information. The fourth codebook set information is used to indicate a fourth codebook set, and the eighth codebook information is used to indicate the first codebook in the fourth codebook set.

The determining, by the processor 910, the first codebook according to the codebook indication information includes: determining the first codebook in the fourth codebook set according to the fourth codebook set information and the eighth codebook information, where each codebook set includes at least one codebook, and the codebook set meets a condition that codewords in a same codebook set have a same total quantity of modulation symbols and that codebooks in a same codebook set have a same total quantity of codewords.

Optionally, in an embodiment, the codebook indication information received by the receiver 940 includes third characteristic matrix information, fifth codebook set information, and ninth codebook information. The third characteristic matrix information is used to indicate a third characteristic matrix, the fifth codebook set information is used to indicate a fifth codebook set of one or more codebook sets corresponding to the third characteristic matrix, and the ninth codebook information is used to indicate the first codebook in the fifth codebook set.

The determining, by the processor 910, the first codebook according to the codebook indication information includes: determining the first codebook in the fifth codebook set of one or more codebook sets corresponding to the third characteristic matrix according to the third characteristic matrix information, the fifth codebook set information, and the ninth codebook information, where each codebook set includes at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix includes two or more characteristic sequences, the characteristic sequence includes an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

Optionally, in an embodiment, the fifth codebook set information received by the receiver 940 includes modulation order information of the first codebook, and modulation orders corresponding to the one or more codebook sets corresponding to the third characteristic matrix are different.

It should be understood that the apparatus 900 for transmitting indication information according to the embodiments of the present invention may correspond to the terminal device and the apparatus 600 in the embodiments of the present invention, and may correspond to a corresponding object that performs the method according to the embodiments of the present invention. The foregoing and other operations and/or functions of the parts of the apparatus 900 are separately used to implement corresponding procedures in the method in FIG. 10 to FIG. 17 and FIG. 32 to 34, and details are not described herein again for brevity.

Therefore, for the apparatus for transmitting indication information according to the embodiments of the present invention, a network device determines, according to one or more codebooks, a first codebook to be used by a terminal device to send an uplink data stream, determines codebook indication information used to indicate the first codebook, and sends the codebook indication information to the terminal device, so that the terminal device can determine the first codebook assigned by the network device and transmit data by using the first codebook. Therefore, network capacity of a system can be effectively improved. The network capacity includes a quantity of users who can access the system, spectral efficiency of the system, and the like.

In addition, the apparatus for transmitting indication information according to the embodiments of the present invention may determine, according to less codebook indication information, a first codebook to be used by the apparatus to send an uplink data stream. Therefore, by means of the apparatus according to the embodiments of the present invention, not only network capacity of the system can be effectively improved, but also system overheads can be reduced.

It should be understood that the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only; that is, B may also be determined according to A and/or other information.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one components interacting with another component in a local system, a distributed system, and/or across a network such as the Internet interacting with other systems by using the signal).

In addition, aspects or characteristics of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (Compact Disk, compact disk), a DVD (Digital Versatile Disk, digital versatile disk), a smart card and a flash memory component (for example, EPROM (Erasable Programmable Read-Only Memory, erasable programmable read-only memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has usually described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some characteristics may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

The disclosure of the present application also includes the following Examples.

EXAMPLE 1

A method for transmitting indication information, comprising: determining, according to one or more codebooks, a first codebook to be used by a terminal device to send an uplink data stream, wherein the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol; determining codebook indication information used to indicate the first codebook; and sending the codebook indication information to the terminal device.

EXAMPLE 2

The method according to example 1, wherein the determining codebook indication information used to indicate the first codebook comprises: determining a first codebook set to which the first codebook belongs and a first codebook cluster to which the first codebook set belongs, wherein each codebook cluster comprises at least one codebook set, each codebook set comprises at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols; and determining the codebook indication information, wherein the codebook indication information comprises first codebook cluster information, first codebook set information, and first codebook information, wherein the first codebook cluster information is used to indicate the first codebook cluster, the first codebook set information is used to indicate the first codebook set in the first codebook cluster, and the first codebook information is used to indicate the first codebook in the first codebook set.

EXAMPLE 3

The method according to example 2, wherein the first codebook information comprises modulation order information of the first codebook, and modulation orders of codebooks comprised in the first codebook set are different.

EXAMPLE 4

The method according to example 1, wherein the determining codebook indication information used to indicate the first codebook comprises: determining a second codebook set to which the first codebook belongs, wherein each codebook set comprises at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols; and determining the codebook indication information, wherein the codebook indication information comprises second codebook set information and second codebook information, wherein the second codebook set information is used to indicate the second codebook set, and the second codebook information is used to indicate the first codebook in the second codebook set.

EXAMPLE 5

The method according to example 4, wherein the second codebook information comprises modulation order information of the first codebook, and modulation orders of codebooks comprised in the second codebook set are different.

EXAMPLE 6

The method according to example 1, wherein the determining codebook indication information used to indicate the first codebook comprises: determining a second codebook cluster to which the first codebook belongs, wherein each codebook cluster comprises at least one codebook, and the codebook cluster meets a condition that codewords in a same codebook cluster have a same total quantity of modulation symbols; and determining the codebook indication information, wherein the codebook indication information comprises second codebook cluster information and third codebook information, wherein the second codebook cluster information is used to indicate the second codebook cluster, and the third codebook information is used to indicate the first codebook in the second codebook cluster.

EXAMPLE 7

The method according to example 1, wherein the codebook indication information comprises an index value of the first codebook.

EXAMPLE 8

The method according to example 1, wherein the determining codebook indication information used to indicate the first codebook comprises: determining a first characteristic sequence to which the first codebook belongs and a first characteristic matrix to which the first characteristic sequence belongs, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises first characteristic matrix information, first characteristic sequence information, and fourth codebook information, wherein the first characteristic matrix information is used to indicate the first characteristic matrix, the first characteristic sequence information is used to indicate the first characteristic sequence in the first characteristic matrix, and the fourth codebook information is used to

EXAMPLE 9

The method according to example 8, wherein the fourth codebook information comprises modulation order information of the first codebook, and modulation orders of the one or more codebooks corresponding to the first characteristic sequence are different.

EXAMPLE 10

The method according to example 1, wherein the determining codebook indication information used to indicate the first codebook comprises: determining a second characteristic matrix to which the first codebook belongs, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises second characteristic matrix information and fifth codebook information, wherein the second characteristic matrix information is used to indicate the second characteristic matrix, and the fifth codebook information is used to indicate the first codebook of one or more codebooks corresponding to the second characteristic matrix.

EXAMPLE 11

The method according to example 1, wherein the determining codebook indication information used to indicate the first codebook comprises: determining a second characteristic sequence to which the first codebook belongs, wherein each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises second characteristic sequence information and sixth codebook information, wherein the second characteristic sequence information is used to indicate the second characteristic sequence, and the sixth codebook information is used to indicate the first codebook of one or more codebooks corresponding to the second characteristic sequence.

EXAMPLE 12

The method according to example 11, wherein the sixth codebook information comprises modulation order information of the first codebook, and modulation orders of the one or more codebooks corresponding to the second characteristic sequence are different.

EXAMPLE 13

The method according to example 1, wherein the determining codebook indication information used to indicate the first codebook comprises: determining a third codebook set to which the first codebook belongs and a third codebook cluster to which the third codebook set belongs, wherein each codebook cluster comprises at least one codebook set, each codebook set comprises at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords; and determining the codebook indication information, wherein the codebook indication information comprises third codebook cluster information, third codebook set information, and seventh codebook information, wherein the third codebook cluster information is used to indicate the third codebook cluster, the third codebook set information is used to indicate the third codebook set in the third codebook cluster, and the seventh codebook information is used to indicate the first codebook in the third codebook set.

EXAMPLE 14

The method according to example 13, wherein the third codebook set information comprises modulation order information of the first codebook, and modulation orders corresponding to codebook sets comprised in the third codebook cluster are different.

EXAMPLE 15

The method according to example 1, wherein the determining codebook indication information used to indicate the first codebook comprises: determining a fourth codebook set to which the first codebook belongs, wherein each codebook set comprises at least one codebook, and the codebook set meets a condition that codewords in a same codebook set have a same total quantity of modulation symbols and that codebooks in a same codebook set have a same total quantity of codewords; and determining the codebook indication information, wherein the codebook indication information comprises fourth codebook set information and eighth codebook information, wherein the fourth codebook set information is used to indicate the fourth codebook set, and the eighth codebook information is used to indicate the first codebook in the fourth codebook set.

EXAMPLE 16

The method according to example 1, wherein the determining codebook indication information used to indicate the first codebook comprises: determining a fifth codebook set to which the first codebook belongs and a third characteristic matrix to which the fifth codebook set belongs, wherein each codebook set comprises at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix comprises two or more characteristic sequences, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises third characteristic matrix information, fifth codebook set information, and ninth codebook information, wherein the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set.

EXAMPLE 17

The method according to example 16, wherein the fifth codebook set information comprises modulation order information of the first codebook, and modulation orders corresponding to the one or more codebook sets corresponding to the third characteristic matrix are different.

EXAMPLE 18

The method according to any one of examples 1 to 17, wherein the sending the codebook indication information to the terminal device comprises: sending an uplink scheduling authorization message, dedicated high-layer control signaling, or a system broadcast message to the terminal device, wherein the uplink scheduling authorization message, the dedicated high-layer control signaling, or the system broadcast message comprises the codebook indication information.

EXAMPLE 19

The method according to example 18, wherein the dedicated high-layer control signaling comprises a radio resource control RRC connection setup message and an RRC connection reconfiguration message.

EXAMPLE 20

The method according to any one of examples 1 to 19, wherein the codebook indication information is bit string information.

EXAMPLE 21

The method according to any one of examples 1 to 20, wherein the codebook is a sparse code multiple access SCMA codebook.

EXAMPLE 22

The method according to example 21, wherein a quantity of zero modulation symbols is greater than or equal to a quantity of non-zero modulation symbols in a codeword comprised in the codebook.

EXAMPLE 23

A method for transmitting indication information, comprising: receiving codebook indication information sent by a network device, wherein the codebook indication information is used to indicate a first codebook of one or more codebooks, the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol; determining the first codebook according to the codebook indication information; and sending an uplink data stream according to the first codebook.

EXAMPLE 24

The method according to example 23, wherein the codebook indication information comprises first codebook cluster information, first codebook set information, and first codebook information, wherein the first codebook cluster information is used to indicate a first codebook cluster, the first codebook set information is used to indicate a first codebook set in the first codebook cluster, and the first codebook information is used to indicate the first codebook in the first codebook set; and the determining the first codebook according to the codebook indication information comprises: determining the first codebook in the first codebook set comprised in the first codebook cluster according to the first codebook cluster information, the first codebook set information, and the first codebook information, wherein each codebook cluster comprises at least one codebook set, each codebook set comprises at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

EXAMPLE 25

The method according to example 24, wherein the first codebook information comprises modulation order information of the first codebook, and modulation orders of codebooks comprised in the first codebook set are different.

EXAMPLE 26

The method according to example 23, wherein the codebook indication information comprises second codebook set information and second codebook information, wherein the second codebook set information is used to indicate a second codebook set, and the second codebook information is used to indicate the first codebook in the second codebook set; and the determining the first codebook according to the codebook indication information comprises: determining the first codebook in the second codebook set according to the second codebook set information and the second codebook information, wherein each codebook set comprises at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

EXAMPLE 27

The method according to example 26, wherein the second codebook information comprises modulation order information of the first codebook, and modulation orders of codebooks comprised in the second codebook set are different.

EXAMPLE 28

The method according to example 23, wherein the codebook indication information comprises second codebook cluster information and third codebook information, wherein the second codebook cluster information is used to indicate a second codebook cluster, and the third codebook information is used to indicate the first codebook in the second codebook cluster; and the determining the first codebook according to the codebook indication information comprises: determining the first codebook in the second codebook cluster according to the second codebook cluster information and the third codebook information, wherein each codebook cluster comprises at least one codebook, and the codebook cluster meets a condition that codewords in a same codebook cluster have a same total quantity of modulation symbols.

EXAMPLE 29

The method according to example 23, wherein the codebook indication information comprises an index value of the first codebook; and the determining the first codebook according to the codebook indication information comprises: determining the first codebook corresponding to the index value according to the index value.

EXAMPLE 30

The method according to example 23, wherein the codebook indication information comprises first characteristic matrix information, first characteristic sequence information, and fourth codebook information, wherein the first characteristic matrix information is used to indicate a first characteristic matrix, the first characteristic sequence information is used to indicate a first characteristic sequence in the first characteristic matrix, and the fourth codebook information is used to indicate the first codebook of one or more codebooks corresponding to the first characteristic sequence; and the determining the first codebook according to the codebook indication information comprises: determining the first codebook of the one or more codebooks corresponding to the first characteristic sequence in the first characteristic matrix according to the first characteristic matrix information, the first characteristic sequence information, and the fourth codebook information, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 31

The method according to example 30, wherein the fourth codebook information comprises modulation order information of the first codebook, and modulation orders of the one or more codebooks corresponding to the first characteristic sequence are different.

EXAMPLE 32

The method according to example 23, wherein the codebook indication information comprises second characteristic matrix information and fifth codebook information, wherein the second characteristic matrix information is used to indicate a second characteristic matrix, and the fifth codebook information is used to indicate the first codebook of one or more codebooks corresponding to the second characteristic matrix; and the determining the first codebook according to the codebook indication information comprises: determining the first codebook of the one or more codebooks corresponding to the second characteristic matrix according to the second characteristic matrix information and the fifth codebook information, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 33

The method according to example 23, wherein the codebook indication information comprises second characteristic sequence information and sixth codebook information, wherein the second characteristic sequence information is used to indicate a second characteristic sequence, and the sixth codebook information is used to indicate the first codebook of one or more codebooks corresponding to the second characteristic sequence; and the determining the first codebook according to the codebook indication information comprises: determining the first codebook of the one or more codebooks corresponding to the second characteristic sequence according to the second characteristic sequence information and the sixth codebook information, wherein each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 34

The method according to example 33, wherein the sixth codebook information comprises modulation order information of the first codebook, and modulation orders of the one or more codebooks corresponding to the second characteristic sequence are different.

EXAMPLE 35

The method according to example 23, wherein the codebook indication information comprises third codebook cluster information, third codebook set information, and seventh codebook information, wherein the third codebook cluster information is used to indicate a third codebook cluster, the third codebook set information is used to indicate a third codebook set in the third codebook cluster, and the seventh codebook information is used to indicate the first codebook in the third codebook set; and the determining the first codebook according to the codebook indication information comprises: determining the first codebook in the third codebook set comprised in the third codebook cluster according to the third codebook cluster information, the third codebook set information, and the seventh codebook information, wherein each codebook cluster comprises at least one codebook set, each codebook set comprises at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

EXAMPLE 36

The method according to example 35, wherein the third codebook set information comprises modulation order information of the first codebook, and modulation orders corresponding to codebook sets comprised in the third codebook cluster are different.

EXAMPLE 37

The method according to example 23, wherein the codebook indication information comprises fourth codebook set information and eighth codebook information, wherein the fourth codebook set information is used to indicate a fourth codebook set, and the eighth codebook information is used to indicate the first codebook in the fourth codebook set; and the determining the first codebook according to the codebook indication information comprises: determining the first codebook in the fourth codebook set according to the fourth codebook set information and the eighth codebook information, wherein each codebook set comprises at least one codebook, and the codebook set meets a condition that codewords in a same codebook set have a same total quantity of modulation symbols and that codebooks in a same codebook set have a same total quantity of codewords.

EXAMPLE 38

The method according to example 23, wherein the codebook indication information comprises third characteristic matrix information, fifth codebook set information, and ninth codebook information, wherein the third characteristic matrix information is used to indicate a third characteristic matrix, the fifth codebook set information is used to indicate a fifth codebook set of one or more codebook sets corresponding to the third characteristic matrix, and the ninth codebook information is used to indicate the first codebook in the fifth codebook set; and the determining the first codebook according to the codebook indication information comprises: determining the first codebook in the fifth codebook set of one or more codebook sets corresponding to the third characteristic matrix according to the third characteristic matrix information, the fifth codebook set information, and the ninth codebook information, wherein each codebook set comprises at least one codebook, the codebook set meets a condition that codewords in a same codebook set have a same total quantity of modulation symbols and that codebooks in a same codebook set have a same total quantity of codewords; each characteristic matrix corresponds to one or more codebook sets, the characteristic matrix comprises two or more characteristic sequences, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 39

The method according to example 38, wherein the fifth codebook set information comprises modulation order information of the first codebook, and modulation orders corresponding to the one or more codebook sets corresponding to the third characteristic matrix are different.

EXAMPLE 40

The method according to any one of examples 23 to 39, wherein the receiving codebook indication information sent by a network device comprises: receiving an uplink scheduling authorization message, dedicated high-layer control signaling, or a system broadcast message sent by the network device, wherein the uplink scheduling authorization message, the dedicated high-layer control signaling, or the system broadcast message comprises the codebook indication information.

EXAMPLE 41

The method according to example 40, wherein the dedicated high-layer control signaling comprises a radio resource control RRC connection setup message and an RRC connection reconfiguration message.

EXAMPLE 42

The method according to any one of examples 23 to 41, wherein the codebook indication information is bit string information.

EXAMPLE 43

The method according to any one of examples 23 to 42, wherein the codebook is a sparse code multiple access SCMA codebook.

EXAMPLE 44

The method according to example 43, wherein a quantity of zero modulation symbols is greater than or equal to a quantity of non-zero modulation symbols in a codeword comprised in the codebook.

EXAMPLE 45

An apparatus for transmitting indication information, comprising: a first determining module, configured to determine, according to one or more codebooks, a first codebook to be used by a terminal device to send an uplink data stream, wherein the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol; a second determining module, configured to determine codebook indication information used to indicate the first codebook determined by the first determining module; and a sending module, configured to send the codebook indication information determined by the second determining module to the terminal device.

EXAMPLE 46

The apparatus according to example 45, wherein the second determining module comprises: a first determining unit, configured to determine a first codebook set to which the first codebook belongs and a first codebook cluster to which the first codebook set belongs, wherein each codebook cluster comprises at least one codebook set, each codebook set comprises at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols; and a second determining unit, configured to determine the codebook indication information, wherein the codebook indication information comprises first codebook cluster information, first codebook set information, and first codebook information, wherein the first codebook cluster information is used to indicate the first codebook cluster, the first codebook set information is used to indicate the first codebook set in the first codebook cluster, and the first codebook information is used to indicate the first codebook in the first codebook set.

EXAMPLE 47

The apparatus according to example 46, wherein the first codebook information determined by the second determining unit comprises modulation order information of the first codebook, and modulation orders of codebooks comprised in the first codebook set are different.

EXAMPLE 48

The apparatus according to example 45, wherein the second determining module comprises: a third determining unit, configured to determine a second codebook set to which the first codebook belongs, wherein each codebook set comprises at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols; and a fourth determining unit, configured to determine the codebook indication information, wherein the codebook indication information comprises second codebook set information and second codebook information, wherein the second codebook set information is used to indicate the second codebook set, and the second codebook information is used to indicate the first codebook in the second codebook set.

EXAMPLE 49

The apparatus according to example 48, wherein the second codebook information determined by the fourth determining unit comprises modulation order information of the first codebook, and modulation orders of codebooks comprised in the second codebook set are different.

EXAMPLE 50

The apparatus according to example 45, wherein the second determining module comprises: a fifth determining unit, configured to determine a second codebook cluster to which the first codebook belongs, wherein each codebook cluster comprises at least one codebook, and the codebook cluster meets a condition that codewords in a same codebook cluster have a same total quantity of modulation symbols; and a sixth determining unit, configured to determine the codebook indication information, wherein the codebook indication information comprises second codebook cluster information and third codebook information, wherein the second codebook cluster information is used to indicate the second codebook cluster, and the third codebook information is used to indicate the first codebook in the second codebook cluster.

EXAMPLE 51

The apparatus according to example 45, wherein the codebook indication information determined by the second determining module comprises an index value of the first codebook.

EXAMPLE 52

The apparatus according to example 45, wherein the second determining module comprises: a seventh determining unit, configured to determine a first characteristic sequence to which the first codebook belongs and a first characteristic matrix to which the first characteristic sequence belongs, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and an eighth determining unit, configured to determine the codebook indication information, wherein the codebook indication information comprises first characteristic matrix information, first characteristic sequence information, and fourth codebook information, wherein the first characteristic matrix information is used to indicate the first characteristic matrix, the first characteristic sequence information is used to indicate the first characteristic sequence in the first characteristic matrix, and the fourth codebook information is used to indicate the first codebook of one or more codebooks corresponding to the first characteristic sequence.

EXAMPLE 53

The apparatus according to example 52, wherein the fourth codebook information determined by the eighth determining unit comprises modulation order information of the first codebook, and modulation orders of the one or more codebooks corresponding to the first characteristic sequence are different.

EXAMPLE 54

The apparatus according to example 45, wherein the second determining module comprises: a ninth determining unit, configured to determine a second characteristic matrix to which the first codebook belongs, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and a tenth determining unit, configured to determine the codebook indication information, wherein the codebook indication information comprises second characteristic matrix information and fifth codebook information, wherein the second characteristic matrix information is used to indicate the second characteristic matrix, and the fifth codebook information is used to indicate the first codebook of one or more codebooks corresponding to the second characteristic matrix.

EXAMPLE 55

The apparatus according to example 45, wherein the second determining module comprises: an eleventh determining unit, configured to determine a second characteristic sequence to which the first codebook belongs, wherein each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and a twelfth determining unit, configured to determine the codebook indication information, wherein the codebook indication information comprises second characteristic sequence information and sixth codebook information, wherein the second characteristic sequence information is used to indicate the second characteristic sequence, and the sixth codebook information is used to indicate the first codebook of one or more codebooks corresponding to the second characteristic sequence.

EXAMPLE 56

The apparatus according to example 55, wherein the sixth codebook information determined by the twelfth determining unit comprises modulation order information of the first codebook, and modulation orders of the one or more codebooks corresponding to the second characteristic sequence are different.

EXAMPLE 57

The apparatus according to example 45, wherein the second determining module comprises: a thirteenth determining unit, configured to determine a third codebook set to which the first codebook belongs and a third codebook cluster to which the third codebook set belongs, wherein each codebook cluster comprises at least one codebook set, each codebook set comprises at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords; and a fourteenth determining unit, configured to determine the codebook indication information, wherein the codebook indication information comprises third codebook cluster information, third codebook set information, and seventh codebook information, wherein the third codebook cluster information is used to indicate the third codebook cluster, the third codebook set information is used to indicate the third codebook set in the third codebook cluster, and the seventh codebook information is used to indicate the first codebook in the third codebook set.

EXAMPLE 58

The apparatus according to example 57, wherein the third codebook set information determined by the thirteenth determining unit comprises modulation order information of the first codebook, and modulation orders corresponding to codebook sets comprised in the third codebook cluster are different.

EXAMPLE 59

The apparatus according to example 45, wherein the second determining module comprises: a fifteenth determining unit, configured to determine a fourth codebook set to which the first codebook belongs, wherein each codebook set comprises at least one codebook, and the codebook set meets a condition that codewords in a same codebook set have a same total quantity of modulation symbols and that codebooks in a same codebook set have a same total quantity of codewords; and a sixteenth determining unit, configured to determine the codebook indication information, wherein the codebook indication information comprises fourth codebook set information and eighth codebook information, wherein the fourth codebook set information is used to indicate the fourth codebook set, and the eighth codebook information is used to indicate the first codebook in the fourth codebook set.

EXAMPLE 60

The apparatus according to example 45, wherein the second determining module comprises: a seventeenth determining unit, configured to determine a fifth codebook set to which the first codebook belongs and a third characteristic matrix to which the fifth codebook set belongs, wherein each codebook set comprises at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix comprises two or more characteristic sequences, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and an eighteenth determining unit, configured to determine the codebook indication information, wherein the codebook indication information comprises third characteristic matrix information, fifth codebook set information, and ninth codebook information, wherein the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set.

EXAMPLE 61

The apparatus according to example 60, wherein the fifth codebook set information determined by the seventeenth determining unit comprises modulation order information of the first codebook, and modulation orders corresponding to the one or more codebook sets corresponding to the third characteristic matrix are different.

EXAMPLE 62

The apparatus according to any one of examples 45 to 61, wherein the sending module is specifically configured to send an uplink scheduling authorization message, dedicated high-layer control signaling, or a system broadcast message to the terminal device, wherein the uplink scheduling authorization message, the dedicated high-layer control signaling, or the system broadcast message comprises the codebook indication information.

EXAMPLE 63

The apparatus according to example 62, wherein the dedicated high-layer control signaling comprises a radio resource control RRC connection setup message and an RRC connection reconfiguration message.

EXAMPLE 64

The apparatus according to any one of examples 45 to 63, wherein the codebook indication information sent by the sending module is bit string information.

EXAMPLE 65

The apparatus according to any one of examples 45 to 64, wherein the codebook is a sparse code multiple access SCMA codebook.

EXAMPLE 66

The apparatus according to example 65, wherein a quantity of zero modulation symbols is greater than or equal to a quantity of non-zero modulation symbols in a codeword comprised in the codebook.

EXAMPLE 67

The apparatus according to any one of examples 45 to 66, wherein the apparatus is a network device.

EXAMPLE 68

An apparatus for transmitting indication information, comprising: a receiving module, configured to receive codebook indication information sent by a network device, wherein the codebook indication information is used to indicate a first codebook of one or more codebooks, the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol; a determining module, configured to determine the first codebook according to the codebook indication information received by the receiving module; and a sending module, configured to send an uplink data stream according to the first codebook determined by the determining module.

EXAMPLE 69

The apparatus according to example 68, wherein the codebook indication information received by the receiving module comprises first codebook cluster information, first codebook set information, and first codebook information, wherein the first codebook cluster information is used to indicate a first codebook cluster, the first codebook set information is used to indicate a first codebook set in the first codebook cluster, and the first codebook information is used to indicate the first codebook in the first codebook set; and the determining module comprises: a first determining unit, configured to determine the first codebook in the first codebook set comprised in the first codebook cluster according to the first codebook cluster information, the first codebook set information, and the first codebook information, wherein each codebook cluster comprises at least one codebook set, each codebook set comprises at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

EXAMPLE 70

The apparatus according to example 69, wherein the first codebook information received by the receiving module comprises modulation order information of the first codebook, and modulation orders of codebooks comprised in the first codebook set are different.

EXAMPLE 71

The apparatus according to example 68, wherein the codebook indication information received by the receiving module comprises second codebook set information and second codebook information, wherein the second codebook set information is used to indicate a second codebook set, and the second codebook information is used to indicate the first codebook in the second codebook set; and the determining module comprises: a second determining unit, configured to determine the first codebook in the second codebook set according to the second codebook set information and the second codebook information, wherein each codebook set comprises at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

EXAMPLE 72

The apparatus according to example 71, wherein the second codebook information received by the receiving module comprises modulation order information of the first codebook, and modulation orders of codebooks comprised in the second codebook set are different.

EXAMPLE 73

The apparatus according to example 68, wherein the codebook indication information received by the receiving module comprises second codebook cluster information and third codebook information, wherein the second codebook cluster information is used to indicate a second codebook cluster, and the third codebook information is used to indicate the first codebook in the second codebook cluster; and the determining module comprises: a third determining unit, configured to determine the first codebook in the second codebook cluster according to the second codebook cluster information and the third codebook information, wherein each codebook cluster comprises at least one codebook, and the codebook cluster meets a condition that codewords in a same codebook cluster have a same total quantity of modulation symbols.

EXAMPLE 74

The apparatus according to example 68, wherein the codebook indication information received by the receiving module comprises an index value of the first codebook; and the determining module comprises: a fourth determining unit, configured to determine the first codebook corresponding to the index value according to the index value.

EXAMPLE 75

The apparatus according to example 68, wherein the codebook indication information received by the receiving module comprises first characteristic matrix information, first characteristic sequence information, and fourth codebook information, wherein the first characteristic matrix information is used to indicate a first characteristic matrix, the first characteristic sequence information is used to indicate a first characteristic sequence in the first characteristic matrix, and the fourth codebook information is used to indicate the first codebook of one or more codebooks corresponding to the first characteristic sequence; and the determining module comprises: a fifth determining unit, configured to determine the first codebook of the one or more codebooks corresponding to the first characteristic sequence in the first characteristic matrix according to the first characteristic matrix information, the first characteristic sequence information, and the fourth codebook information, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 76

The apparatus according to example 75, wherein the fourth codebook information received by the receiving module comprises modulation order information of the first codebook, and modulation orders of the one or more codebooks corresponding to the first characteristic sequence are different.

EXAMPLE 77

The apparatus according to example 68, wherein the codebook indication information received by the receiving module comprises second characteristic matrix information and fifth codebook information, wherein the second characteristic matrix information is used to indicate a second characteristic matrix, and the fifth codebook information is used to indicate the first codebook of one or more codebooks corresponding to the second characteristic matrix; and the determining module comprises: a sixth determining unit, configured to determine the first codebook of the one or more codebooks corresponding to the second characteristic matrix according to the second characteristic matrix information and the fifth codebook information, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 78

The apparatus according to example 68, wherein the codebook indication information received by the receiving module comprises second characteristic sequence information and sixth codebook information, wherein the second characteristic sequence information is used to indicate a second characteristic sequence, and the sixth codebook information is used to indicate the first codebook of one or more codebooks corresponding to the second characteristic sequence; and the determining module comprises: a seventh determining unit, configured to determine the first codebook of the one or more codebooks corresponding to the second characteristic sequence according to the second characteristic sequence information and the sixth codebook information, wherein each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 79

The apparatus according to example 78, wherein the sixth codebook information received by the receiving module comprises modulation order information of the first codebook, and modulation orders of the one or more codebooks corresponding to the second characteristic sequence are different.

EXAMPLE 80

The apparatus according to example 68, wherein the codebook indication information received by the receiving module comprises third codebook cluster information, third codebook set information, and seventh codebook information, wherein the third codebook cluster information is used to indicate a third codebook cluster, the third codebook set information is used to indicate a third codebook set in the third codebook cluster, and the seventh codebook information is used to indicate the first codebook in the third codebook set; and the determining module comprises: an eighth determining unit, configured to determine the first codebook in the third codebook set comprised in the third codebook cluster according to the third codebook cluster information, the third codebook set information, and the seventh codebook information, wherein each codebook cluster comprises at least one codebook set, each codebook set comprises at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

EXAMPLE 81

The apparatus according to example 80, wherein the third codebook set information received by the receiving module comprises modulation order information of the first codebook, and modulation orders corresponding to codebook sets comprised in the third codebook cluster are different.

EXAMPLE 82

The apparatus according to example 68, wherein the codebook indication information received by the receiving module comprises fourth codebook set information and eighth codebook information, wherein the fourth codebook set information is used to indicate a fourth codebook set, and the eighth codebook information is used to indicate the first codebook in the fourth codebook set; and the determining module comprises: a ninth determining unit, configured to determine the first codebook in the fourth codebook set according to the fourth codebook set information and the eighth codebook information, wherein each codebook set comprises at least one codebook, and the codebook set meets a condition that codewords in a same codebook set have a same total quantity of modulation symbols and that codebooks in a same codebook set have a same total quantity of codewords.

EXAMPLE 83

The apparatus according to example 68, wherein the codebook indication information received by the receiving module comprises third characteristic matrix information, fifth codebook set information, and ninth codebook information, wherein the third characteristic matrix information is used to indicate a third characteristic matrix, the fifth codebook set information is used to indicate a fifth codebook set of one or more codebook sets corresponding to the third characteristic matrix, and the ninth codebook information is used to indicate the first codebook in the fifth codebook set; and the determining module comprises: a tenth determining unit, configured to determine the first codebook in the fifth codebook set of one or more codebook sets corresponding to the third characteristic matrix according to the third characteristic matrix information, the fifth codebook set information, and the ninth codebook information, wherein each codebook set comprises at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix comprises two or more characteristic sequences, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 84

The apparatus according to example 83, wherein the fifth codebook set information received by the receiving module comprises modulation order information of the first codebook, and modulation orders corresponding to the one or more codebook sets corresponding to the third characteristic matrix are different.

EXAMPLE 85

The apparatus according to any one of examples 68 to 84, wherein the receiving module is specifically configured to receive an uplink scheduling authorization message, dedicated high-layer control signaling, or a system broadcast message sent by the network device, wherein the uplink scheduling authorization message, the dedicated high-layer control signaling, or the system broadcast message comprises the codebook indication information.

EXAMPLE 86

The apparatus according to example 85, wherein the dedicated high-layer control signaling comprises a radio resource control RRC connection setup message and an RRC connection reconfiguration message.

EXAMPLE 87

The apparatus according to any one of examples 68 to 86, wherein the codebook indication information received by the receiving module is bit string information.

EXAMPLE 88

The apparatus according to any one of examples 68 to 87, wherein the codebook is a sparse code multiple access SCMA codebook.

EXAMPLE 89

The apparatus according to example 88, wherein a quantity of zero modulation symbols is greater than or equal to a quantity of non-zero modulation symbols in a codeword comprised in the codebook.

EXAMPLE 90

The apparatus according to any one of examples 68 to 89, wherein the apparatus is a terminal device.

EXAMPLE 91

An apparatus for transmitting indication information, comprising a processor, a memory, a bus system, and a transmitter, wherein the processor, the memory, and the transmitter are connected by using the bus system, the memory is configured to store an instruction, and the processor is configured to execute the instruction stored in the memory, to control the transmitter to send a signal, wherein the processor is configured to: determine, according to one or more codebooks, a first codebook to be used by a terminal device to send an uplink data stream, wherein the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol; and determine codebook indication information used to indicate the first codebook; and the transmitter is configured to send the codebook indication information to the terminal device.

EXAMPLE 92

The apparatus according to example 91, wherein the determining, by the processor, the codebook indication information used to indicate the first codebook comprises: determining a first codebook set to which the first codebook belongs and a first codebook cluster to which the first codebook set belongs, wherein each codebook cluster comprises at least one codebook set, each codebook set comprises at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols; and determining the codebook indication information, wherein the codebook indication information comprises first codebook cluster information, first codebook set information, and first codebook information, wherein the first codebook cluster information is used to indicate the first codebook cluster, the first codebook set information is used to indicate the first codebook set in the first codebook cluster, and the first codebook information is used to indicate the first codebook in the first codebook set.

EXAMPLE 93

The apparatus according to example 92, wherein the first codebook information determined by the processor comprises modulation order information of the first codebook, and modulation orders of codebooks comprised in the first codebook set are different.

EXAMPLE 94

The apparatus according to example 91, wherein the determining, by the processor, the codebook indication information used to indicate the first codebook comprises: determining a second codebook set to which the first codebook belongs, wherein each codebook set comprises at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols; and determining the codebook indication information, wherein the codebook indication information comprises second codebook set information and second codebook information, wherein the second codebook set information is used to indicate the second codebook set, and the second codebook information is used to indicate the first codebook in the second codebook set.

EXAMPLE 95

The apparatus according to example 94, wherein the second codebook information determined by the processor comprises modulation order information of the first codebook, and modulation orders of codebooks comprised in the second codebook set are different.

EXAMPLE 96

The apparatus according to example 91, wherein the determining, by the processor, the codebook indication information used to indicate the first codebook comprises: determining a second codebook cluster to which the first codebook belongs, wherein each codebook cluster comprises at least one codebook, and the codebook cluster meets a condition that codewords in a same codebook cluster have a same total quantity of modulation symbols; and determining the codebook indication information, wherein the codebook indication information comprises second codebook cluster information and third codebook information, wherein the second codebook cluster information is used to indicate the second codebook cluster, and the third codebook information is used to indicate the first codebook in the second codebook cluster.

EXAMPLE 97

The apparatus according to example 91, wherein the codebook indication information determined by the processor comprises an index value of the first codebook.

EXAMPLE 98

The apparatus according to example 91, wherein the determining, by the processor, the codebook indication information used to indicate the first codebook comprises: determining a first characteristic sequence to which the first codebook belongs and a first characteristic matrix to which the first characteristic sequence belongs, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises first characteristic matrix information, first characteristic sequence information, and fourth codebook information, wherein the first characteristic matrix information is used to indicate the first characteristic matrix, the first characteristic sequence information is used to indicate the first characteristic sequence in the first characteristic matrix, and the fourth codebook information is used to indicate the first codebook of one or more codebooks corresponding to the first characteristic sequence.

EXAMPLE 99

The apparatus according to example 98, wherein the fourth codebook information determined by the processor comprises modulation order information of the first codebook, and modulation orders of the one or more codebooks corresponding to the first characteristic sequence are different.

EXAMPLE 100

The apparatus according to example 91, wherein the determining, by the processor, the codebook indication information used to indicate the first codebook comprises: determining a second characteristic matrix to which the first codebook belongs, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises second characteristic matrix information and fifth codebook information, wherein the second characteristic matrix information is used to indicate the second characteristic matrix, and the fifth codebook information is used to indicate the first codebook of one or more codebooks corresponding to the second characteristic matrix.

EXAMPLE 101

The apparatus according to example 91, wherein the determining, by the processor, the codebook indication information used to indicate the first codebook comprises: determining a second characteristic sequence to which the first codebook belongs, wherein each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises second characteristic sequence information and sixth codebook information, wherein the second characteristic sequence information is used to indicate the second characteristic sequence, and the sixth codebook information is used to indicate the first codebook of one or more codebooks corresponding to the second characteristic sequence.

EXAMPLE 102

The apparatus according to example 101, wherein the sixth codebook information determined by the processor comprises modulation order information of the first codebook, and codebooks of at least one codebook of the one or more codebooks corresponding to the second characteristic sequence have different modulation orders.

EXAMPLE 103

The apparatus according to example 91, wherein the determining, by the processor, the codebook indication information used to indicate the first codebook comprises: determining a third codebook set to which the first codebook belongs and a third codebook cluster to which the third codebook set belongs, wherein each codebook cluster comprises at least one codebook set, each codebook set comprises at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords; and determining the codebook indication information, wherein the codebook indication information comprises third codebook cluster information, third codebook set information, and seventh codebook information, wherein the third codebook cluster information is used to indicate the third codebook cluster, the third codebook set information is used to indicate the third codebook set in the third codebook cluster, and the seventh codebook information is used to indicate the first codebook in the third codebook set.

EXAMPLE 104

The apparatus according to example 103, wherein the third codebook set information determined by the processor comprises modulation order information of the first codebook, and modulation orders corresponding to codebook sets comprised in the third codebook cluster are different.

EXAMPLE 105

The apparatus according to example 91, wherein the determining, by the processor, the codebook indication information used to indicate the first codebook comprises: determining a fourth codebook set to which the first codebook belongs, wherein each codebook set comprises at least one codebook, and the codebook set meets a condition that codewords in a same codebook set have a same total quantity of modulation symbols and that codebooks in a same codebook set have a same total quantity of codewords; and determining the codebook indication information, wherein the codebook indication information comprises fourth codebook set information and eighth codebook information, wherein the fourth codebook set information is used to indicate the fourth codebook set, and the eighth codebook information is used to indicate the first codebook in the fourth codebook set.

EXAMPLE 106

The apparatus according to example 91, wherein the determining, by the processor, the codebook indication information used to indicate the first codebook comprises: determining a fifth codebook set to which the first codebook belongs and a third characteristic matrix to which the fifth codebook set belongs, wherein each codebook set comprises at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix comprises two or more characteristic sequences, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises third characteristic matrix information, fifth codebook set information, and ninth codebook information, wherein the third characteristic matrix information is used to indicate the third characteristic matrix, the fifth codebook set information is used to indicate the fifth codebook set of one or more codebook sets corresponding to the third characteristic matrix, and the ninth codebook information is used to indicate the first codebook in the fifth codebook set.

EXAMPLE 107

The apparatus according to example 106, wherein the fifth codebook set information determined by the processor comprises modulation order information of the first codebook, and modulation orders corresponding to the one or more codebook sets corresponding to the third characteristic matrix are different.

EXAMPLE 108

The apparatus according to any one of examples 91 to 107, wherein the sending, by the transmitter, the codebook indication information to the terminal device comprises: sending an uplink scheduling authorization message, dedicated high-layer control signaling, or a system broadcast message to the terminal device, wherein the uplink scheduling authorization message, the dedicated high-layer control signaling, or the system broadcast message comprises the codebook indication information.

EXAMPLE 109

The apparatus according to example 108, wherein the dedicated high-layer control signaling comprises a radio resource control RRC connection setup message and an RRC connection reconfiguration message.

EXAMPLE 110

The apparatus according to any one of examples 91 to 109, wherein the codebook indication information sent by the transmitter is bit string information.

EXAMPLE 111

The apparatus according to any one of examples 91 to 110, wherein the codebook is a sparse code multiple access SCMA codebook.

EXAMPLE 112

The apparatus according to example 111, wherein a quantity of elements 0 is greater than or equal to a quantity of modulation symbols in a codeword comprised in the codebook.

EXAMPLE 113

The apparatus according to any one of examples 91 to 112, wherein the apparatus is a network device.

EXAMPLE 114

An apparatus for transmitting indication information, comprising: a processor, a memory, a bus system, a receiver, and a transmitter, wherein the processor, the memory, the receiver, and the transmitter are connected by using the bus system, the memory is configured to store an instruction, and the processor is configured to execute the instruction stored in the memory, to control the receiver to receive a signal, and to control the transmitter to send a signal, wherein the receiver is configured to receive codebook indication information sent by a network device, wherein the codebook indication information is used to indicate a first codebook of one or more codebooks, the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol; the processor is configured to determine the first codebook according to the codebook indication information; and the transmitter is configured to send an uplink data stream according to the first codebook.

EXAMPLE 115

The apparatus according to example 114, wherein the codebook indication information received by the receiver comprises first codebook cluster information, first codebook set information, and first codebook information, wherein the first codebook cluster information is used to indicate a first codebook cluster, the first codebook set information is used to indicate a first codebook set in the first codebook cluster, and the first codebook information is used to indicate the first codebook in the first codebook set; and the determining, by the processor, the first codebook according to the codebook indication information comprises: determining the first codebook in the first codebook set comprised in the first codebook cluster according to the first codebook cluster information, the first codebook set information, and the first codebook information, wherein each codebook cluster comprises at least one codebook set, each codebook set comprises at least one codebook, the codebook cluster meets a condition that codewords in a same codebook cluster have a same total quantity of modulation symbols, and the codebook set meets a condition that any two codebooks in a same codebook set have same positions in which modulation symbols of all codewords of the two codebooks are zero modulation symbols.

EXAMPLE 116

The apparatus according to example 115, wherein the first codebook information received by the receiver comprises modulation order information of the first codebook, and modulation orders of codebooks comprised in the first codebook set are different.

EXAMPLE 117

The apparatus according to example 114, wherein the codebook indication information received by the receiver comprises second codebook set information and second codebook information, wherein the second codebook set information is used to indicate a second codebook set, and the second codebook information is used to indicate the first codebook in the second codebook set; and the determining, by the processor, the first codebook according to the codebook indication information comprises: determining the first codebook in the second codebook set according to the second codebook set information and the second codebook information, wherein each codebook set comprises at least one codebook, and the codebook set meets a condition that codewords in a same codebook set have a same total quantity of modulation symbols and that any two codebooks in a same codebook set have same positions in which modulation symbols of all codewords of the two codebooks are zero modulation symbols.

EXAMPLE 118

The apparatus according to example 117, wherein the second codebook information received by the receiver comprises modulation order information of the first codebook, and modulation orders of codebooks comprised in the second codebook set are different.

EXAMPLE 119

The apparatus according to example 114, wherein the codebook indication information received by the receiver comprises second codebook cluster information and third codebook information, wherein the second codebook cluster information is used to indicate a second codebook cluster, and the third codebook information is used to indicate the first codebook in the second codebook cluster; and the determining, by the processor, the first codebook according to the codebook indication information comprises: determining the first codebook in the second codebook cluster according to the second codebook cluster information and the third codebook information, wherein each codebook cluster comprises at least one codebook, and the codebook cluster meets a condition that codewords in a same codebook cluster have a same total quantity of modulation symbols.

EXAMPLE 120

The apparatus according to example 114, wherein the codebook indication information received by the receiver comprises an index value of the first codebook; and the determining, by the processor, the first codebook according to the codebook indication information comprises: determining the first codebook corresponding to the index value according to the index value.

EXAMPLE 121

The apparatus according to example 114, wherein the codebook indication information received by the receiver comprises first characteristic matrix information, first characteristic sequence information, and fourth codebook information, wherein the first characteristic matrix information is used to indicate a first characteristic matrix, the first characteristic sequence information is used to indicate a first characteristic sequence in the first characteristic matrix, and the fourth codebook information is used to indicate the first codebook of one or more codebooks corresponding to the first characteristic sequence; and the determining, by the processor, the first codebook according to the codebook indication information comprises: determining the first codebook of the one or more codebooks corresponding to the first characteristic sequence in the first characteristic matrix according to the first characteristic matrix information, the first characteristic sequence information, and the fourth codebook information, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 122

The apparatus according to example 121, wherein the fourth codebook information received by the receiver comprises modulation order information of the first codebook, and modulation orders of the one or more codebooks corresponding to the first characteristic sequence are different.

EXAMPLE 123

The apparatus according to example 114, wherein the codebook indication information received by the receiver comprises second characteristic matrix information and fifth codebook information, wherein the second characteristic matrix information is used to indicate a second characteristic matrix, and the fifth codebook information is used to indicate the first codebook of one or more codebooks corresponding to the second characteristic matrix; and the determining, by the processor, the first codebook according to the codebook indication information comprises: determining the first codebook of the one or more codebooks corresponding to the second characteristic matrix according to the second characteristic matrix information and the fifth codebook information, wherein each characteristic matrix comprises two or more characteristic sequences, each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 124

The apparatus according to example 114, wherein the codebook indication information received by the receiver comprises second characteristic sequence information and sixth codebook information, wherein the second characteristic sequence information is used to indicate a second characteristic sequence, and the sixth codebook information is used to indicate the first codebook of one or more codebooks corresponding to the second characteristic sequence; and the determining, by the processor, the first codebook according to the codebook indication information comprises: determining the first codebook of the one or more codebooks corresponding to the second characteristic sequence according to the second characteristic sequence information and the sixth codebook information, wherein each characteristic sequence corresponds to one or more codebooks, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 125

The apparatus according to example 124, wherein the sixth codebook information received by the receiver comprises modulation order information of the first codebook, and modulation orders of the one or more codebooks corresponding to the second characteristic sequence are different.

EXAMPLE 126

The apparatus according to example 114, wherein the codebook indication information received by the receiver comprises third codebook cluster information, third codebook set information, and seventh codebook information, wherein the third codebook cluster information is used to indicate a third codebook cluster, the third codebook set information is used to indicate a third codebook set in the third codebook cluster, and the seventh codebook information is used to indicate the first codebook in the third codebook set; and the determining, by the processor, the first codebook according to the codebook indication information comprises: determining the first codebook in the third codebook set comprised in the third codebook cluster according to the third codebook cluster information, the third codebook set information, and the seventh codebook information, wherein each codebook cluster comprises at least one codebook set, each codebook set comprises at least one codebook, the codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords.

EXAMPLE 127

The apparatus according to example 126, wherein the third codebook set information received by the receiver comprises modulation order information of the first codebook, and modulation orders corresponding to codebook sets comprised in the third codebook cluster are different.

EXAMPLE 128

The apparatus according to example 114, wherein the codebook indication information received by the receiver comprises fourth codebook set information and eighth codebook information, wherein the fourth codebook set information is used to indicate a fourth codebook set, and the eighth codebook information is used to indicate the first codebook in the fourth codebook set; and the determining, by the processor, the first codebook according to the codebook indication information comprises: determining the first codebook in the fourth codebook set according to the fourth codebook set information and the eighth codebook information, wherein each codebook set comprises at least one codebook, and the codebook set meets a condition that codewords in a same codebook set have a same total quantity of modulation symbols and that codebooks in a same codebook set have a same total quantity of codewords.

EXAMPLE 129

The apparatus according to example 114, wherein the codebook indication information received by the receiver comprises third characteristic matrix information, fifth codebook set information, and ninth codebook information, wherein the third characteristic matrix information is used to indicate a third characteristic matrix, the fifth codebook set information is used to indicate a fifth codebook set of one or more codebook sets corresponding to the third characteristic matrix, and the ninth codebook information is used to indicate the first codebook in the fifth codebook set; and the determining, by the processor, the first codebook according to the codebook indication information comprises: determining the first codebook in the fifth codebook set of one or more codebook sets corresponding to the third characteristic matrix according to the third characteristic matrix information, the fifth codebook set information, and the ninth codebook information, wherein each codebook set comprises at least one codebook, the codebook set meets a condition that codewords in a same codebook set have a same total quantity of modulation symbols and that codebooks in a same codebook set have a same total quantity of codewords, each characteristic matrix corresponds to one or more codebook sets, the characteristic matrix comprises two or more characteristic sequences, the characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols.

EXAMPLE 130

The apparatus according to example 129, wherein the fifth codebook set information received by the receiver comprises modulation order information of the first codebook, and modulation orders corresponding to the one or more codebook sets corresponding to the third characteristic matrix are different.

EXAMPLE 131

The apparatus according to any one of examples 114 to 130, wherein the receiving, by the receiver, the codebook indication information sent by the network device comprises: receiving an uplink scheduling authorization message, dedicated high-layer control signaling, or a system broadcast message sent by the network device, wherein the uplink scheduling authorization message, the dedicated high-layer control signaling, or the system broadcast message comprises the codebook indication information.

EXAMPLE 132

The apparatus according to example 131, wherein the dedicated high-layer control signaling comprises a radio resource control RRC connection setup message and an RRC connection reconfiguration message.

EXAMPLE 133

The apparatus according to any one of examples 114 to 132, wherein the codebook indication information received by the receiver is bit string information.

EXAMPLE 134

The apparatus according to any one of examples 114 to 133, wherein the codebook is a sparse code multiple access SCMA codebook.

EXAMPLE 135

The apparatus according to example 134, wherein a quantity of elements 0 is greater than or equal to a quantity of modulation symbols in a codeword comprised in the codebook.

EXAMPLE 136

The apparatus according to any one of examples 114 to 135, wherein the apparatus is a terminal device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus, comprising:
a processor;
a non-transitory memory;
a bus system; and
a transmitter;
wherein the processor, the memory, and the transmitter are connected using the bus system;
wherein the memory is configured to store a program, the program including instructions for:
determining, according to one or more codebooks, a first codebook to be used by a terminal device to send an uplink data stream, wherein the first codebook comprises two or more codewords, each codeword of the two or more codewords is a multidimensional complex vector and represents a mapping relationship between data and a plurality of modulation symbols for the terminal device to use to send the uplink data stream on a plurality of resource units, and the plurality of modulation symbols comprise a zero modulation symbol and a non-zero modulation symbol; and
determining codebook indication information indicating the first codebook, wherein the codebook indication information comprises first codebook information, the first codebook information comprises modulation order information of the first codebook, and modulation orders of codebooks comprised in the first codebook are different; and
wherein the transmitter is configured to send the codebook indication information to the terminal device, to cause the terminal device to send the uplink data stream using the first codebook.

2. An apparatus, comprising:
a processor;
a non-transitory memory;
a bus system; and
a transmitter;
wherein the processor, the memory, and the transmitter are connected using the bus system;
wherein the memory is configured to store a program, the program including instructions for:
determining, according to one or more codebooks, a first codebook to be used by a terminal device to send an uplink data stream, wherein the first codebook comprises two or more codewords, each codeword of the two or more codewords is a multidimensional complex vector and represents a mapping relationship between data and a plurality of modulation symbols, and the plurality of modulation symbols comprises a zero modulation symbol and a non-zero modulation symbol;
determining a first codebook set to which the first codebook belongs and a first codebook cluster to which the first codebook set belongs, wherein each codebook cluster comprises at least one codebook set, each codebook set comprises at least one codebook, each codebook cluster meets a condition that codewords in a same codebook cluster have a same total quantity of modulation symbols, and each codebook set meets a condition that any two codebooks in a same codebook set have same positions in which modulation symbols of all codewords of the any two codebooks are zero modulation symbols; and determining codebook indication information, wherein the codebook indication information comprises first codebook cluster information, first codebook set information, and first codebook information, wherein the first codebook cluster information indicates the first codebook cluster, the first codebook set information indicates the first codebook set in the first codebook cluster, and the first codebook information indicates the first codebook in the first codebook set; and wherein the transmitter is configured to send the codebook indication information to the terminal device.

3. An apparatus, comprising:
a processor;
a non-transitory memory;
a bus system; and
a transmitter;
wherein the processor, the memory, and the transmitter are connected using the bus system;
wherein the memory is configured to store a program, the program including instructions for:

determining, according to one or more codebooks, a first codebook to be used by a terminal device to send an uplink data stream, wherein the first codebook comprises two or more codewords, each codeword of the two or more codewords is a multidimensional complex vector and represents a mapping relationship between data and a plurality of modulation symbols, and the plurality of modulation symbols comprises a zero modulation symbol and a non-zero modulation symbol;

determining a second codebook set to which the first codebook belongs, wherein each codebook set comprises at least one codebook, and each codebook set meets a condition that codewords in a same codebook set have a same total quantity of modulation symbols and that any two codebooks in a same codebook set have same positions in which modulation symbols of all codewords of the any two codebooks are zero modulation symbols; and determining codebook indication information, wherein the codebook indication information comprises second codebook set information and second codebook information, wherein the second codebook set information indicates the second codebook set, and the second codebook information indicates the first codebook in the second codebook set; and wherein the transmitter is configured to send the codebook indication information to the terminal device.

4. The apparatus according to claim 3, wherein the second codebook information comprises modulation order information of the first codebook, and modulation orders of codebooks comprised in the second codebook set are different.

5. The apparatus according to claim 1, wherein determining the codebook indication information indicating the first codebook comprises:

determining a second codebook cluster to which the first codebook belongs, wherein each codebook cluster comprises at least one codebook, and each codebook cluster meets a condition that codewords in a same codebook cluster have a same total quantity of modulation symbols; and determining the codebook indication information, wherein the codebook indication information further comprises second codebook cluster information and third codebook information, wherein the second codebook cluster information indicates the second codebook cluster, and the third codebook information indicates the first codebook in the second codebook cluster.

6. The apparatus according to claim 1, wherein the codebook indication information further comprises an index value of the first codebook.

7. The apparatus according to claim 1, wherein determining the codebook indication information indicating the first codebook comprises:

determining a first characteristic sequence to which the first codebook belongs and a first characteristic matrix to which the first characteristic sequence belongs, wherein each characteristic matrix comprises two or more characteristic sequences, each characteristic sequence corresponds to one or more codebooks, each characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises first characteristic matrix information, first characteristic sequence information, and fourth codebook information, wherein the first characteristic matrix information indicates a first characteristic matrix, the first characteristic sequence information indicates a first characteristic sequence in the first characteristic matrix, and the fourth codebook information indicates a first codebook of one or more codebooks corresponding to the first characteristic sequence.

8. The apparatus according to claim 7, wherein the fourth codebook information comprises the modulation order information of the first codebook, and modulation orders of the one or more codebooks corresponding to the first characteristic sequence are different.

9. The apparatus according to claim 1, wherein determining the codebook indication information indicating the first codebook comprises:

determining a second characteristic matrix to which the first codebook belongs, wherein each characteristic matrix comprises two or more characteristic sequences, each characteristic sequence corresponds to one or more codebooks, each characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and determining the codebook indication information, wherein the codebook indication information comprises further second characteristic matrix information and fifth codebook information, wherein the second characteristic matrix information indicates the second characteristic matrix, and the fifth codebook information indicates the first codebook of one or more codebooks corresponding to the second characteristic matrix.

10. The apparatus according to claim 1, wherein determining the codebook indication information indicating the first codebook comprises:
determining a second characteristic sequence to which the first codebook belongs, wherein each characteristic sequence corresponds to one or more codebooks, each characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and
determining the codebook indication information, wherein the codebook indication information comprises second characteristic sequence information and sixth codebook information, wherein the second characteristic sequence information indicates the second characteristic sequence, and the sixth codebook information indicates the first codebook of one or more codebooks corresponding to the second characteristic sequence.

11. The apparatus according to claim 10, wherein the sixth codebook information comprises the modulation order information of the first codebook, and codebooks of at least one codebook of the one or more codebooks corresponding to the second characteristic sequence have different modulation orders.

12. The apparatus according to claim 1, wherein determining the codebook indication information indicating the first codebook comprises:
determining a third codebook set to which the first codebook belongs and a third codebook cluster to which the third codebook set belongs, wherein each codebook cluster comprises at least one codebook set, each codebook set comprises at least one codebook, each codebook cluster meets a condition that codewords in a same codebook cluster have a same total quantity of modulation symbols, and the codebook set meets a condition that codewords in a same codebook set have a same total quantity of modulation symbols and that codebooks in a same codebook set have a same total quantity of codewords; and
determining the codebook indication information, wherein the codebook indication information comprises third codebook cluster information, third codebook set information, and seventh codebook information, wherein the third codebook cluster information indicates the third codebook cluster, the third codebook set information indicates the third codebook set in the third codebook cluster, and the seventh codebook information indicates the first codebook in the third codebook set.

13. The apparatus according to claim 12, wherein the third codebook set information comprises the modulation order information of the first codebook, and modulation orders corresponding to codebook sets comprised in the third codebook cluster are different.

14. The apparatus according to claim 1, wherein determining the codebook indication information indicating the first codebook comprises:
determining a fourth codebook set to which the first codebook belongs, wherein each codebook set comprises at least one codebook, and each codebook set meets a condition that codewords in a same codebook set have a same total quantity of modulation symbols and that codebooks in a same codebook set have a same total quantity of codewords; and
determining the codebook indication information, wherein the codebook indication information further comprises fourth codebook set information and eighth codebook information, wherein the fourth codebook set information is used to indicate the fourth codebook set, and the eighth codebook information indicates the first codebook in the fourth codebook set.

15. The apparatus according to claim 1, wherein determining the codebook indication information indicating the first codebook comprises:
determining a fifth codebook set to which the first codebook belongs and a third characteristic matrix to which the fifth codebook set belongs, wherein each codebook set comprises at least one codebook, each codebook set meets a condition that codewords in a same codebook set have a same total quantity of modulation symbols and that codebooks in a same codebook set have a same total quantity of codewords, each characteristic matrix corresponds to one or more codebook sets, each characteristic matrix comprises two or more characteristic sequences, each characteristic sequence comprises an element 0 and an element 1, the element 0 represents that modulation symbols that are of all codewords in a corresponding codebook and that are in a position corresponding to the element 0 are all zero modulation symbols, and the element 1 represents that modulation symbols that are of all codewords in a corresponding codebook and that are in a position corresponding to the element 1 are not all zero modulation symbols or are all non-zero modulation symbols; and
determining the codebook indication information, wherein the codebook indication information comprises third characteristic matrix information, fifth codebook set information, and ninth codebook information, wherein the third characteristic matrix information indicates the third characteristic matrix, the fifth codebook set information indicates a fifth codebook set of one or more codebook sets corresponding to the third characteristic matrix, and the ninth codebook information indicates the first codebook in the fifth codebook set.

16. The apparatus according to claim 15, wherein the fifth codebook set information comprises the modulation order information of the first codebook, and modulation orders corresponding to the one or more codebook sets corresponding to the third characteristic matrix are different.

17. The apparatus according to claim 1, wherein sending the codebook indication information to the terminal device comprises:
sending an uplink scheduling authorization message, dedicated high-layer control signaling, or a system broadcast message to the terminal device, wherein the uplink scheduling authorization message, the dedicated high-layer control signaling, or the system broadcast message comprises the codebook indication information.

18. The apparatus according to claim 17, wherein the dedicated high-layer control signaling comprises a radio resource control (RRC) connection setup message and an RRC connection reconfiguration message.

19. The apparatus according to claim 1, wherein the codebook indication information sent by the transmitter is bit string information.

* * * * *